US012186872B2

(12) United States Patent
McCardle

(10) Patent No.: US 12,186,872 B2
(45) Date of Patent: Jan. 7, 2025

(54) LIFTER FOR FASTENER DRIVING TOOL

(71) Applicant: Kyocera Senco Industrial Tools, Inc., Cincinnati, OH (US)

(72) Inventor: Thomas A. McCardle, Fairfield, OH (US)

( * ) Notice: Subject to any disclaimer, the term of this patent is extended or adjusted under 35 U.S.C. 154(b) by 46 days.

(21) Appl. No.: 18/135,249

(22) Filed: Apr. 17, 2023

(65) Prior Publication Data

US 2023/0330825 A1 Oct. 19, 2023

Related U.S. Application Data

(60) Provisional application No. 63/451,949, filed on Mar. 14, 2023, provisional application No. 63/331,993, filed on Apr. 18, 2022.

(51) Int. Cl.
*B25D 11/06* (2006.01)
*B25C 1/06* (2006.01)

(52) U.S. Cl.
CPC ................ *B25D 11/06* (2013.01); *B25C 1/06* (2013.01)

(58) Field of Classification Search
CPC .. B25C 1/06; B25C 1/04; B25C 1/047; B25C 5/15; B25C 1/041; B25C 1/02; B25C 1/08
USPC ...................... 227/130, 132, 131, 8, 146, 10
See application file for complete search history.

(56) References Cited

U.S. PATENT DOCUMENTS 860,536 A 7/1907 Ellingham
1,774,967 A 9/1930 Ellis
2,575,455 A 11/1951 Lang
2,814,041 A 11/1957 Haley
2,933,290 A 4/1960 Ryder
3,048,850 A * 8/1962 Schilling ................. B25C 1/123 227/11

(Continued)

FOREIGN PATENT DOCUMENTS

DE 1503164 3/1970
DE 8711784 8/1987

(Continued)

OTHER PUBLICATIONS

International Search Report, PCT/US2008/078408, 10 pages (Dec. 8, 2008).

(Continued)

*Primary Examiner* — Jacob A Smith
(74) *Attorney, Agent, or Firm* — Frederick H. Gribbell; Russell F. Gribbell

(57) ABSTRACT

A rotary-to-linear lifter for fastener driving tools is provided that has independently movable lifter pins that lift a driver with driver protrusions during a lift stroke. The lifter includes a central lifter shaft that rotates during a lift stroke, a solenoid that actuates, a plurality of lifter pins, and a lifter base. When the solenoid actuates, the lifter pins protrude from the top of the lifter base, and when not actuated, the lifter pins retract inside the lifter base. Each lifter pin has a set of forward and rearward springs that allow for longitudinal pin movements along the lifter's axis of rotation. If there is interference during a lift stroke, individual lifter pin(s) become blocked, and mostly remain inside the lifter base, until the lifter rotates the affected pin away from the interference. Then that lifter pin will again protrude from the lifter base, ready to engage the driver protrusions.

23 Claims, 43 Drawing Sheets

(56) References Cited

U.S. PATENT DOCUMENTS

| | | | |
|---|---|---|---|
| 3,150,488 A | 9/1964 | Haley | |
| 3,589,588 A | 6/1971 | Vasku | |
| 3,847,322 A | 11/1974 | Smith | |
| 3,878,902 A | 4/1975 | Matsuo | |
| 3,913,685 A | 10/1975 | Enstrom | |
| 3,924,692 A | 12/1975 | Saari | |
| 4,203,353 A | 5/1980 | Bemham et al. | |
| 4,215,808 A | 8/1980 | Sollberger et al. | |
| 4,530,455 A | 7/1985 | Vornberger | |
| 4,741,518 A | 5/1988 | Wallis | |
| 5,199,627 A | 4/1993 | Christensen | |
| 5,503,319 A | 4/1996 | Lai | |
| 5,605,268 A | 2/1997 | Hayashi | |
| 5,720,423 A | 2/1998 | Kondo et al. | |
| 6,533,156 B1 | 3/2003 | Chang | |
| 6,669,072 B2 | 12/2003 | Burke | |
| 6,938,811 B2 | 9/2005 | Ehmig et al. | |
| 6,997,367 B2 | 2/2006 | Hu | |
| 7,040,521 B2 | 5/2006 | Kolodziej et al. | |
| 7,225,961 B1 | 6/2007 | Lee | |
| 7,225,962 B2 | 6/2007 | Porth et al. | |
| 7,494,036 B2 | 2/2009 | Shima | |
| 2003/0218042 A1 | 11/2003 | Odoni et al. | |
| 2005/0082334 A1 | 4/2005 | Hu | |
| 2005/0217875 A1 | 10/2005 | Forster | |
| 2006/0180631 A1 | 8/2006 | Pedicini | |
| 2007/0007319 A1 | 1/2007 | Simonelli | |
| 2007/0045377 A1 | 3/2007 | Towfighi | |
| 2008/0041914 A1 | 2/2008 | Simonelli | |
| 2008/0067213 A1* | 3/2008 | Shima | B25C 1/06 227/129 |
| 2008/0190988 A1 | 8/2008 | Pedicini | |
| 2019/0321955 A1* | 10/2019 | Carrier | B25C 1/04 |
| 2020/0156228 A1 | 5/2020 | McCardle et al. | |
| 2021/0308850 A1* | 10/2021 | Bierdeman | B25C 1/06 |

FOREIGN PATENT DOCUMENTS

| | | |
|---|---|---|
| GB | 1559571 | 1/1980 |
| WO | 2021176909 | 9/2021 |

OTHER PUBLICATIONS

Two-page "Tool Assembly" drawing of Senco Model No. SN952XP pneumatic tool; dated Mar. 4, 2008; representative of earlier tools in public use before 2006; Admitted Prior Art.
One-page magnified view of "Tool Assembly" drawing of Senco Model No. SN952XP pneumatic tool; Mar. 4, 2008; representative of earlier tools in public use before 2006; Admitted Prior Art.
European Search Report for EP 08 83 4872, Nov. 19, 2015.
Sixteen page Operating Instructions for Senco AirFree 41 Cordless Finish Nailer, Sep. 7, 2001. Note: this is an old "flywheel" tool-see U.S. Pat. No. 6,669,072.
Four page Parts Reference Guide for Senco AirFree 41 Cordless Finish Nailer; 2004. Note: this is an old "flywheel" tool-see U.S. Pat. No. 6,669,072.
Four page Parts Reference Guide for Senco Cordless Finish 41 15 ga. Finish Nailer, 2008. Note: this is an old "flywheel" tool—see U.S. Pat. No. 6,669,072.
International Search Report, PCT/US23/18795, 13 pages (Jul. 28, 2023).

* cited by examiner

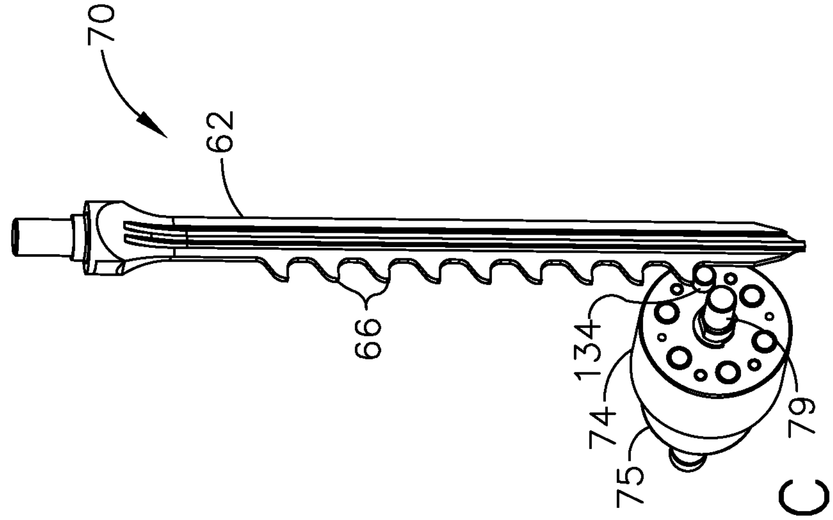
FIG. 6—C
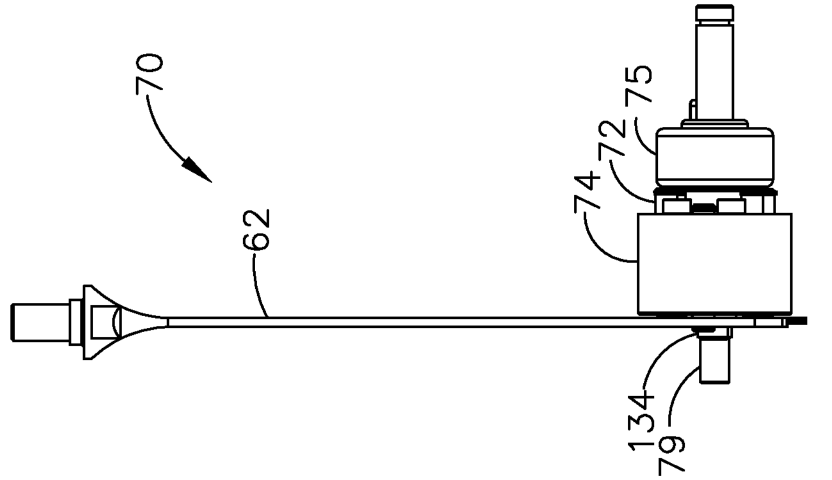
FIG. 6—B
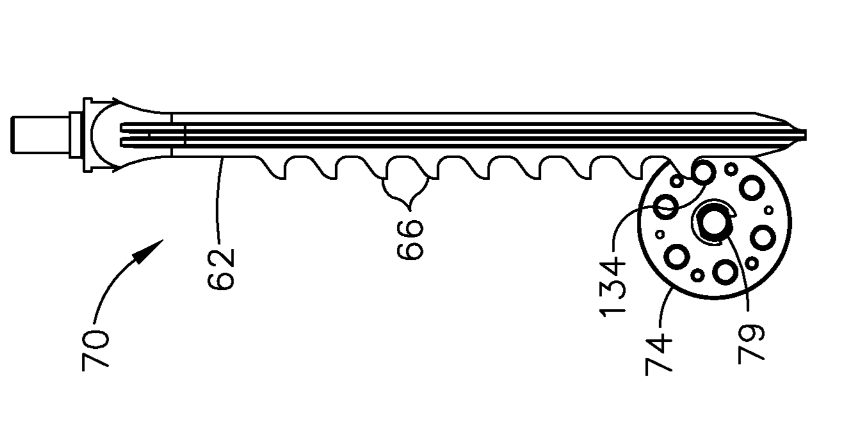
FIG. 6—A

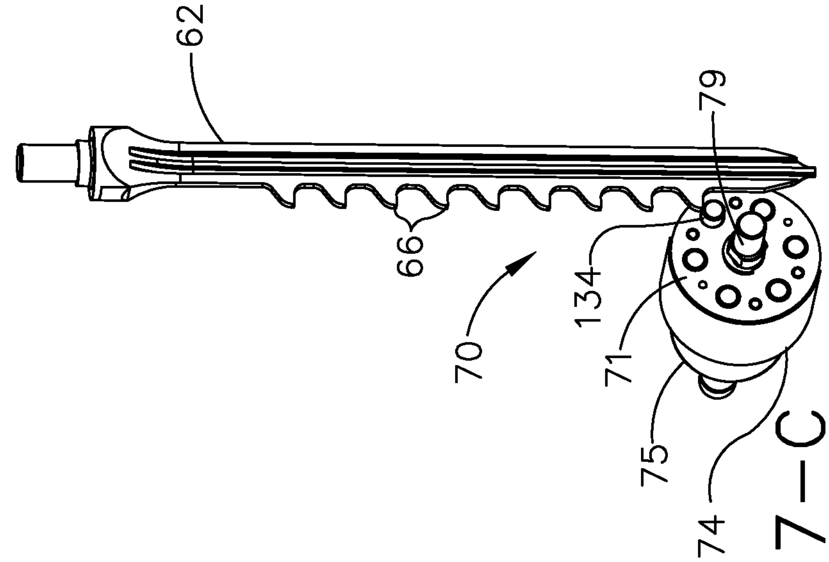
FIG. 7–C
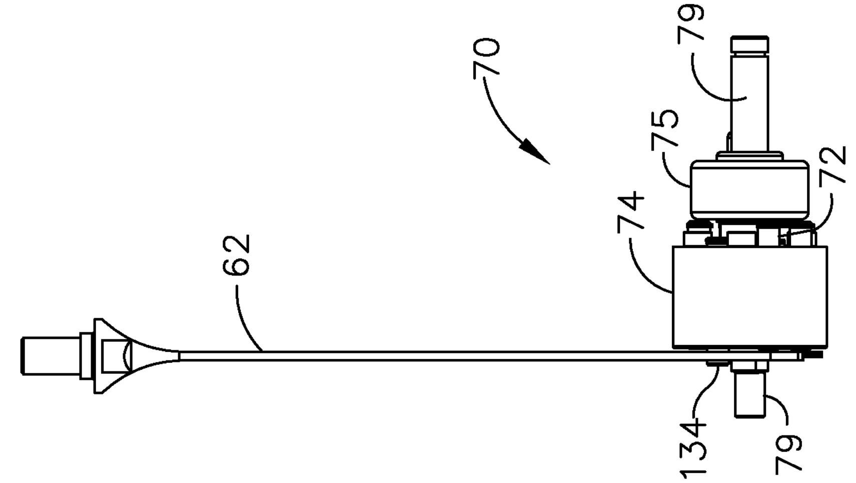
FIG. 7–B
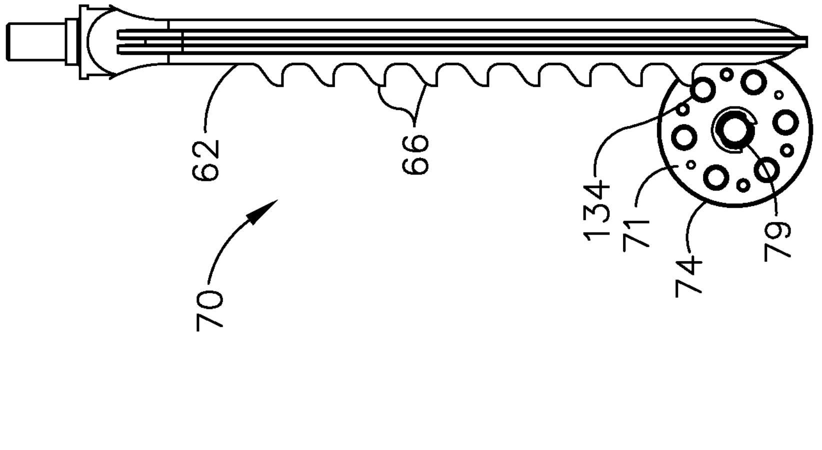
FIG. 7–A

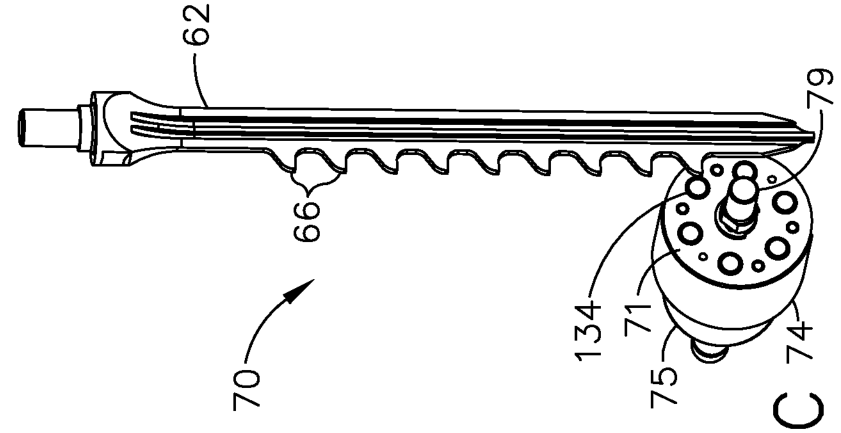
FIG. 8-C
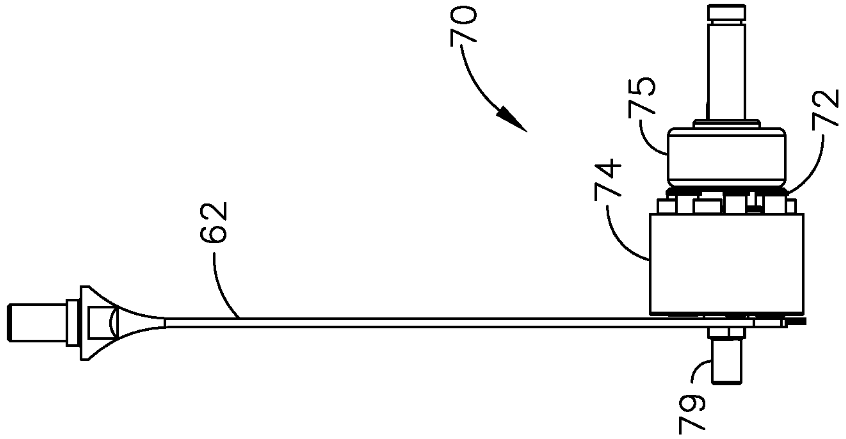
FIG. 8-B
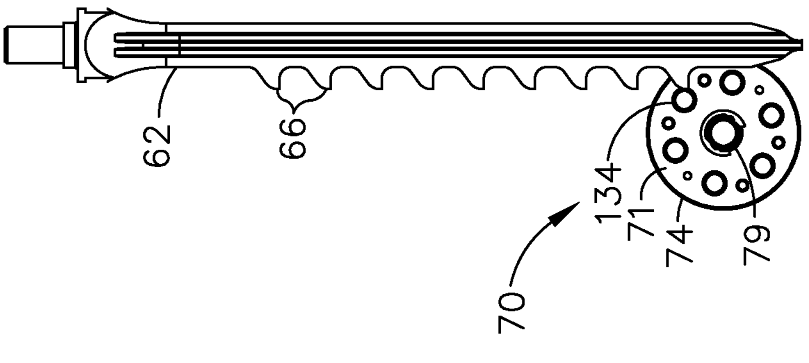
FIG. 8-A

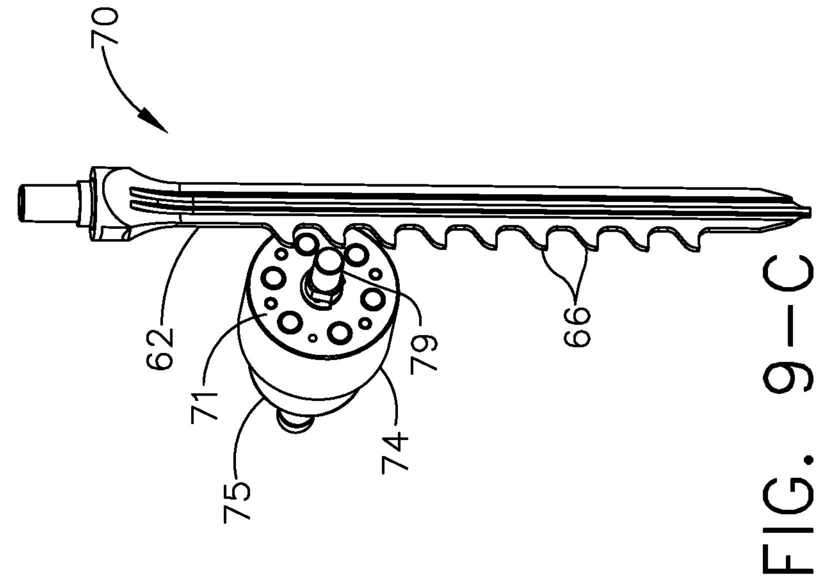
FIG. 9-C
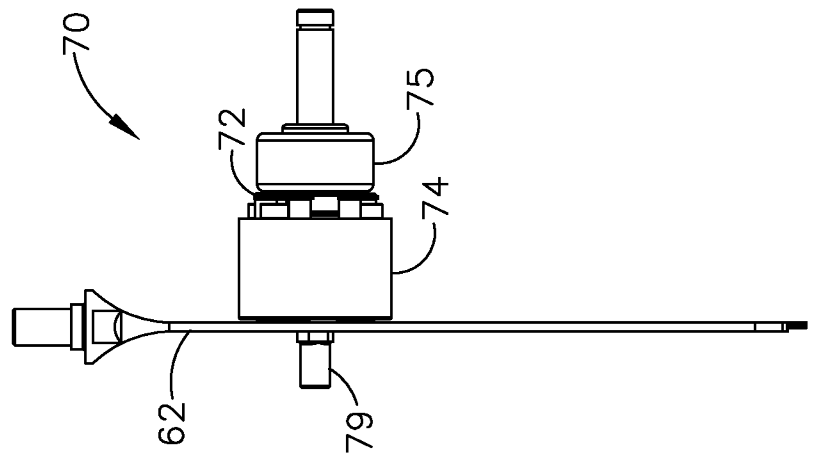
FIG. 9-B
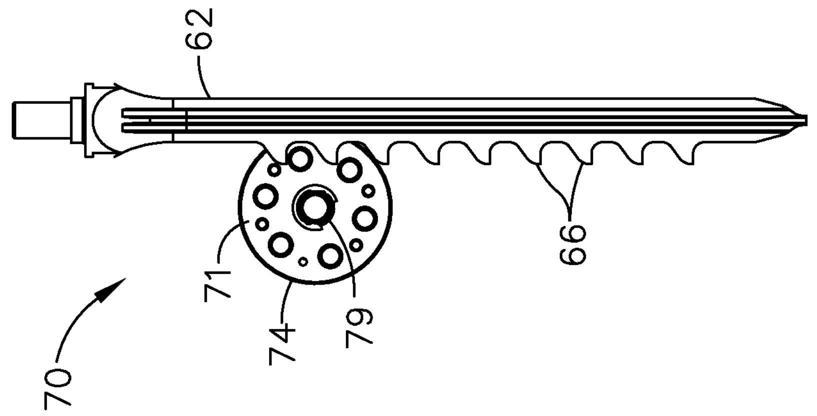
FIG. 9-A

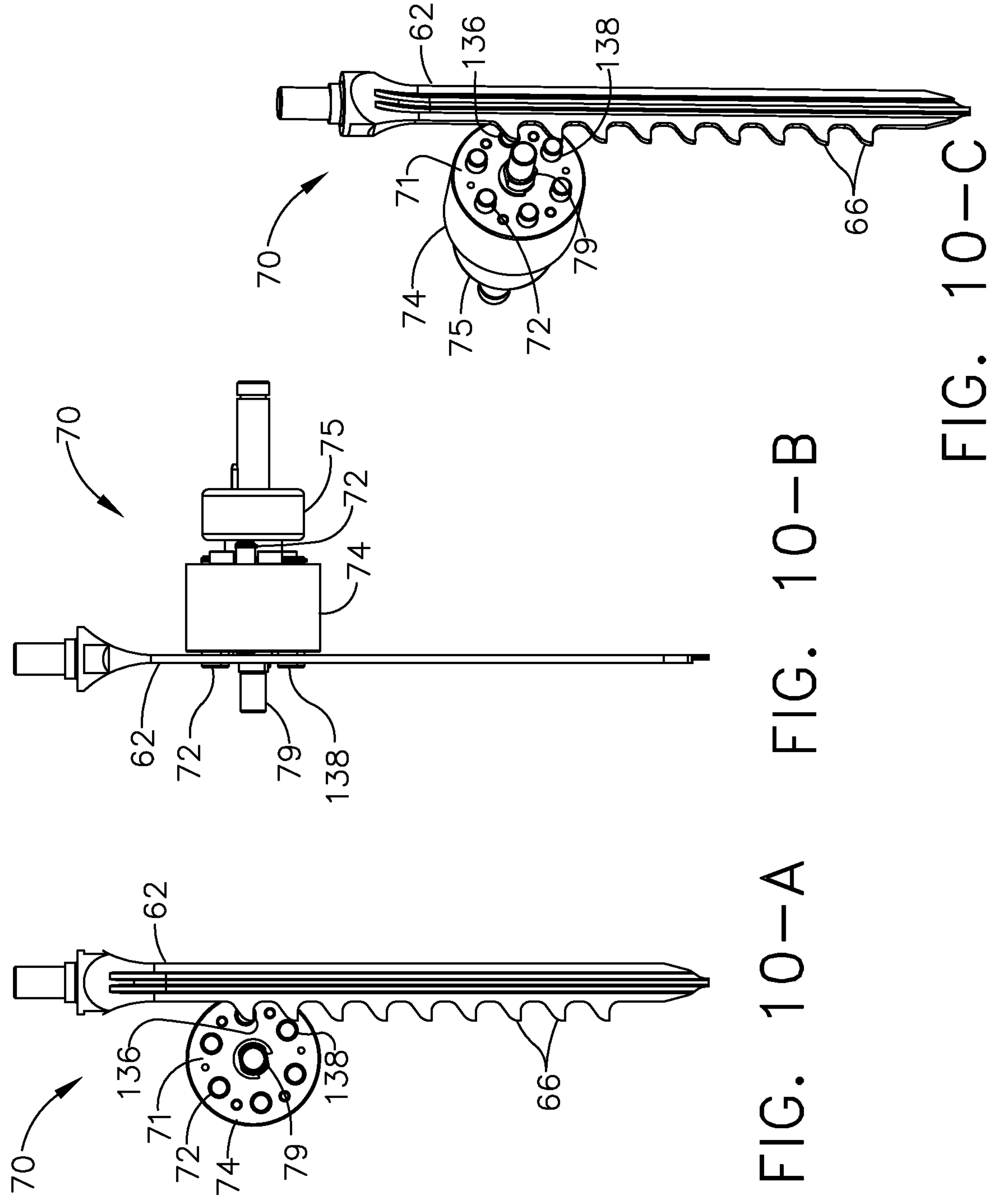
FIG. 10—A
FIG. 10—B
FIG. 10—C

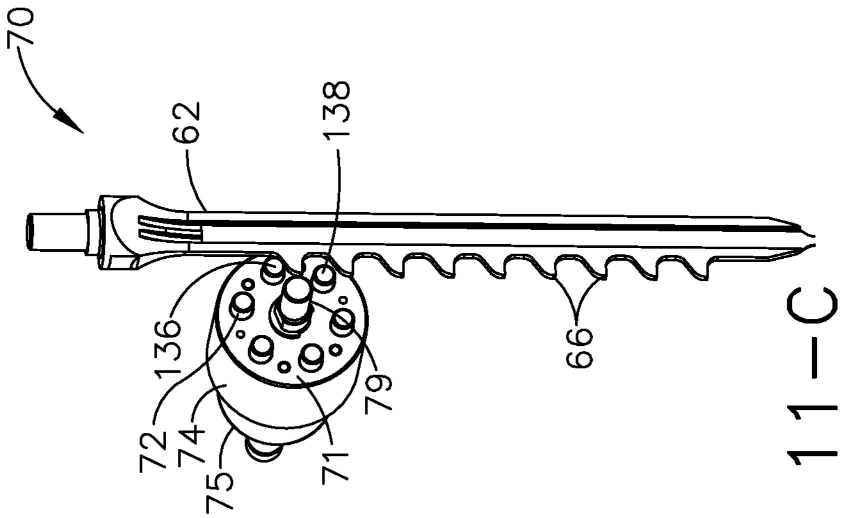
FIG. 11—C
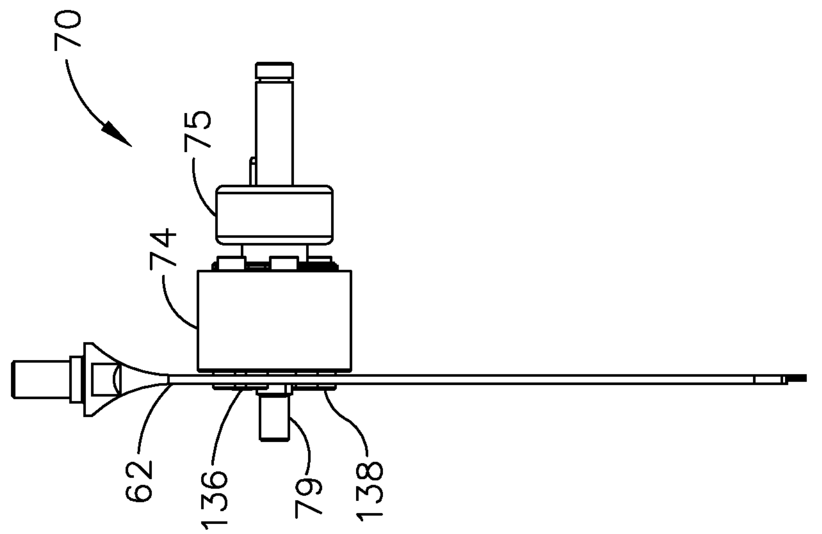
FIG. 11—B
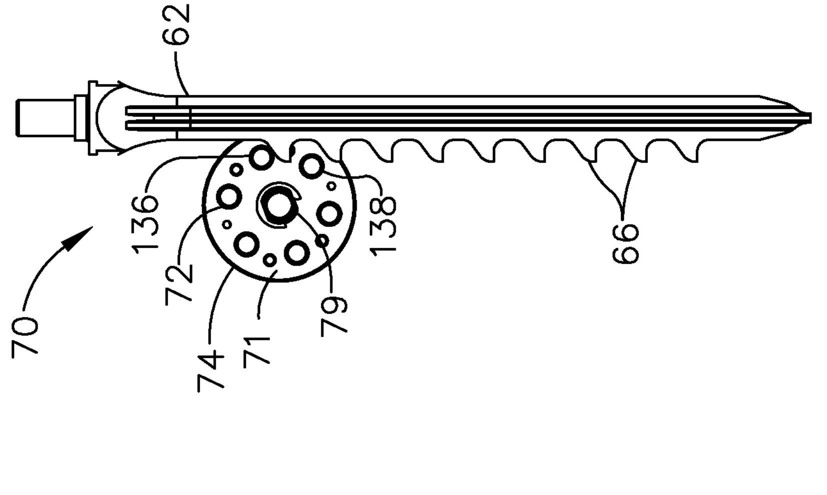
FIG. 11—A

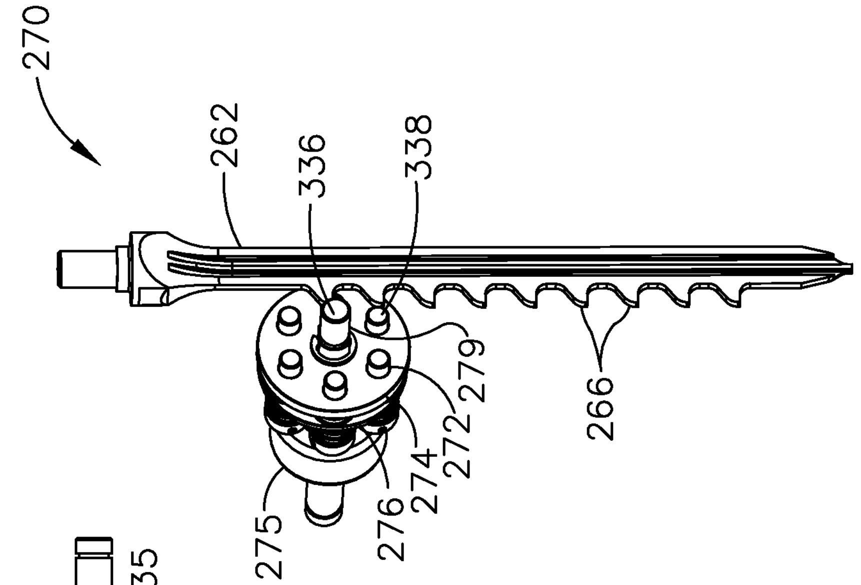
FIG. 25-C
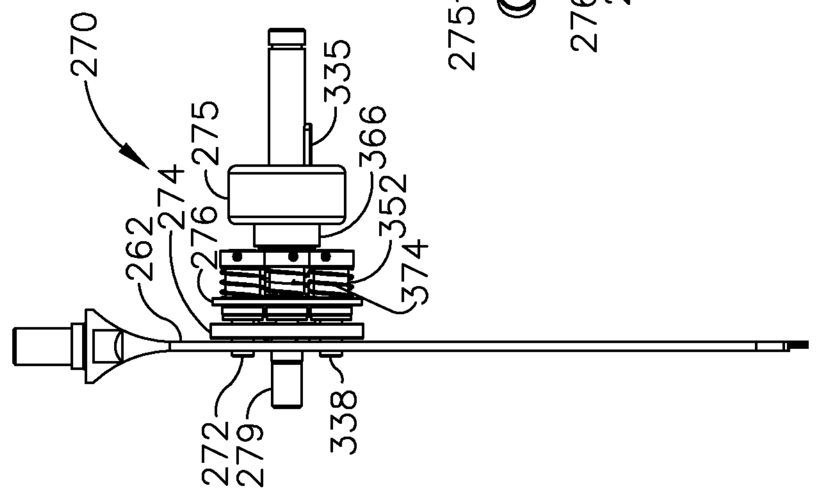
FIG. 25-B
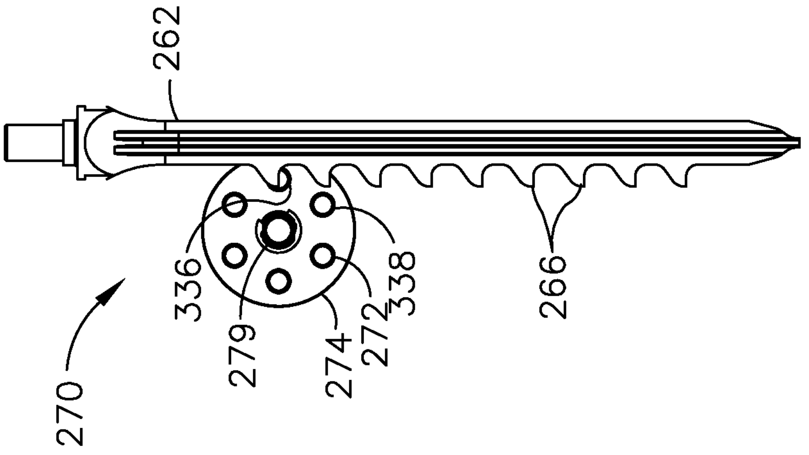
FIG. 25-A

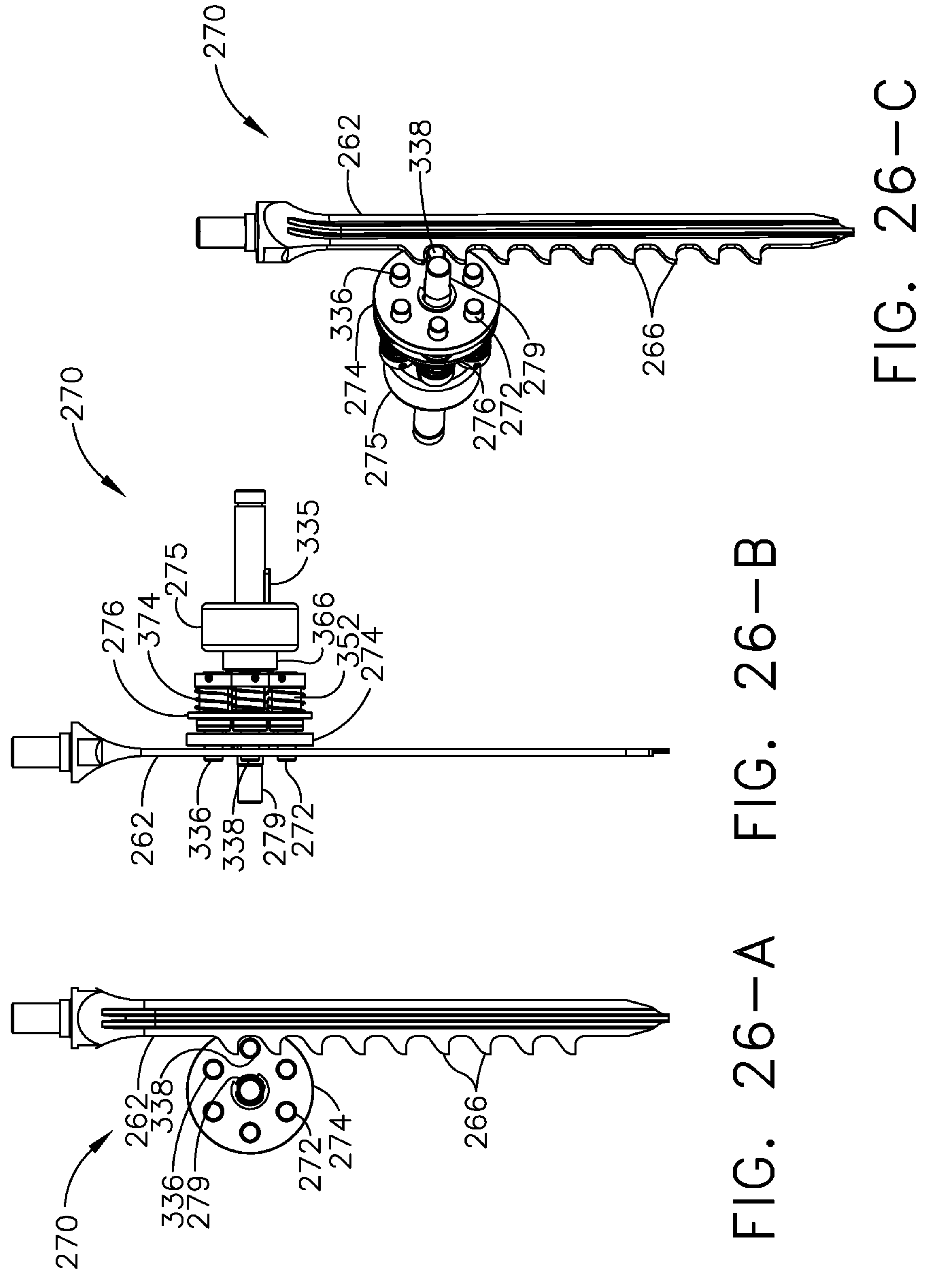
FIG. 26-A
FIG. 26-B
FIG. 26-C

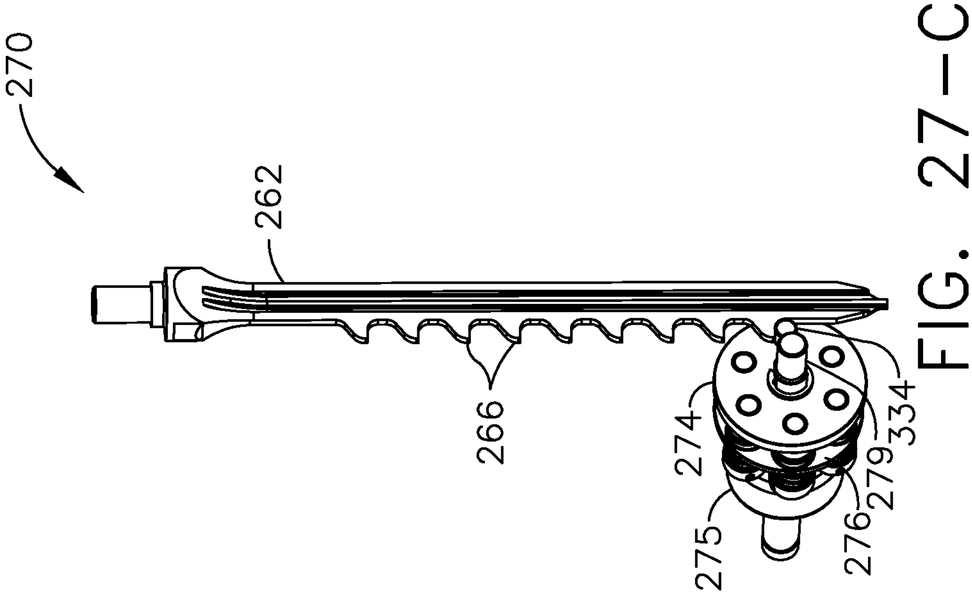
FIG. 27-C
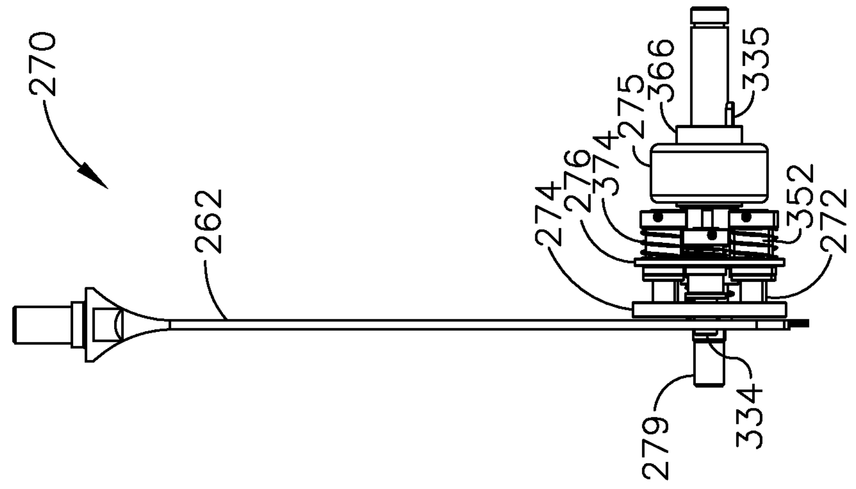
FIG. 27-B
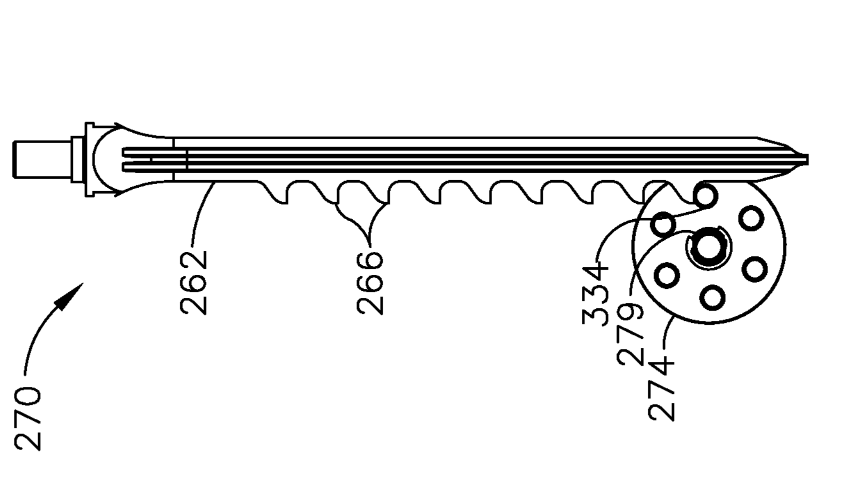
FIG. 27-A

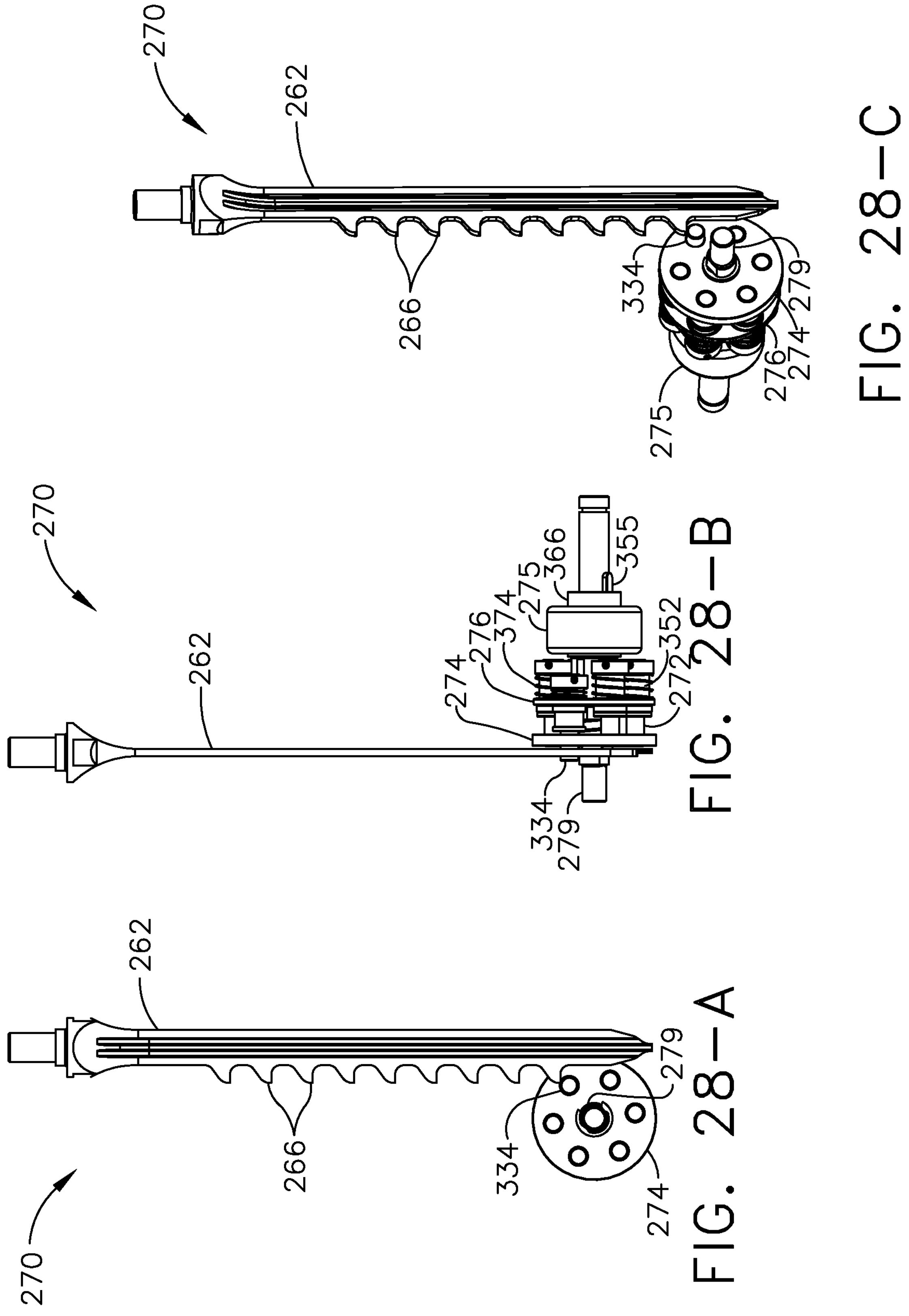
FIG. 28-A
FIG. 28-B
FIG. 28-C

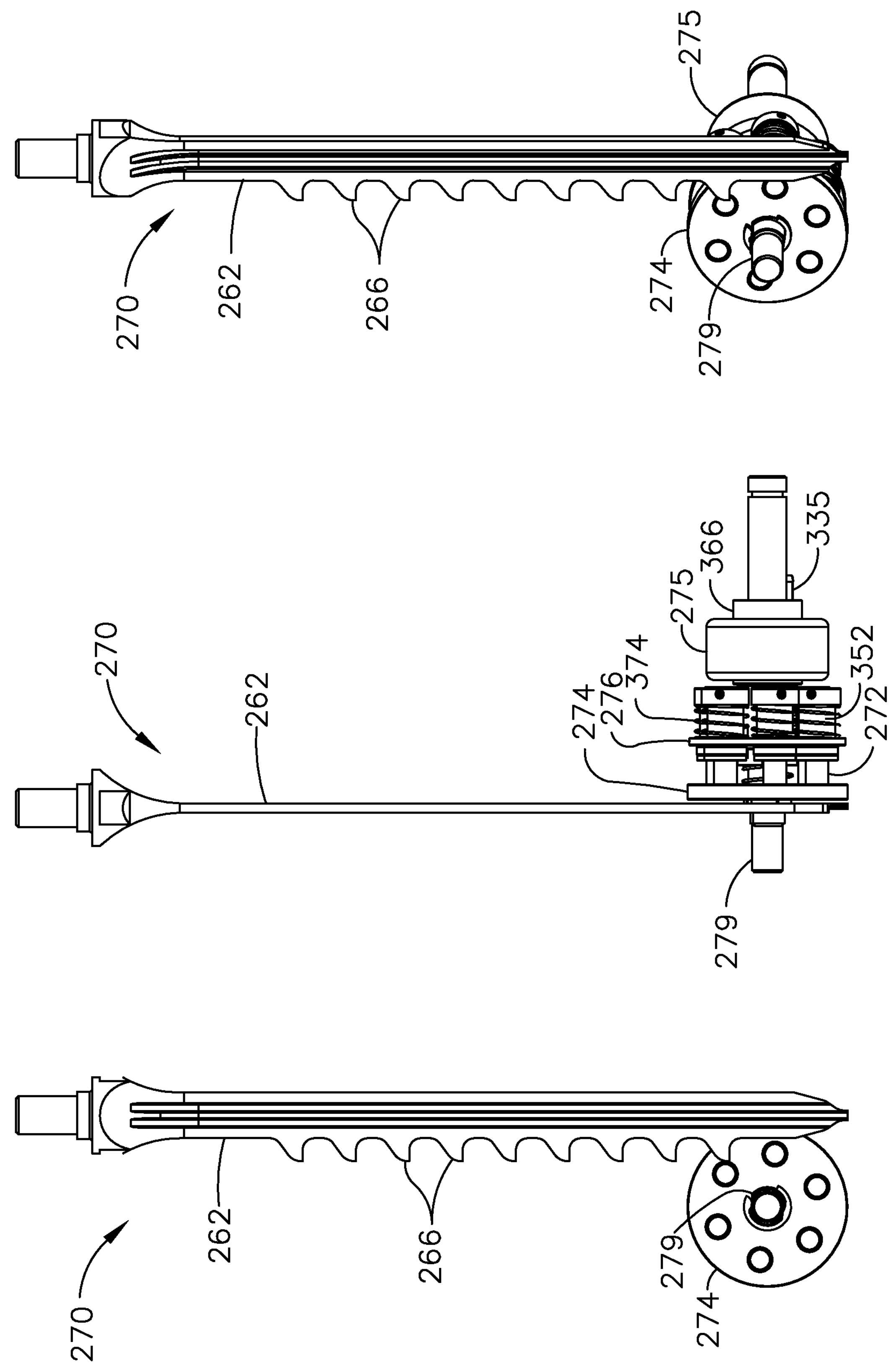
FIG. 29-C
FIG. 29-B
FIG. 29-A

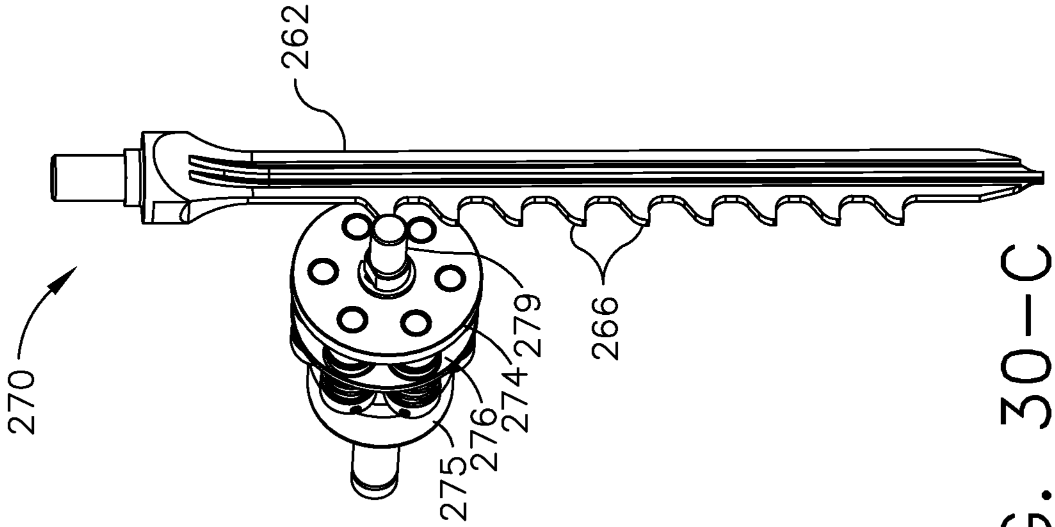
FIG. 30-C
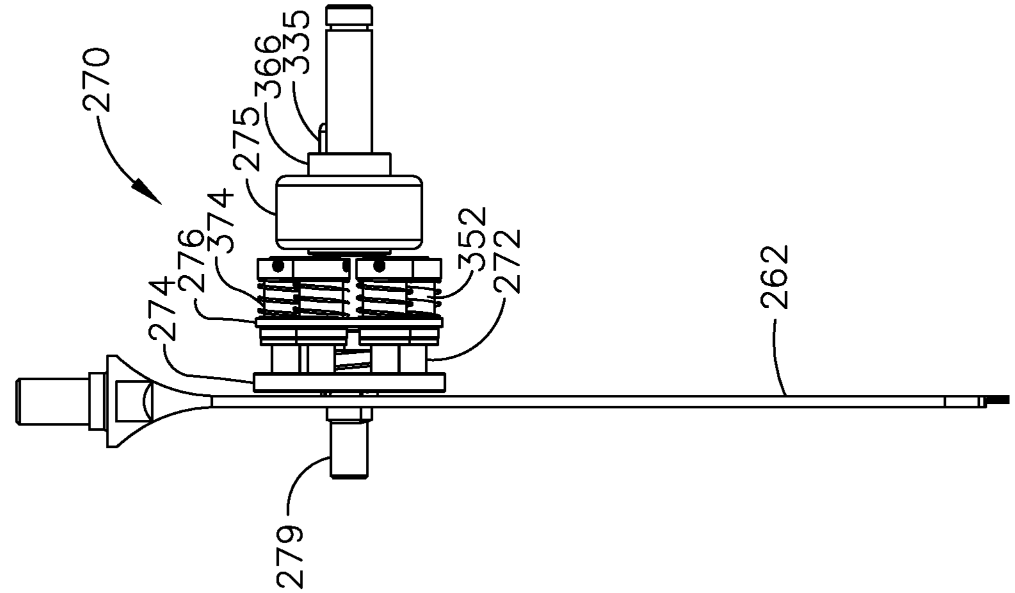
FIG. 30-B
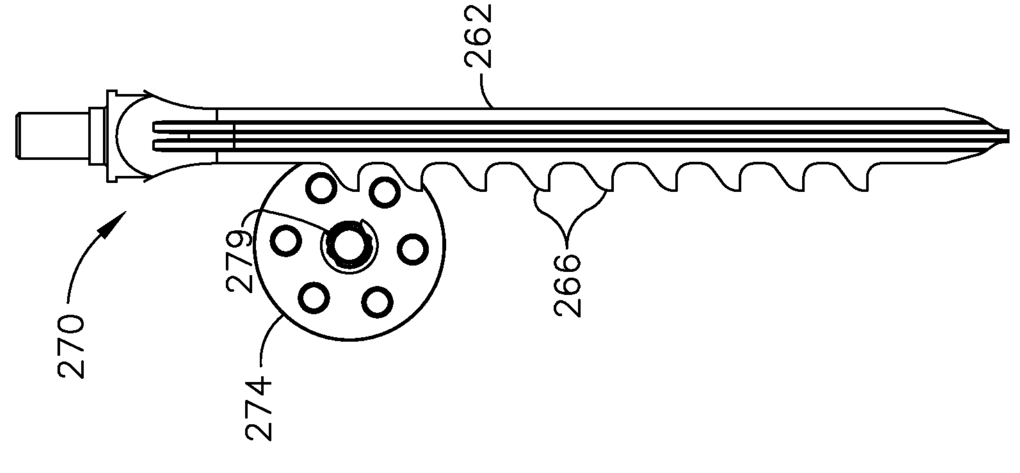
FIG. 30-A

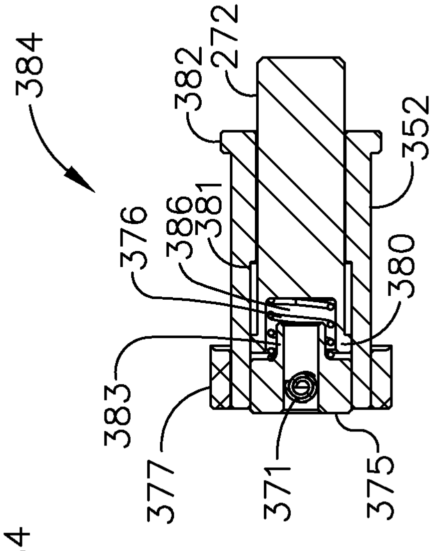
FIG. 31-C
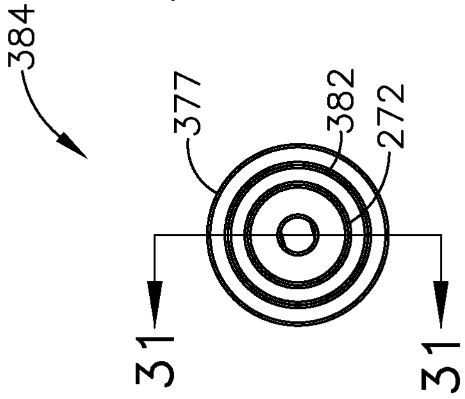
FIG. 31-B
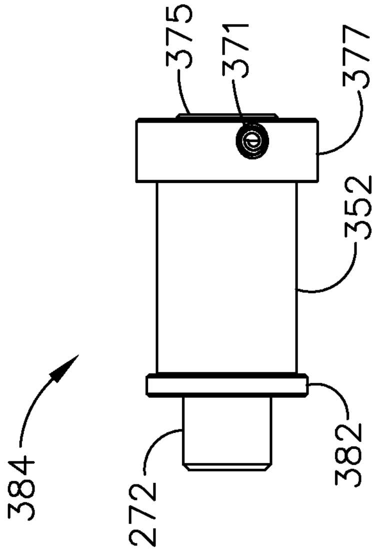
FIG. 31-A

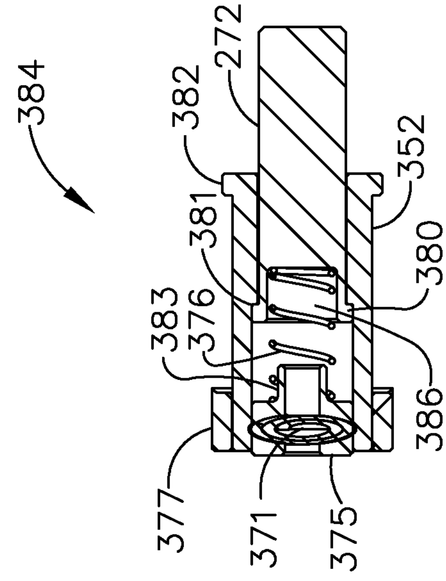
FIG. 32-C
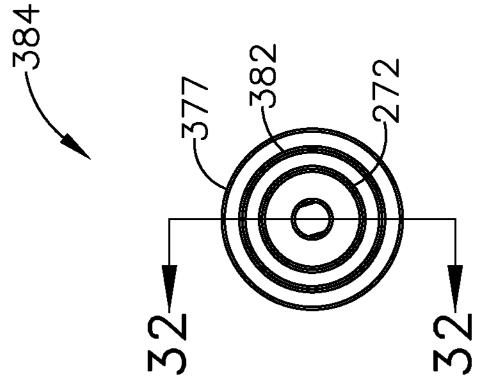
FIG. 32-B
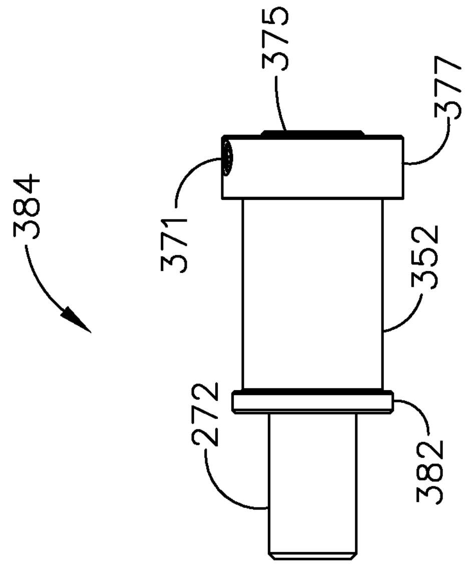
FIG. 32-A

LIFTER FOR FASTENER DRIVING TOOL

CROSS-REFERENCE TO RELATED APPLICATIONS

The present application claims priority to provisional patent application Ser. No. 63/331,993, titled "LIFTER FOR FASTENER DRIVING TOOL," filed on Apr. 18, 2022; and claims priority to provisional patent application Ser. No. 63/451,949, titled "LIFTER FOR FASTENER DRIVING TOOL," filed on Mar. 14, 2023.

TECHNICAL FIELD

The technology disclosed herein relates generally to fastener driving tools and is particularly directed to gas spring fastener driving tools that use a rotary-to-linear lifter. Embodiments are specifically disclosed as a lifter for a fastener driving tool having a plurality of independently movable lifter pins contained in a lifter base, a lifter shaft, and a solenoid to actuate the lifter pins during a lift stroke.

The rotary-to-linear lifter includes a lifter base that contains a shuttle sub-assembly. The shuttle sub-assembly includes a plurality of lifter pins each having forward and rearward spring sets, a one-piece shuttle base, and a plurality of retainers. The shuttle sub-assembly allows each lifter pin to have independent movement due to the configuration of the forward and rearward spring sets. The one-piece shuttle base and the plurality of retainers secures the lifter pins inside the lifter base, and a lifter cover plate is attached to the lifter base with a plurality of fasteners.

The rotary-to-linear lifter also includes a central lifter shaft, a shuttle return spring, a solenoid plunger, and a solenoid. During a lift stroke, the solenoid is actuated, and the plunger forces the lifter cover plate towards the lifter base, compressing the shuttle return spring. This action temporarily slightly compresses the rearward springs of the lifter pins, causing the lifter pins to protrude, or extend, from the top of the lifter base. In this extended position, the lifter pins are able to "catch" and "lift" driver protrusions on a driver as the rotary-to-linear lifter rotates the lifter pins.

If an interference condition (including a jam) occurs during a lift stroke, in which one or more of the driver protrusions interfere with the typical extension of one or more lifter pins, the affected lifter pin(s) do not extend and mostly remain inside the lifter base, in a blocked position. This action is possible because the affected lifter pin's rearward spring is allowed to remain compressed at the interference location. The condition automatically clears, because as the rotary-to-linear lifter continues rotating during the lift stroke, the interference for that pin will clear, and the force of the plunger pushing against the rearward spring will then force that lifter pin to extend out of the lifter base.

At the end of the lift stroke, the individual lifter pin that is holding the driver at its ready position remains extended due to its physical contact with the driver protrusion, which imposes a significant externally applied driver loading force from that physical contact, and which overcomes the 'retracting' loading forces imposed by that pin's rearward spring. The other extended lifter pins are forced to retract into the lifter base by the shuttle spring, as the plunger moves back to its original position. This orientation of the lifter pins remains like this until the next drive stroke occurs. Once the next drive stroke is initiated, the entire lifter sub-assembly begins rotating, and that driver protrusion will "fall off" the extended lifter pin. When that occurs the extended lifter pin is then forced to retract by its individual forward spring. The lifter sub-assembly is now ready to complete its drive stroke, and then to arrange itself for the next lift stroke.

In an alternative embodiment, the lifter pins may be of a multi-piece construction such that each lifter pin includes an external spring, and an internal spring. The lifter pins are arranged in a shuttle and a lifter base on a central lifter shaft. During a lift stroke, a solenoid is engaged, which forces the internal spring to temporarily compress and extend the lifter pins out of the lifter base. If there is interference from one of the driver protrusions of a driver, the internal spring is compressed such that the affected lifter pin remains mostly inside the lifter base, in a blocked position. Once the interference is cleared, the affected lifter pin then extends out as the internal spring uncompresses.

At the end of the lift stroke, the individual lifter pin that is holding the driver at its ready position remains extended due to its physical contact with the driver protrusion, which imposes a significant externally applied driver loading force from that physical contact. The other extended lifter pins are forced to retract into the lifter base by the external spring, as the plunger moves back to its original position. This orientation of the lifter pins remains like this until the next drive stroke occurs. Once the next drive stroke is initiated, the entire lifter sub-assembly begins rotating, and that driver protrusion will "fall off" the extended lifter pin. When that occurs the extended lifter pin is then forced to retract by its individual external spring. The lifter sub-assembly is now ready to complete its drive stroke, and then to arrange itself for the next lift stroke.

STATEMENT REGARDING FEDERALLY SPONSORED RESEARCH OR DEVELOPMENT

None.

BACKGROUND

Fastener driving tools for driving nails or staples are common. Typically, some types of tools use a self-contained pressurized gas source to drive the nails or staples into a workpiece. The tools are typically hoseless with no external pressurized gas source, and also typically include a rotary-to-linear lifter that lifts a driver blade during a return stroke.

A common problem with these types of tools is, if a jam condition occurs, the driver blade can break, causing damage to the tool or a human user. In order to clear a jam, the tool typically must be opened without causing further harm to the tool, or the human user.

SUMMARY

Accordingly, it is an advantage to provide a rotary-to-linear lifter for a hoseless fastener driving tool, in which a plurality of lifter pins each are able to exhibit independent movement during portions of a lifting stroke, and at the initial phase of a driving stroke.

It is another advantage to provide a rotary-to-linear lifter for a hoseless fastener driving tool, in which a plurality of lifter pins each are able to independently move in a longitudinal direction with respect to the lifter's axis of rotation.

It is yet another advantage to provide a rotary-to-linear lifter for a hoseless fastener driving tool in which a plurality of lifter pins each include a forward set of springs and a rearward set of springs, thereby allowing for individual movement of each lifter pin with mechanical biasing as needed, either to lift a driver and accomplish a lifting stroke, or to be moved to a non-interfering position so as to either overcome a jam condition or to undergo a driving stroke.

It is still another advantage to provide a rotary-to-linear lifter for a hoseless fastener driving tool in which a plurality of lifter pins each includes an external set of springs and an internal set of springs, thereby allowing for individual movement of each lifter pin with mechanical biasing as needed, either to lift a driver and accomplish a lifting stroke, or to be moved to a non-interfering position so as to either overcome a jam condition or to undergo a driving stroke.

Additional advantages and other novel features will be set forth in part in the description that follows and in part will become apparent to those skilled in the art upon examination of the following or may be learned with the practice of the technology disclosed herein.

To achieve the foregoing and other advantages, and in accordance with one aspect, a lifter for a fastener driving machine is provided, which lifter comprises: a lifter shaft including a first end and a second end, and a longitudinal axis that extends between the first end and the second end; a linear actuator that is positioned proximal to the first end of the lifter shaft; a lifter assembly, including: a first cover that is positioned proximal to the second end of the lifter shaft, the first cover exhibiting a first plurality of openings proximal to an outer perimeter of the first cover; a second cover that is positioned proximal to the solenoid, the second cover exhibiting a second plurality of openings proximal to an outer perimeter of the second cover, the lifter shaft being in mechanical communication with at least one of the first cover and the second cover; at least one return spring that provides a force in a direction that is substantially parallel to the longitudinal axis of the lifter shaft, and is in mechanical communication with at least one of the linear actuator and the second cover; and a plurality of lifter pins that are seated in the second plurality of openings and that are movable in a direction substantially parallel to the longitudinal axis; wherein: (i) a first plurality of lifter pin springs that mechanically bias each of the lifter pins so that at least one of the plurality of lifter pins moves to an extended position through at least one of the first plurality of openings in the direction that is substantially parallel to the longitudinal axis, for a lifting stroke by the lifter assembly; and (ii) a second plurality of lifter pin springs that mechanically bias each of the lifter pins so that at least one of the plurality of lifter pins moves to a retracted position that, in the direction that is substantially parallel to the longitudinal axis, is opposite the extended position, for a driving stroke by the lifter assembly.

In accordance with another aspect, a lifter for a fastener driving machine is provided, which lifter comprises: a lifter shaft including a first end and a second end, and exhibiting a longitudinal axis that extends between the first end and the second end; a linear actuator that is positioned proximal to the first end of the lifter shaft; a lifter assembly, including: a first holder that is positioned proximal to the second end of the lifter shaft, the first holder exhibiting a first plurality of openings, the first plurality of openings being positioned in a circular pattern; a second holder that is positioned proximal to the linear actuator, the second holder exhibiting a second plurality of openings, the second plurality of openings being positioned in a circular pattern, the lifter shaft being in mechanical communication with at least one of the first holder and the second holder; at least one return spring that provides a force in a direction that is substantially parallel to the longitudinal axis of the lifter shaft, and is in mechanical communication with at least one of the linear actuator and the second holder; a plurality of lifter pins that are seated in the second plurality of openings and that are movable in a direction substantially parallel to the longitudinal axis; and a plurality of lifter pin springs that bias each of the lifter pins in the direction that is substantially parallel to the longitudinal axis, so that each of the lifter pins: (i) is mechanically biased to move to an extended position through one of the first plurality of openings for a lifting stroke by the lifter assembly; and (ii) is mechanically biased to move to a retracted position for a driving stroke by the lifter assembly; wherein, (iii) each individual of the plurality of lifter pins is able to move to a blocked position at a beginning phase of the lifting stroke; and a driver having a path of movement that is substantially perpendicular to the lifter longitudinal axis, the driver including a plurality of protrusions along at least one longitudinal edge of the driver, such that the lifter pins that are in the extended position are in a position to make physical contact with the driver protrusions, so as to move the driver toward a ready position as the lifter assembly rotates; wherein: (a) if there is no interference condition between a properly aligned driver and any of the lifter pins, then at the beginning phase of the lifting stroke, each of the plurality of lifter pins is moved to the extended position; or (b) if there is an interference condition between a misaligned driver and at least one of the lifter pins, then at the beginning phase of the lifting stroke, the at least one of the plurality of lifter pins exhibits independent movement and is moved to the blocked position, in which the at least one of the lifter pins does not fully move to the extended position.

In accordance with yet another aspect, a method for lifting a driver used in a fastener driving machine is provided, in which the method comprises: providing a lifter shaft including a first end and a second end, and exhibiting a longitudinal axis that extends between the first end and the second end; providing a linear actuator that is positioned proximal to the first end of the lifter shaft; providing a lifter assembly, including: a first holder that is positioned proximal to the second end of the lifter shaft, the first holder exhibiting a first plurality of openings, the first plurality of openings being positioned in a circular pattern; a second holder that is positioned proximal to the linear actuator, the second holder exhibiting a second plurality of openings, the second plurality of openings being positioned in a circular pattern, the lifter shaft being in mechanical communication with at least one of the first holder and the second holder; at least one return spring that provides a force in a direction that is substantially parallel to the longitudinal axis of the lifter shaft, and is in mechanical communication with at least one of the linear actuator and the second holder; a plurality of lifter pins that are seated in the second plurality of openings and that are movable in a direction substantially parallel to the longitudinal axis; and a plurality of lifter pin springs that bias each of the lifter pins in the direction that is substantially parallel to the longitudinal axis, so that each of the lifter pins: (i) for a lifting stroke by the lifter assembly, biasing the at least one of the lifter pins for moving to an extended position through one of the first plurality of openings; (ii) for a driving stroke by the lifter assembly, biasing the at least one of the lifter pins for moving to a retracted position; and (iii) at a beginning phase of the lifting stroke, if any of individual of the plurality of lifter pins is blocked because of an interference condition, then biasing the individual of the plurality of lifter pins for moving to a blocked position that is only partially extended; and providing a driver having a path of movement that is substantially perpendicular to the lifter longitudinal axis, the driver including a plurality of protrusions along at least one longitudinal edge of the driver, such that the lifter pins that are in the extended position are in a position to make physical contact with the driver protrusions, for moving the driver toward a ready position as the lifter assembly rotates; wherein: (a) if there is no interference condition between a properly aligned driver and any of the lifter pins, then at the beginning phase of the lifting stroke, moving each of the plurality of lifter pins to the extended position; or (b) if there is an interference condition between a misaligned driver and at least one of the lifter pins, then, at the beginning phase of the lifting stroke, allowing the at least one of the lifter pins to exhibit independent movement, thereby moving the independently movable lifter pin to the blocked position that is only partially extended.

In accordance with still another aspect, a lifter for a fastener driving machine is provided, which lifter comprises: a lifter shaft including a first end and a second end, and a longitudinal axis that extends between the first end and the second end; a solenoid that is positioned proximal to the first end of the lifter shaft, the solenoid including a movable plunger; a lifter assembly, including: a hollow barrel having a first cover that is positioned proximal to the second end of the lifter shaft, the first cover exhibiting a first plurality of openings proximal to an outer perimeter of the first cover; a second cover that is positioned proximal to the solenoid, the second cover exhibiting a second plurality of openings proximal to an outer perimeter of the second cover, the lifter shaft being in mechanical communication with at least one of the first cover and the second cover; a plurality of lifter pins that are seated in the second plurality of openings and that are movable in a direction substantially parallel to the longitudinal axis; and a movable shuttle sub-assembly, including: a shuttle base that substantially contains the plurality of lifter pins; and a return spring that provides a force in a direction that is substantially parallel to the longitudinal axis of the lifter shaft, and is in mechanical communication with at least one of the plunger and the shuttle base; wherein: during a lift stroke, the solenoid is actuated, the plunger is forced towards the second end, the return spring is compressed towards the second end, and at least a majority of the plurality of lifter pins are forced to protrude from the first plurality of openings of the first cover; and during a drive stroke, the solenoid is not actuated, the plunger is moved to a position more proximal to the first end by the return spring, and the plurality of lifter pins are substantially contained inside the hollow barrel so as to not interfere with the drive stroke.

In accordance with a further aspect, a lifter for a fastener driving machine, the lifter comprising: a rotatable lifter shaft including a first end and a second end, and a longitudinal axis that extends between the first end and the second end; a linear actuator that is positioned proximal to the first end of the lifter shaft; a rotatable lifter assembly, including: a first cover that is positioned proximal to the second end of the lifter shaft, the first cover exhibiting a first plurality of openings proximal to an outer perimeter of the first cover; a movable second cover that is positioned proximal to the linear actuator, the second cover including a plurality of hollow cylinders with openings proximal to an outer perimeter of the second cover, the lifter shaft being in mechanical communication with at least one of the first cover and the second cover; at least one return spring that provides a force in a direction that is substantially parallel to the longitudinal axis of the lifter shaft, and is in mechanical communication with at least one of the linear actuator and the second cover; a plurality of lifter pins that are seated in the plurality of hollow cylinders with openings and that are movable in a direction substantially parallel to the longitudinal axis; a first plurality of lifter pin springs that mechanically bias each of the plurality of lifter pins so that at least one of the plurality of lifter pins moves to an extended position through at least one of the first plurality of openings in the direction that is substantially parallel to the longitudinal axis, for a lifting stroke by the lifter assembly; and a second plurality of lifter pin springs that mechanically bias each of the plurality of lifter pins so that at least one of the plurality of lifter pins moves to a retracted position that, in the direction that is substantially parallel to the longitudinal axis, is opposite the extended position, for a driving stroke by the lifter assembly.

In accordance with a yet further aspect, a lifter for a fastener driving machine, the lifter comprising: a rotatable lifter shaft including a first end and a second end, and a longitudinal axis that extends between the first end and the second end; a linear actuator that is positioned proximal to the first end of the lifter shaft; a rotatable lifter assembly, including: a first cover that is positioned proximal to the second end of the lifter shaft, the first cover exhibiting a first plurality of openings proximal to an outer perimeter of the first cover; a movable second cover that is positioned proximal to the linear actuator, the second cover including a plurality of hollow cylinders with openings proximal to an outer perimeter of the second cover, the lifter shaft being in mechanical communication with at least one of the first cover and the second cover; at least one return spring that provides a force in a direction that is substantially parallel to the longitudinal axis of the lifter shaft, and is in mechanical communication with at least one of the linear actuator and the second cover; a plurality of lifter pins that are seated in the plurality of hollow cylinders with openings and that are movable in a direction substantially parallel to the longitudinal axis; and a driver having a path of movement that is substantially perpendicular to the lifter longitudinal axis, the driver including a plurality of protrusions along at least one longitudinal edge of the driver, such that the plurality of lifter pins that are in the extended position are in a position to make physical contact with the driver protrusions, so as to move the driver toward a ready position as the lifter assembly rotates; wherein: (a) if there is no interference condition between a properly aligned driver and any of the plurality of lifter pins, then at the beginning phase of the lifting stroke, each of the plurality of lifter pins is moved to the extended position; or (b) if there is an interference condition between a misaligned driver and at least one of the plurality of lifter pins, then at the beginning phase of the lifting stroke, the at least one of the plurality of lifter pins exhibits independent movement and is moved to the blocked position, in which the at least one of the plurality of lifter pins does not fully move to the extended position.

In accordance with a still further aspect, a lifter for a fastener driving machine is provided, which lifter comprises: a lifter shaft including a first end and a second end, and exhibiting a longitudinal axis that extends between the first end and the second end; a linear actuator that is positioned proximal to the first end of the lifter shaft; a rotatable lifter subassembly, including: a holder that is positioned proximal to the linear actuator, the holder exhibiting a second plurality of openings; at least one guide that is positioned proximal to the holder, the at least one guide exhibiting a first plurality of openings; at least one return spring that provides a force in a direction that is substantially parallel to the longitudinal axis of the lifter shaft; a plurality of lifter pins that are seated in the second plurality of openings and that are movable in a direction substantially parallel to the longitudinal axis; and a plurality of lifter pin springs that bias each of the lifter pins in the direction that is substantially parallel to the longitudinal axis; and a driver having a path of movement that is substantially perpendicular to the lifter longitudinal axis, the driver including a plurality of driver protrusions along at least one longitudinal edge of the driver, the driver being positioned proximal to the rotatable lifter subassembly.

In accordance with an additional aspect, a lifter for a fastener driving machine is provided, which lifter comprises: a lifter shaft including a first end and a second end, and a longitudinal axis that extends between the first end and the second end; a linear actuator that is positioned proximal to the first end of the lifter shaft; a rotatable lifter subassembly, including: a holder that is positioned proximal to the linear actuator, the holder exhibiting a second plurality of openings; at least one guide that is positioned proximal to the holder, the at least one guide exhibiting a first plurality of openings; at least one return spring that provides a force in a direction that is substantially parallel to the longitudinal axis of the lifter shaft; and a plurality of lifter pins that are seated in the second plurality of openings and that are movable in a direction substantially parallel to the longitudinal axis.

In accordance with another additional aspect, a lifter for a fastener driving machine is provided, which lifter comprises: a lifter shaft including a first end and a second end, and exhibiting a longitudinal axis that extends between the first end and the second end; a linear actuator that is positioned proximal to the first end of the lifter shaft; a lifter subassembly, including: a guide that is positioned proximal to the second end of the lifter shaft, the guide exhibiting a first plurality of openings, the first plurality of openings being positioned in a circular pattern; a holder that is positioned proximal to the linear actuator, the holder exhibiting a second plurality of openings, the second plurality of openings being positioned in a circular pattern, the lifter shaft being in mechanical communication with at least one of the first holder and the holder; at least one return spring that provides a force in a direction that is substantially parallel to the longitudinal axis of the lifter shaft, and is in mechanical communication with at least one of the linear actuator and the holder; a plurality of lifter pins that are seated in the second plurality of openings and that are movable in a direction substantially parallel to the longitudinal axis; and a plurality of lifter pin springs that bias each of the lifter pins in the direction that is substantially parallel to the longitudinal axis, so that each of the lifter pins: (i) is mechanically biased to move to an extended position through one of the first plurality of openings for a lifting stroke by the lifter subassembly; and (ii) is mechanically biased to move to a retracted position for a driving stroke by the lifter subassembly; wherein, (iii) each individual of the plurality of lifter pins is able to move to a blocked position at a beginning phase of the lifting stroke; and a driver having a path of movement that is substantially perpendicular to the lifter shaft longitudinal axis, the driver including a plurality of protrusions along at least one longitudinal edge of the driver, such that the lifter pins that are in the extended position are in a position to make physical contact with the driver protrusions, so as to move the driver toward a ready position as the lifter subassembly rotates; wherein: (a) if there is an interference condition between a misaligned driver and at least one of the lifter pins, then at the beginning phase of the lifting stroke, the at least one of the plurality of lifter pins exhibits independent movement and does not fully move to the extended position, but instead moves to the blocked position; and (b) the at least one of the plurality of lifter pins at the blocked position can continue moving along a surface of the driver, as the lifter subassembly rotates, until reaching an unblocked position, at which point the at least one of the plurality of lifter pins makes contact with the at least one of the plurality of protrusions of the driver and begins to force the driver into the lifting stroke.

In accordance with still another additional aspect, a lifter for a fastener driving machine is provided, which lifter comprises: a rotatable lifter shaft including a first end and a second end, and a longitudinal axis that extends between the first end and the second end; a linear actuator that is positioned proximal to the first end of the lifter shaft; a rotatable lifter subassembly, including: a first cover that is positioned proximal to the second end of the lifter shaft, the first cover exhibiting a first plurality of openings proximal to an outer perimeter of the first cover; a movable second cover that is positioned proximal to the linear actuator, the second cover including a plurality of hollow cylinders with openings proximal to an outer perimeter of the second cover, the lifter shaft being in mechanical communication with at least one of the first cover and the second cover; at least one return spring that provides a force in a direction that is substantially parallel to the longitudinal axis of the lifter shaft, and is in mechanical communication with at least one of the linear actuator and the second cover; a plurality of lifter pins that are seated in the plurality of hollow cylinders with openings and that are movable in a direction substantially parallel to the longitudinal axis; and a driver having a path of movement that is substantially perpendicular to the lifter longitudinal axis, the driver including a plurality of protrusions along at least one longitudinal edge of the driver, such that the plurality of lifter pins that are in the extended position are in a position to make physical contact with the driver protrusions, so as to move the driver toward a ready position as the lifter subassembly rotates; wherein: at the end of a lifting stroke, one of the plurality of lifter pins is held in the extended position by making physical contact with one of the plurality of protrusions of the driver and holding the driver until a new driving stroke is initiated; and at the end of the lifting stroke, the other pins of the plurality of lifter pins are moved to a retracted position, so that the driver is clear for the new driving stroke.

Still other advantages will become apparent to those skilled in this art from the following description and drawings wherein there is described and shown a preferred embodiment in one of the best modes contemplated for carrying out the technology. As will be realized, the technology disclosed herein is capable of other different embodiments, and its several details are capable of modification in various, obvious aspects all without departing from its principles. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the technology disclosed herein, and together with the description and claims serve to explain the principles of the technology. In the drawings:

FIG. 6-A is a front elevational view of a driver and the lifter of FIG. 1, at the end of a lift stroke in the ready position, in which a single lifter pin is holding the driver.

FIG. 6-B is a left side elevational view of the driver and the lifter of FIG. 6-A.

FIG. 6-C is a perspective view of the driver and the lifter of FIG. 6-A.

FIG. 7-A is a front elevational view of the driver and the lifter of FIG. 1, in a position (as the lifter is rotating) when the driver is ready to fall off of the pin and drive a fastener.

FIG. 7-B is a left side elevational view of the driver and the lifter of FIG. 7-A.

FIG. 7-C is a perspective view of the driver and the lifter of FIG. 7-A.

FIG. 8-A is a front elevational view of a driver and the lifter of FIG. 1, at the beginning of a drive stroke.

FIG. 8-B is a left side elevational view of the driver and the lifter of FIG. 8-A.

FIG. 8-C is a perspective view of the driver and the lifter of FIG. 8-A.

FIG. 9-A is a front elevational view of a driver and the lifter of FIG. 1, at the end of a drive stroke.

FIG. 9-B is a left side elevational view of the driver and the lifter of FIG. 9-A.

FIG. 9-C is a perspective view of the driver and the lifter of FIG. 9-A.

FIG. 10-A is a front elevational view of a driver and the lifter of FIG. 1, at the beginning of a lift stroke with driver interference.

FIG. 10-B is a left side elevational view of the driver and the lifter of FIG. 10-A.

FIG. 10-C is a perspective view of the driver and the lifter of FIG. 10-A.

FIG. 11-A is a front elevational view of a driver and the lifter of FIG. 1, at the start of a lift stroke after clearing the driver interference.

FIG. 11-B is a left side elevational view of the driver and the lifter of FIG. 11-A.

FIG. 11-C is a perspective view of the driver and the lifter of FIG. 11-A.

FIG. 25-A is a front elevational view of a driver and the first alternative embodiment lifter of FIG. 20, at the beginning of a lift stroke with driver interference.

FIG. 25-B is a left side elevational view of the driver and the first alternative embodiment lifter of FIG. 25-A.

FIG. 25-C is a perspective view of the driver and the first alternative embodiment lifter of FIG. 25-A.

FIG. 26-A is a front elevational view of a driver and the first alternative embodiment lifter of FIG. 20, at the start of a lift stroke after clearing the driver interference.

FIG. 26-B is a left side elevational view of the driver and the first alternative embodiment lifter of FIG. 26-A.

FIG. 26-C is a perspective view of the driver and the first alternative embodiment lifter of FIG. 26-A.

FIG. 27-A is a front elevational view of a driver and the first alternative embodiment lifter of FIG. 20, at the end of a lift stroke in the ready position, in which a single lifter pin is holding the driver.

FIG. 27-B is a left side elevational view of the driver and the first alternative embodiment lifter of FIG. 27-A.

FIG. 27-C is a perspective view of the driver and the first alternative embodiment lifter of FIG. 27-A.

FIG. 28-A is a front elevational view of the driver and the first alternative embodiment lifter of FIG. 20, in a position (as the lifter is rotating) when the driver is ready to fall off of the pin and drive a fastener.

FIG. 28-B is a left side elevational view of the driver and the first alternative embodiment lifter of FIG. 28-A.

FIG. 28-C is a perspective view of the driver and the first alternative embodiment lifter of FIG. 28-A.

FIG. 29-A is a front elevational view of a driver and the first alternative embodiment lifter of FIG. 20, at the beginning of a drive stroke.

FIG. 29-B is a left side elevational view of the driver and the first alternative embodiment lifter of FIG. 29-A.

FIG. 29-C is a perspective view of the driver and the first alternative embodiment lifter of FIG. 29-A.

FIG. 30-A is a front elevational view of a driver and the first alternative embodiment lifter of FIG. 20, at the end of a drive stroke.

FIG. 30-B is a left side elevational view of the driver and the first alternative embodiment lifter of FIG. 30-A.

FIG. 30-C is a perspective view of the driver and the first alternative embodiment lifter of FIG. 30-A.

FIG. 31-A is a right side view of one of the lifter pins of the first alternative embodiment lifter of FIG. 20, in which the lifter pin is retracted.

FIG. 31-B is a top view of one of the lifter pins of the first alternative embodiment lifter of FIG. 31-A.

FIG. 31-C is a cutaway view along the line 31-31 of the lifter of FIG. 31-B, in which the lifter pin is retracted.

FIG. 32-A is a right side view of a lifter pin of the first alternative embodiment lifter of FIG. 20, in which the lifter pin is extended.

FIG. 32-B is a top view of the lifter pin of the first alternative embodiment lifter of FIG. 32-A.

FIG. 32-C is a cutaway view along the line 32-32 of the lifter of FIG. 32-B, in which the lifter pin is extended.

FIG. 37-B is a right side cutaway view of the lifter of FIG. 20 without the lifter pins, in which the lifter is in an extended state.

DETAILED DESCRIPTION

Figure 2:
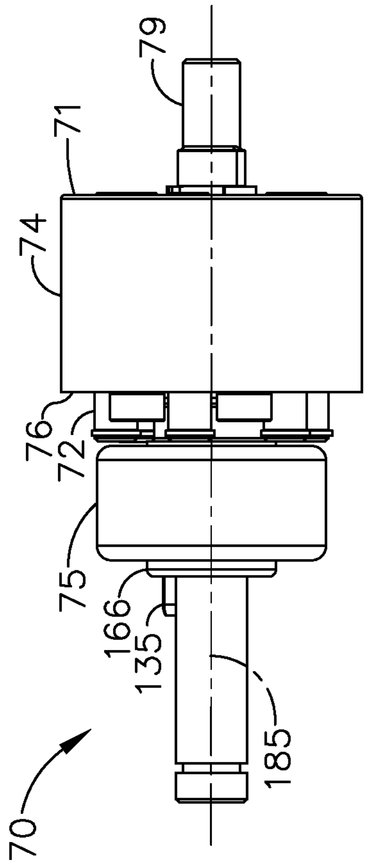
FIG. 2 is a left side view of the lifter of FIG. 1, in which the lifter pins are not extended.

Reference will now be made in detail to the present preferred embodiment, an example of which is illustrated in the accompanying drawings, wherein like numerals indicate the same elements throughout the views.

It is to be understood that the technology disclosed herein is not limited in its application to the details of construction and the arrangement of components set forth in the following description or illustrated in the drawings. The technology disclosed herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," or "mounted," and variations thereof herein are used broadly and encompass direct and indirect connections, couplings, or mountings. In addition, the terms "connected" or "coupled" and variations thereof are not restricted to physical or mechanical connections or couplings. Furthermore, the terms "communicating with" or "in communications with" refer to two different physical or virtual elements that somehow pass signals or information between each other, whether that transfer of signals or information is direct or whether there are additional physical or virtual elements therebetween that are also involved in that passing of signals or information. Moreover, the term "in communication with" can also refer to a mechanical, hydraulic, or pneumatic system in which one end (a "first end") of the "communication" may be the "cause" of a certain impetus to occur (such as a mechanical movement, or a hydraulic or pneumatic change of state) and the other end (a "second end") of the "communication" may receive the "effect" of that movement/change of state, whether there are intermediate components between the "first end" and the "second end," or not. If a product has moving parts that rely on magnetic fields, or somehow detects a change in a magnetic field, or if data is passed from one electronic device to another by use of a magnetic field, then one could refer to those situations as items that are "in magnetic communication with" each other, in which one end of the "communication" may induce a magnetic field, and the other end may receive that magnetic field, and be acted on (or otherwise affected) by that magnetic field.

The terms "first" or "second" preceding an element name, e.g., first inlet, second inlet, etc., are used for identification purposes to distinguish between similar or related elements, results or concepts, and are not intended to necessarily imply order, nor are the terms "first" or "second" intended to preclude the inclusion of additional similar or related elements, results or concepts, unless otherwise indicated.

First Embodiment

Figure 1:
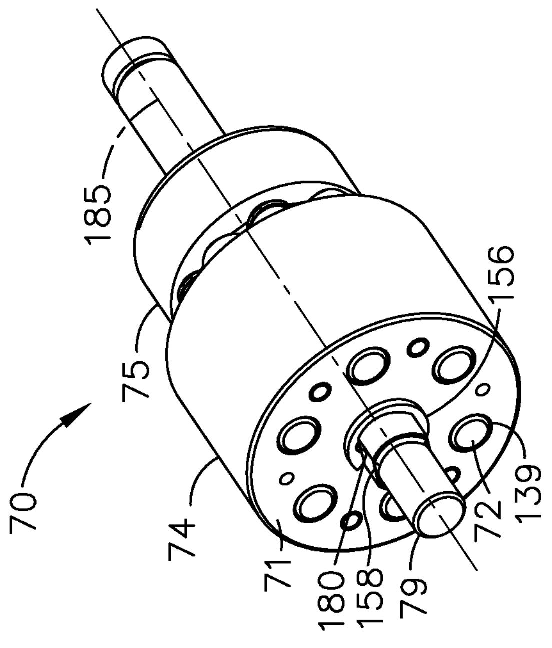
FIG. 1 is a right perspective view of a "First Embodiment" rotary-to-linear lifter for a fastener driving tool, as constructed according to the principles of the technology disclosed herein.

Referring now to FIG. 1, a lifter sub-assembly ("S/A") for a fastener driving tool is generally designated by the reference numeral 70, and the lifter S/A is a rotary-to-linear lifter. A lifter shaft 79 and a power transmission sub-assembly (not shown) rotate the lifter S/A 70. A lifter base 74 is preferably a hollow cylinder or barrel and is attached to a lifter end plate 71 (also sometimes referred to herein as a "first cover" or, simply, a "guide") which is attached to the lifter shaft 79, and covers a shuttle sub-assembly ("S/A") 150 (see FIG. 4), also sometimes referred to herein as a "lifter extension sub-assembly." It will be understood that the lifter base 74 and the lifter end plate/guide 71 could be formed as a unitary part, if desired. It will be understood that the lifter in FIG. 1 is designed to operate as part of a fastener driving tool, and that this lifter is part of a machine that sometimes will be referred to herein as a "fastener driving machine."

The lifter base 74 is proximal to the second end of the lifter shaft 79. The lifter end plate 71 (the "guide") has a plurality of through-holes 139 proximal to a perimeter of the lifter base (i.e., near the outer perimeter of the end plate/guide 71), and a central opening 180 for the lifter shaft 79. In this view, the lifter S/A 70 is shown on the side nearest to a driver (or "driver blade") 62 (not shown in this view). A solenoid 75 is also attached to the lifter shaft 79, distally from the driver 62. The driver 62 exhibits a plurality of protrusions or teeth 66 (see FIG. 6-A).

Figure 3:
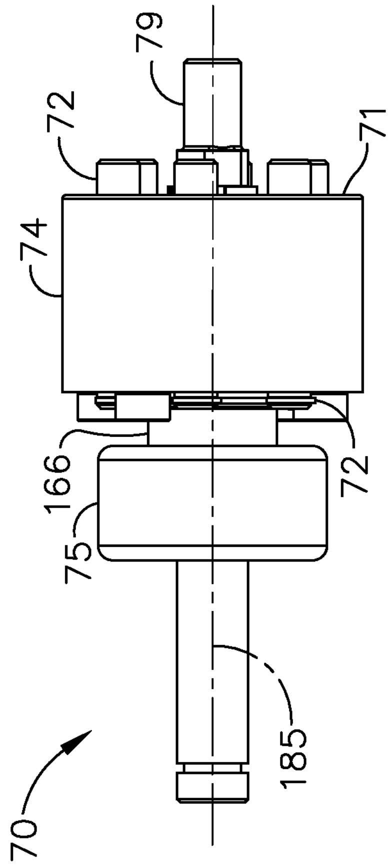
FIG. 3 is a left side view of the lifter of FIG. 1, in which the lifter pins are extended.

The solenoid 75 is used to actuate a plurality of lifter pins or extensions 72 during a return stroke of the driver 62. FIG. 2 depicts the lifter pins 72 in a "retracted" state. The retracted state is typically used for a drive stroke of the tool. In the retracted state, the faces of the lifters pin 72 are nominally co-planar with the face of the end plate/guide 71, and are substantially contained within the lifter base 74 (i.e., the hollow barrel). FIG. 3 depicts the lifter pins 72 in an "extended" state. In the extended state, the lifter pins 72 extend through and past the plurality of through-holes 139. The extended state is typically used for a return stroke.

Referring now to FIG. 2, the retracted state of the lifter S/A 70 is depicted. In FIG. 2, the solenoid 75 is not actuated, and the lifter pins 72 are in a retracted position where the faces of the lifter pins are nominally co-planar with the face of the end plate/guide 71. The lifter pins 72 are visible between the lifter first cover (the "guide") 71 and the solenoid 75. A lower solenoid plunger portion 166 is depicted "below" the solenoid 75 (in this view).

Referring now to FIG. 3, the extended state of the lifter S/A 70 is depicted. In FIG. 3, the solenoid 75 is actuated, which forces the lifter pins 72 to protrude from the top of the lifter base (at the end plate, or "guide", 71). In this extended state, the lifter pins 72 are able to interfere with the driver protrusions 66 (not shown in this view). During a return stroke (or lift stroke), the lifter S/A 70 rotates radially with the lifter shaft 79 (i.e., the lifter S/A 70 rotates about the longitudinal axis 185 of the lifter shaft 79). This action rotates the lifter pins 72, and individual lifter pins are able to "catch and lift" individual driver protrusions or teeth 66 (not shown in this view).

In some embodiments, the lifter S/A 70 rotates about one and a half rotations in order to fully lift the driver 62 back to a "ready position," in which the tool is ready to drive another fastener into a workpiece. The lifter S/A is contemplated to rotate as much, or as little, as necessary to fully complete the lifting stroke (this will be further explained below). The lower plunger portion 166 has been forced "upwards" (to the right in this view) by the solenoid 75, thereby forcing the lifter pins 72 into a protruded, or extended position from the lifter first cover (the "guide") 71. It should be noted that, in FIG. 3, all of the lifter pins 72 are extended but, as will be described below, in some circumstances one or two of the lifter pins may become blocked by a mechanical interference. However, in all cases of a properly working tool, at least a majority of the lifter pins are forced to protrude during the initial phase of a lifting stroke.

Figure 4:
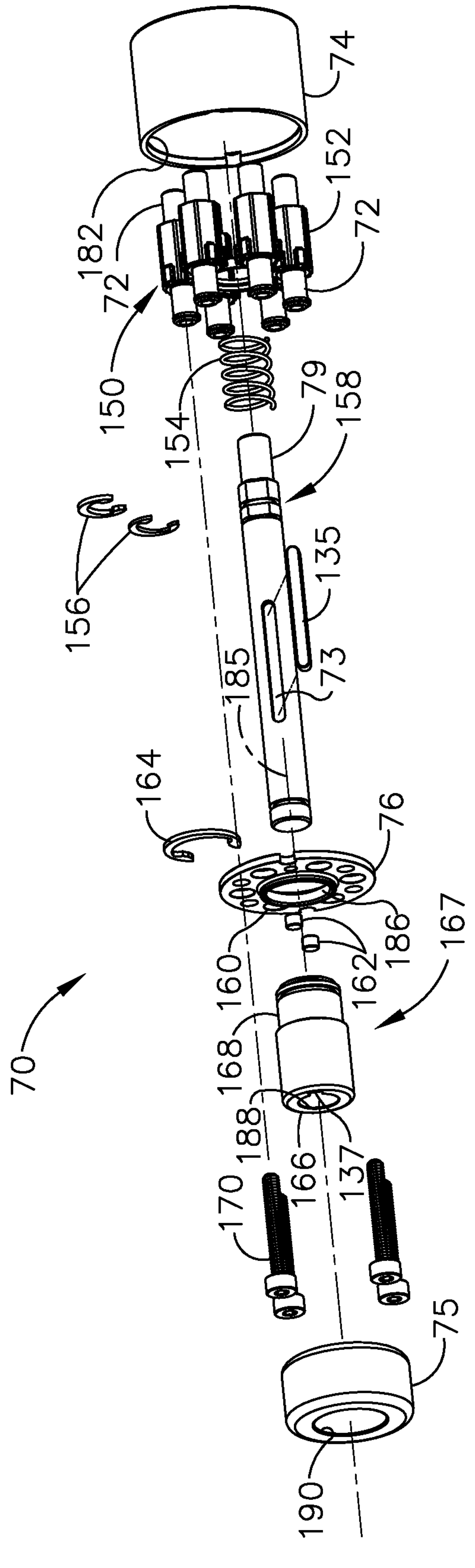
FIG. 4 is an exploded view of the lifter of FIG. 1.

Referring now to FIG. 4, the lifter S/A 70 is depicted in an exploded view. The shuttle S/A 150 is depicted, including the plurality of lifter extensions 72. The shuttle S/A 150 acts as a "holder" for the lifter pins, and it fits inside the lifter base 74, at an opening 182. A one-piece shuttle base 152 (also sometimes referred to herein as a "plurality of lifter pin housings") partially contains the lifter extensions 72, and more closely "holds" the lifter pins. A shuttle return spring 154 (or "return spring") fits over the lifter shaft 79 and inside the open center portion of the shuttle base 152. Note: the shuttle base 152 is part of the shuttle S/A 150, and together, this structure acts as a "holder" for the lifter pins.

The lifter shaft 79 exhibits flattened portions 158, a keyway 73, a first end and a second end, and a longitudinal axis 185 that extends between the first end and the second end. A key 135 slots into the keyway 73. A plurality of snap rings 156 fit over the lifter shaft 79 proximal to the flattened portions 158. A lifter cover plate 76 (also sometimes referred to herein as a "second cover" or a "second holder" or, simply, a "pusher") fits on the lifter shaft 79 and is attached to the lifter base 74. The lifter cover plate/pusher 76 is proximal to the solenoid 75. The lifter cover plate/pusher 76 exhibits a central opening 186 and a plurality of spaced-apart through-holes 160 proximal to an outer perimeter of the lifter cover plate, and the lifter pins 72 are secured in these through-holes. A pair of locater pins 162 position the lifter cover plate/pusher 76 to the lifter base 74, so that the lifter cover plate rotates with the lifter base. It will be understood that the lifter base 74 and the lifter cover plate (the "pusher") 76 could be formed as a unitary part, if desired.

The lifter first cover/guide 71 and the lifter cover plate/pusher 76 act, respectively, as "guides" and "holders/pushers" for the lifter pins 72. The through-holes 139 and 160 are also sometimes referred to herein as "openings," and in this illustrated embodiment, these openings are positioned in a circular pattern as seen in an end or face view, such as that of FIG. 6-A or FIG. 12—the openings 160 are at the same positions as the lifter pins 72 in that view. Another way of describing the use of these openings is that the lifter pins are seated in the openings of one of the holders, and that the lifter pins are movable in a direction that is substantially parallel to the longitudinal axis of the lifter shaft 79. Moreover, the openings 160 in the (second) holder (or "pusher") 76 are co-linear with the openings 139 in the other (first) holder (or "guide") 71.

The lower solenoid plunger portion 166 and an upper solenoid plunger portion 168 comprise a "two-part plunger" in the illustrated embodiment. The lower plunger portion 166 and the upper plunger portion 168 are preferably comprised of a magnetically sensitive material (such as steel, for example). The lower plunger portion 166 exhibits a central opening 188 with a notch or slot 137 that sits over the key 135, and when fully assembled the lifter S/A 70 rotates together with the lifter shaft 79. (Note: the solenoid 75 does not spin.) A snap ring 164 seats on the upper plunger portion 168. A plurality of fasteners 170 secure the lifter cover plate/pusher 76 to the lifter base 74 (at the first cover/guide 71), thereby securing and containing the shuttle S/A (the "holder") 150. The solenoid 75 exhibits a central opening 190 that contains the two-part plunger 166, 168, as well as the lifter shaft 79, and the solenoid 75 is proximal to the first end of the lifter shaft 79. It will be understood that the so-called two-part plunger 166, 168 can be made of a one-piece construction, and therefore, will sometimes be referred to herein by a single reference numeral 167.

Figure 5:
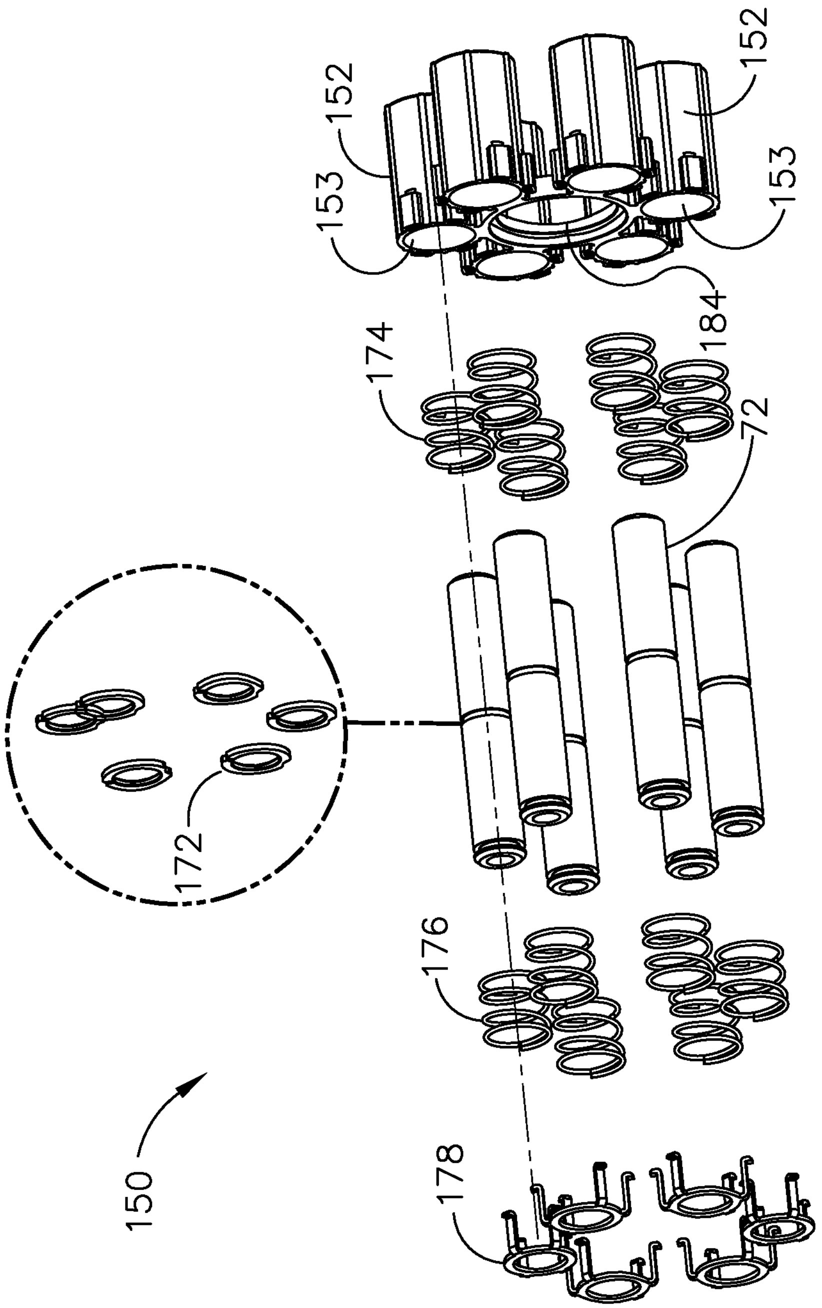
FIG. 5 is an exploded view of a shuttle sub-assembly of the lifter of FIG. 1.

Referring now to FIG. 5, the shuttle S/A ("holder") 150 is depicted in an exploded view. A plurality of forward springs 174 seat on the lifter pins 72 proximal to the shuttle base/holder 152. A plurality of rearward springs 176 seat on the lifter pins 72 proximal to the lifter cover plate (the "pusher") 76 (not shown in this view). The forward springs 174 and the rearward springs 176 are each constrained to one side of the lifter pins 72 or the other by a plurality of snap rings 172. A plurality of spring retainers 178 seats over the lifter pins 72 proximal to the rearward springs 176, and attaches to the shuttle base/holder 152. The shuttle base/holder 152 exhibits a central opening 184 for the plunger 167.

The shuttle S/A 150 (the "holder") is designed so that every individual lifter pin 72 is able to exhibit individual movement in a direction that travels parallel to the longitudinal axis of the lifter shaft 79. In addition, the lifter pins 72 are individually able to rotate. By using the forward springs 174 and the rearward springs 176, each lifter pin 72 is able to extend and retract individually, and as a group. During a drive stroke, the solenoid 75 is not actuated, which means the plunger 167 is not actuated (see FIGS. 2 and 42). Since the plunger 167 is not actuated, the shuttle return spring 154 is uncompressed (see FIG. 42). Therefore, the shuttle return spring 154 forces the shuttle sub-assembly ("holder") 150 to the right (in this view), and thus, the lifter pins 72 are retracted and their faces become nominally co-planar with the face of the lifter end plate (or "guide") 71. In other words, the lifter pins 72 will not interfere with the driver 62 and driver teeth 66 during the drive stroke.

However, during a lift stroke (or return stroke), the solenoid 75 is actuated. The solenoid 75 forces the plunger 167 "upwards," which compresses the shuttle return spring 154, and the plunger 167 forces the shuttle S/A ("holder") 150 towards the lifter end plate/guide 71. The movement of the shuttle S/A 150 (the "holder") causes the snap rings 172 to be forced by the rearward springs 174, and the lifter pins 72 are typically moved beyond the lifter end plate (or "guide") 71 where they protrude beyond that lifter end plate/guide 71.

In a typical return stroke, the protruding lifter pins 72 rotate with the lifter S/A 70 and "catch" individual driver teeth 66, quickly forcing the driver 62 into a ready position. On some occasions, however, a mechanical interference condition (such as a jam) may occur where the driver teeth 66 can interfere with the lifter pins 72. A typical jam condition is one in which a fastener becomes misaligned, or improperly driven into a workpiece. Another typical interference condition can occur after a drive stroke, in which one or more of the driver teeth 66 are simply covering one or more of the lifter pins 72 due to a driver misposition, such as can occur when the tool's piston stop becomes well worn.

In a jam condition, for example, the individual movement exhibited by each lifter pin 72 helps to relieve this condition. A typical jam condition may leave one or more driver teeth 66 covering, or partially covering, one or more lifter pins 72. Any individual lifter pin 72 that is not covered by a driver protrusion 66 is protruding from the lifter end plate (or "guide") 71, as explained above. Any individual lifter pin 72 that is covered, or partially covered, by a driver protrusion 66 is forced to essentially remain in the lifter base 74 in a non-extended position (also referred to herein as a "blocked" position). When this occurs, the specific driver protrusion 66 covering the specific lifter pin 72 forces the rearward spring 176 of that individual lifter pin 72 to compress (also correspondingly the forward spring 174 of that individual lifter pin 72 decompresses).

When the lifter S/A 70 begins to rotate for a lift stroke, any covered—and therefore, blocked—lifter pins 72 do not interfere with the driver protrusions 66. In other words, such blocked lifter pins cannot perform their typical function of lifting one of the driver protrusions. However, once the lifter S/A 70 has rotated far enough, the blocked lifter pin(s) 72 will extend, and join the configuration of the other extended lifter pins, and therefore, will be able to assist in the lifting stroke.

This movement of retracting and protruding lifter pins due to the forward springs 174 and the rearwards springs 176 is performed parallel to the longitudinal axis 185 of the lifter S/A 70, not radially. FIGS. 6-11 depict some of the conditions described above, and thus illustrate how the lifter pins exhibit independent movement along the longitudinal axis 185.

Referring now to FIG. 6-A, the lifter S/A 70 is depicted in a front view showing the ready position. The solenoid 75 is not actuated, and the lifter pins 72 are retracted into the lifter base 74, except for the single lifter pin 134 holding the driver 62. As described below, the single lifter pin 134 is protruding due to the force exerted on it by the driver protrusion 66 overcoming the spring biasing force of the forward spring 174.

Referring now to FIG. 6-B, a left side view of FIG. 6-A is shown. FIG. 6-B depicts the ready position before the lifter S/A 70 begins rotating in preparation for a drive stroke (see FIGS. 7-A through 7-C for the pre-drive stroke ready position state). As can be seen in FIGS. 6-A and 6-B, the driver 62 is positioned at an angle that is substantially perpendicular with respect to the longitudinal axis of the lifter shaft 79.

Referring now to FIG. 6-C, a perspective view of FIG. 6-A is shown. The driver protrusion 66 is fully engaged with the single lifter pin 134. Note that the majority of the lifter pins 72 are retracted, apart from the single lifter pin 134 holding the driver 62 which is protruding from the lifter base 74 (i.e., protruding past the first plate/guide 71).

Referring now to FIG. 7-A, the lifter S/A 70 is depicted in a front view holding the driver 62 in a position that is about to drive. In this state, the solenoid 75 is not actuated, and a majority of the lifter pins 72 have been retracted inside the lifter base 74. However, a single lifter pin 134 is holding the driver 62 during initial rotation of the lifter. The mechanical load from the driver protrusion 66 of the driver 62 on the single lifter pin 134 holding the driver 62 is great enough to overcome the spring biasing force of this single lifter pin's forward spring 174 that would otherwise retract this single lifter pin. Note that the other lifter pins have been pushed back into their retracted positions due to their forward springs.

Referring now to FIG. 7-B, a left side view of FIG. 7-A is depicted. FIGS. 7-A through 7-C are illustrating a state in which the lifter S/A 70 has already partially rotated so that the driver protrusion 66 is about to "fall off" and perform a drive stroke, allowing the forward spring 174 to force the single lifter pin 134 to retract into the lifter base 74. As seen in FIG. 6-A, a typical ready position is when the single lifter pin 134 is holding a more significant portion of the single driver protrusion 66.

Referring now to FIG. 7-C, a perspective view of FIG. 7-A is shown. The single lifter pin 134 is again holding a single driver protrusion 66, thereby holding the driver 62 at the ready position. Note how the single driver protrusion 66 is contacting the single lifter pin 134. Also note that all five of the other lifter pins are fully retracted as can be seen in this perspective view.

Referring now to FIG. 8-A, the lifter S/A 70 is depicted in a front view at the beginning of a drive stroke. When a drive stroke begins, the lifter S/A 70 has rotated just enough for the single lifter pin 134 to rotate past the driver protrusion 66. When that occurs, the forward spring 174 is allowed to uncompress, and biases that single pin back into the lifter base 74, joining the other lifter pins 72. The driver 62 is now "free," and begins a drive stroke.

Referring now to FIG. 8-B, a left-side view of FIG. 8-A is depicted.

Referring now to FIG. 8-C, a perspective view of FIG. 8-A is shown. As can be seen in this perspective view, all of the lifter pins 72 are retracted.

Referring now to FIG. 9-A, the lifter S/A 70 is depicted in a front view at the end of a drive stroke. The solenoid 75 is not actuated and the lifter pins 72 are retracted inside the lifter base 74. Note that in this view, the driver 62 has stopped at a position that is not misaligned.

Referring now to FIG. 9-B, a left-side view of FIG. 9-A is depicted. At the end of a drive stroke, the driver protrusions 66 are mostly past the lifter S/A 70. In other words, the driver 62 is in its "down" (driven) position. In FIGS. 9-A through 9-C, no initial jam condition is depicted, because none of the driver protrusions 66 will interfere with any of the lifter pins 72 so that the lifter pins can be extended for a lift stroke.

Referring now to FIG. 9-C, a perspective view of FIG. 9-A is shown. This view illustrates the lifter S/A 70 just as the driver 62 finishes its driving stroke, and before the lifter pins 72 attempt to be extended.

Referring now to FIG. 10-A, the lifter S/A 70 is depicted in a front view. FIGS. 10-A through 10-C depict a jam condition at the start of a lift stroke. The solenoid 75 is actuated, and most of the lifter pins 72 are protruding from the top of the lifter base 74 (i.e., through the first plate/guide 71). A jam condition (or interference) is depicted at reference numeral 136, where driver protrusion interference is causing one of the lifter pins (136) to only partially extend, and become blocked by that driver protrusion.

Referring now to FIG. 10-B, a left side view of FIG. 10-A is depicted.

Referring now to FIG. 10-C, a perspective view of FIG. 10-A is shown. A majority of the lifter pins 72 are shown extended from the lifter end plate (or "guide") 71. However, due to the interference, one lifter pin 136 cannot fully extend because it is blocked, and mostly remains inside the lifter base 74. The particular (blocked) lifter pin 136 is compressing its individual rearward spring 176, whereas the fully extended (protruding) lifter pins are only light compressing both their forward springs 174 and their rearward springs 176 (i.e., those lifter pin springs are in their neutral state). In order to resolve the jam condition, the lifter S/A 70 merely needs to continue rotating until the interfered—with lifter pin 136 slides past the interference. The situation depicted in FIG. 10-C illustrates the operating state of this lifter in which all of the lifter pins 72 are trying to move to their extended positions, but cannot because of the circumstance in which at least one of the lifter pins has become blocked by a mechanical interference. However, in all cases of a properly working tool, at least a majority of the lifter pins will protrude during the initial phase of a lifting stroke, as can be seen in FIG. 10-C. Only the single "blocked" lifter pin 136 has not extended in this view, which may occur at the initial stage of a lifting stroke.

Referring now to FIG. 11-A, the lifter S/A 70 is depicted in a front view as the lift stroke continues and resolves the jam condition depicted in FIGS. 10-A through 10-C. The solenoid 75 is actuated, forcing the lifter pins 72 to protrude and extend from the lifter base 74, through the first cover/guide 71. As described above, to resolve the previous jam condition depicted in FIGS. 10-A through 10-C, the lifter S/A 70 continues to rotate, until the lifter pin 136 slides past the interfering driver protrusion 66. At reference numeral 138, a non-interference position is depicted, wherein the lifter pin 138 "catches" the individual driver protrusion 66 in order to lift the driver 62 back to the ready position. Note that additional lifter pins 72 will catch further individual driver protrusions 66 as the lifter S/A 70 continues to lift the driver 62 towards the ready position.

Referring now to FIG. 11-B, a left side view of FIG. 11-A is shown.

Referring now to FIG. 11-C, a perspective view of FIG. 11-A is shown. In this view, the jam condition depicted in FIGS. 10-A through 10-C is resolved, at the non-interference lifter pin 138. In this view, all the lifter pins 72 are fully extended and may engage with the driver protrusions 66. It will be understood that the spacings between the lifter pins 72 match up to the spacings between the driver protrusions 66 so that, as the lifter S/A 70 rotates, each lifter pin 72 will "catch" the next driver protrusion 66.

Figure 12:
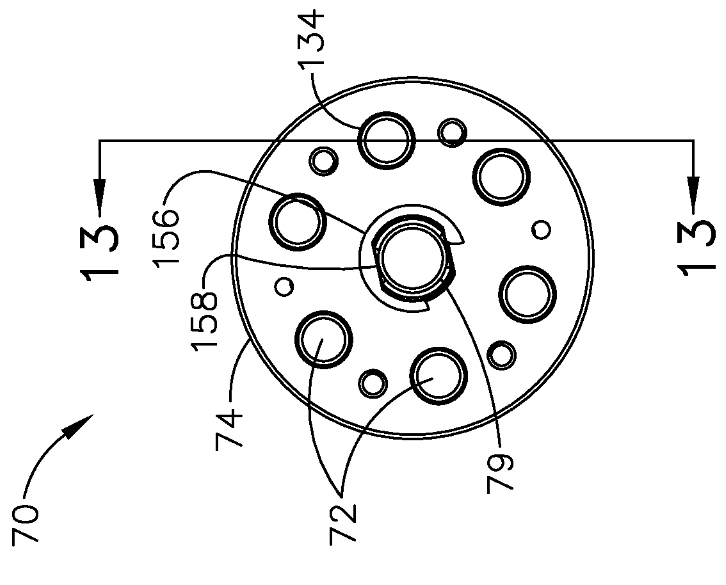
FIG. 12 is a front view of the lifter of FIG. 1.

Referring now to FIG. 12, a front view of the lifter S/A 70 is depicted. The multiple lifter pins 72 are visible, including an extended lifter pin 134. The flat areas 158 of the lifter shaft 79 are visible, as is the snap ring 156. As will be explained below with FIG. 13, the lifter S/A 70 is depicted at the ready position, in which the lifter pin 134 is extended and holding the driver 62. The flats 158 are used to mechanically communicate the rotational motion of the lifter shaft to the first cover (or "guide") 71 (see FIG. 1). It will be understood that, in the general case, the lifter shaft should be in mechanical communication with at least one of the first cover/guide 71 and the second holder/cover (the "pusher") 76, so as to impart a rotational motion to the lifter subassembly 70, as needed.

Figure 13:
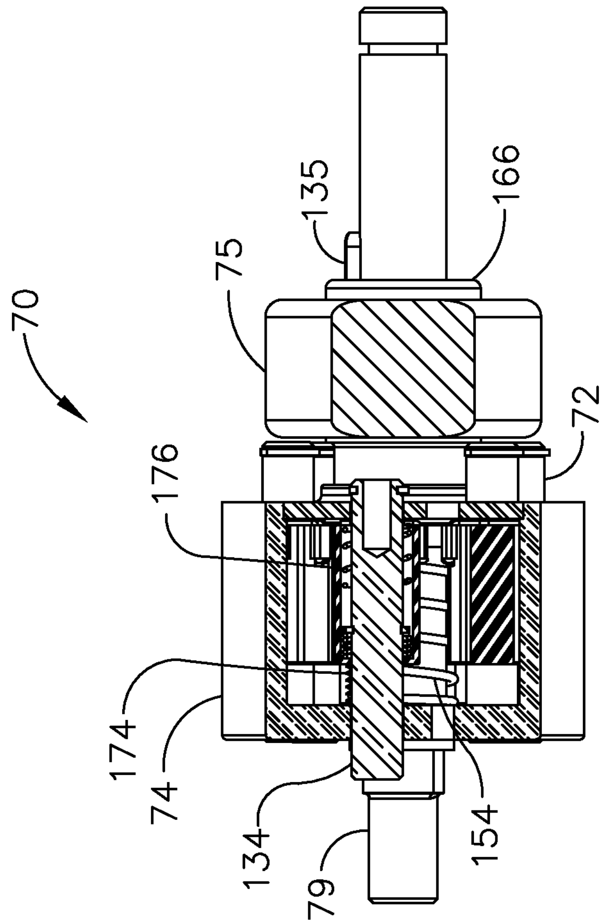
FIG. 13 is a cutaway view along the line 13-13 of the lifter of FIG. 12, in which a single lifter pin is holding the driver.

Referring now to FIG. 13, a cutaway view along the line 13-13 of the lifter S/A 70 of FIG. 12 is depicted. In FIG. 13, a single lifter pin 134 is extended from the lifter base 74 (through the first cover/guide 71). The solenoid 75 and the plunger 167 are not actuated, and the shuttle return spring 154 is uncompressed. The remaining lifter pins 72 are retracted into the lifter base 74. The single lifter pin 134 has its forward spring 174 compressed, and its rearward spring 176 uncompressed. This is due to the force exerted from "holding" a single driver tooth 66 (as shown in FIGS. 6-A through 6-C, and FIGS. 7-A through 7-C).

Figure 14:
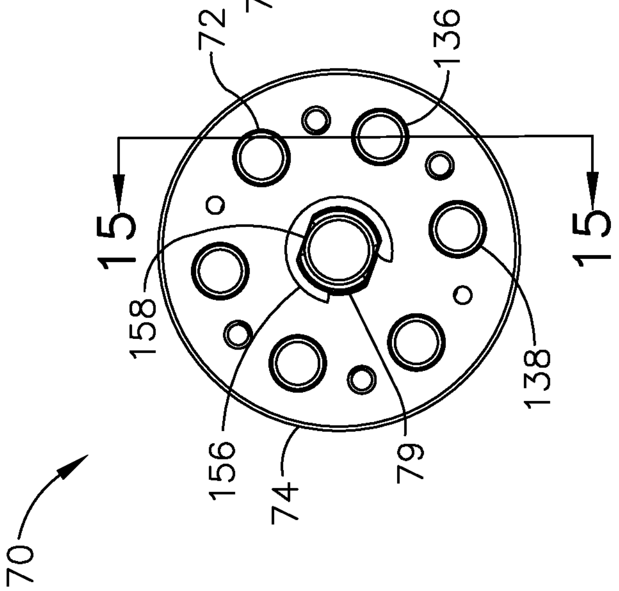
FIG. 14 is a front view of the lifter of FIG. 1.

Referring now to FIG. 14, a front view of the lifter S/A 70 is shown. As will be explained below with FIG. 15, the lifter S/A 70 is depicted at the driven position, in which the driver 62 is misaligned, and the lifter pin 136 is not extended because it is being interfered with by a driver protrusion 66.

Figure 15:
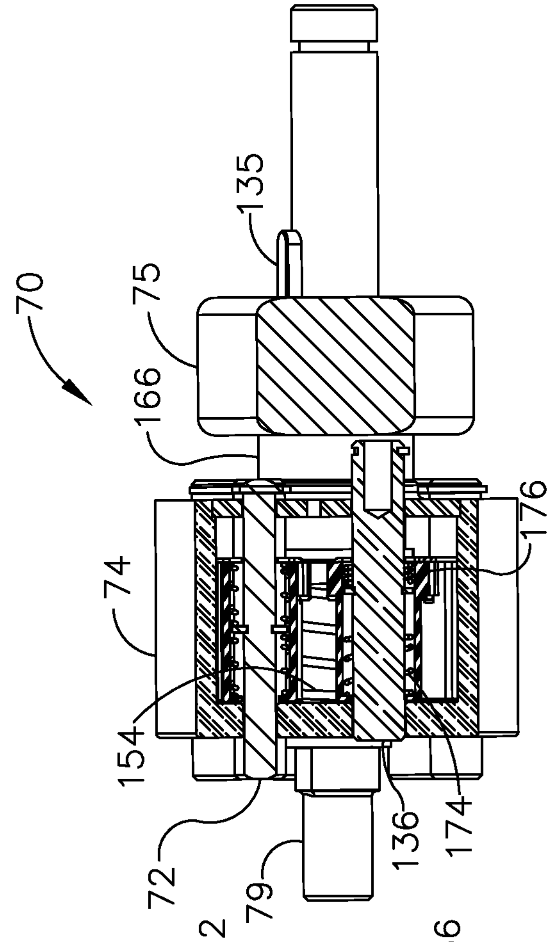
FIG. 15 is a cutaway view along the line 15-15 of the lifter of FIG. 14, in which a single lifter pin is blocked due to interference with the driver, and the other lifter pins are extended.

Referring now to FIG. 15, a cutaway view along the line 15-15 of the lifter S/A 70 of FIG. 14 is shown. In FIG. 15, a single lifter pin 136 is blocked due to the driver protrusion interference (as shown in FIGS. 10-A through 10-C). The solenoid 75 and the plunger 167 are actuated. The plunger 167 has forced the lifter cover plate (the "pusher") 76 "leftwards" (in this view), which forces the lifter pins 72 to protrude from the lifter base. However, due to the interference, the single lifter pin 136 is still blocked. That blocked lifter pin 136 has its forward spring 174 uncompressed, and its rearward spring 176 compressed. (Note that, if not for the interference with the misaligned driver, the rearward spring 176 would force the lifter pin 136 to its extended position.)

Figure 16:
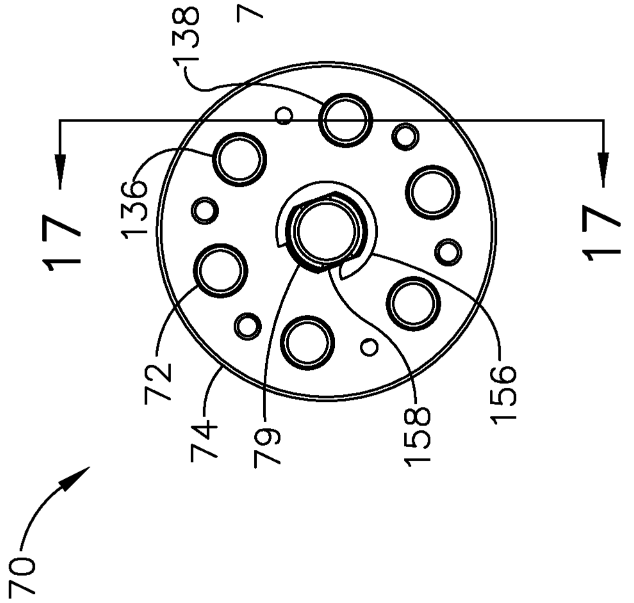
FIG. 16 is a front view of the lifter of FIG. 1.

Referring now to FIG. 16, a front view of the lifter S/A 70 is illustrated. As will be explained below with FIG. 17, the lifter S/A 70 is depicted at a "freeing" position, in which the lifter S/A 70 has rotated so that the "next" lifter pin 138 will catch the misaligned driver protrusion 66 and begin a lifting stroke.

Figure 17:
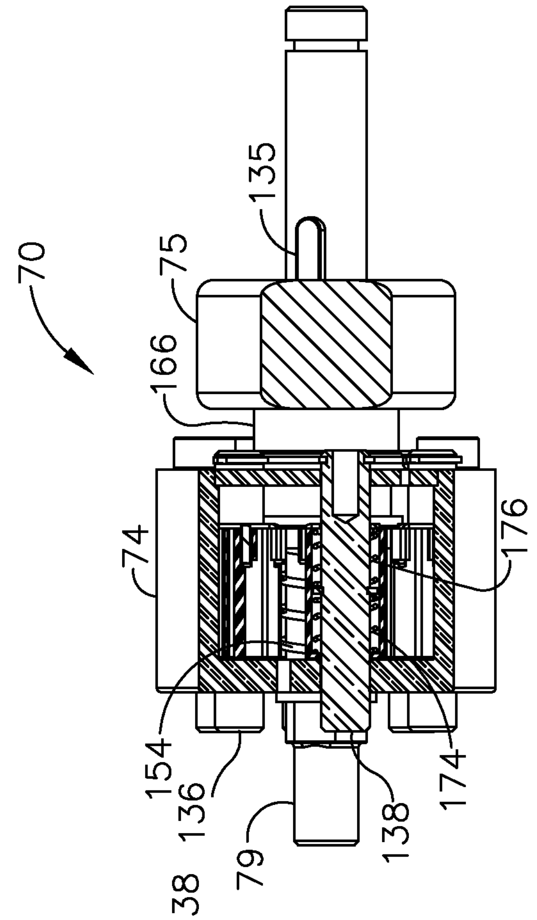
FIG. 17 is a cutaway view along the line 17-17 of the lifter of FIG. 16, in which all of the lifter pins are extended and ready to begin a lift stroke.

Referring now to FIG. 17, a cutaway view along the line 17-17 of the lifter S/A 70 of FIG. 16 is illustrated. In FIG. 17, all of the lifter pins 72 are extended and ready for a lift stroke (as shown in FIGS. 11-A through 11-C). The solenoid 75 and the plunger 167 are actuated. The plunger has forced the shuttle sub-assembly/holder 150 "leftwards" (in this view), which forces the lifter pins 72 to protrude from the lifter base. In FIG. 17, all of the lifter pins 72 forward springs 174 and rearward springs 176 are only lightly compressed (i.e., in their neutral states). As noted above, FIG. 17 illustrates the "freeing" state of the lifter pins 72. Note also, if the driver 62 had not been misaligned, this would be the appearance of all the lifter pins 72 at the beginning of a "normal" lifting stroke.

Figure 18:
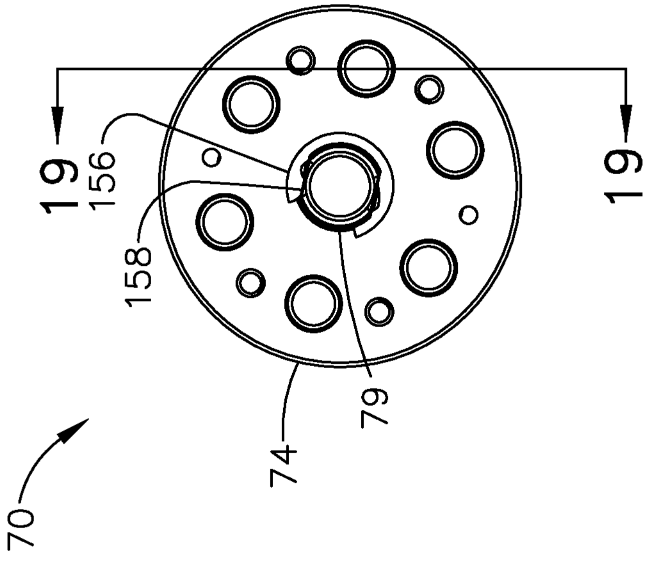
FIG. 18 is a front view of the lifter of FIG. 1.

Referring now to FIG. 18, a front view of the lifter S/A 70 is shown. As will be explained below with FIG. 19, the lifter S/A 70 is depicted at a drive stroke, in which all of the lifter pins 72 are retracted.

Figure 19:
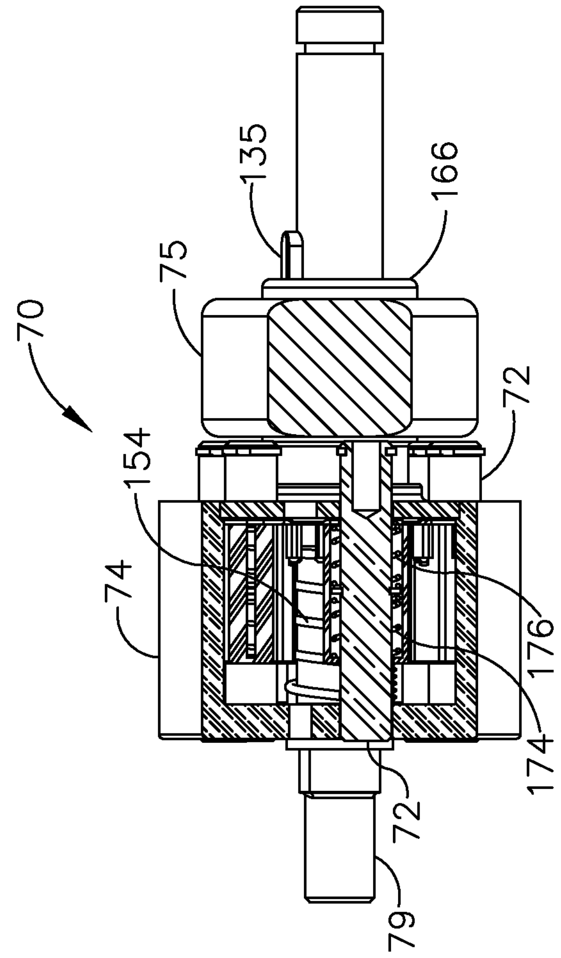
FIG. 19 is a cutaway view along the line 19-19 of the lifter of FIG. 18, in which all the lifter pins are retracted.

Referring now to FIG. 19, a cutaway view along the line 19-19 of the lifter S/A 70 of FIG. 18 is shown. In FIG. 19, the lifter pins 72 are retracted (as shown in FIGS. 8-A through 8-B, and FIGS. 9-A through 9-C). The solenoid 75 and the plunger 167 are not actuated, and the shuttle return spring 154 has forced the shuttle S/A ("holder") 150 to the right (in this view). All of the lifter pin forward springs 174 and rearward springs 176 are, again, in their neutral states. This is the appearance of the lifter pins 72 during a driving stroke.

Figure 41:
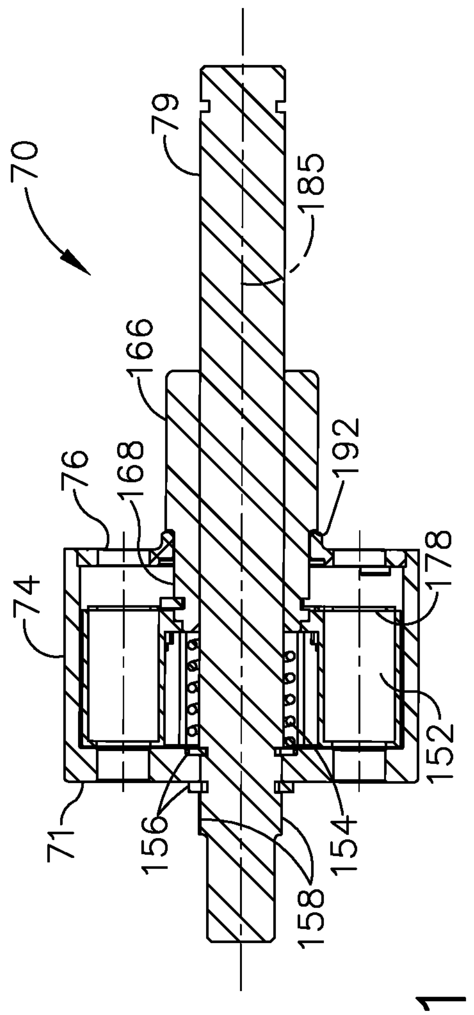
FIG. 41 is a right side cutaway view of the lifter of FIG. 1, without the lifter pins, springs, and solenoid, in an extended position.

Referring now to FIG. 41, a cutaway view is depicted of the lifter S/A 70 in an extended position. The solenoid 75, the lifter pins 72, the forward springs 174, and the rearward springs 174 are not shown for clarity. In the extended position, the plunger 167 (denoted as reference numerals 166, 168 on some figures, including FIG. 41) contacts the lifter base 74 at a flange 192. The shuttle base ("holder") 152 has been forced to the left (in this view) by the plunger, and the shuttle return spring 154 is compressed.

Figure 42:
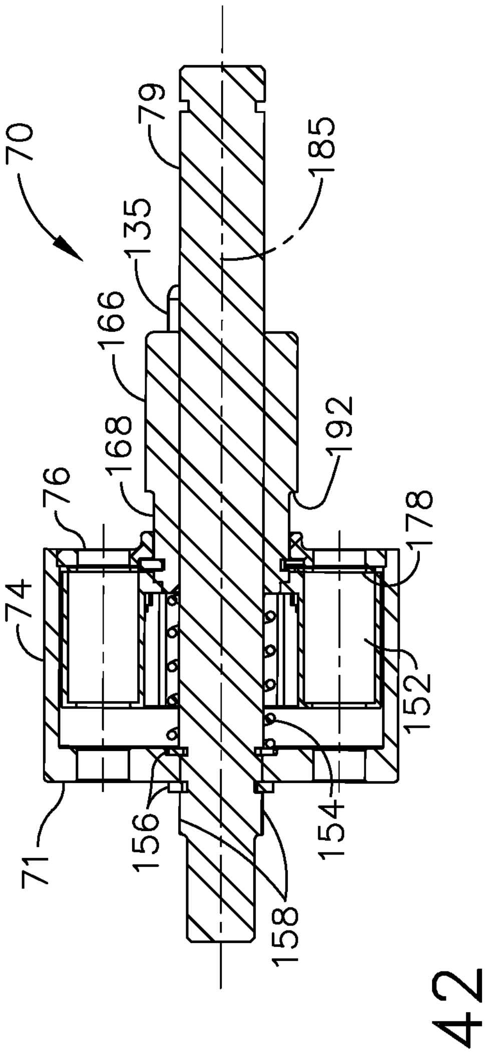
FIG. 42 is a right side cutaway view of the lifter of FIG. 1, without the lifter pins, springs, and solenoid, in a retracted position.

Referring now to FIG. 42, a cutaway view is depicted of the lifter S/A 70 in a retracted position. The solenoid 75, the lifter pins 72, the forward springs 174, and the rearward springs 176 are not shown for clarity. In this state, the solenoid is actuated, the plunger is retracted, and the lifter second cover (the "pusher") 76 is not contacting the flange 192. The shuttle base/holder 152 has been forced to the right (in this view) by the shuttle return spring 154.

It will be understood that any type of linear actuator could be used instead of the solenoid 75. For example, a linear motor could be used instead of a solenoid to form such a linear actuator. Furthermore, such a linear actuator could be constructed using a rotational motor, along with a mechanism that converts the rotary motion into linear motion.

Second Embodiment

Figure 20:
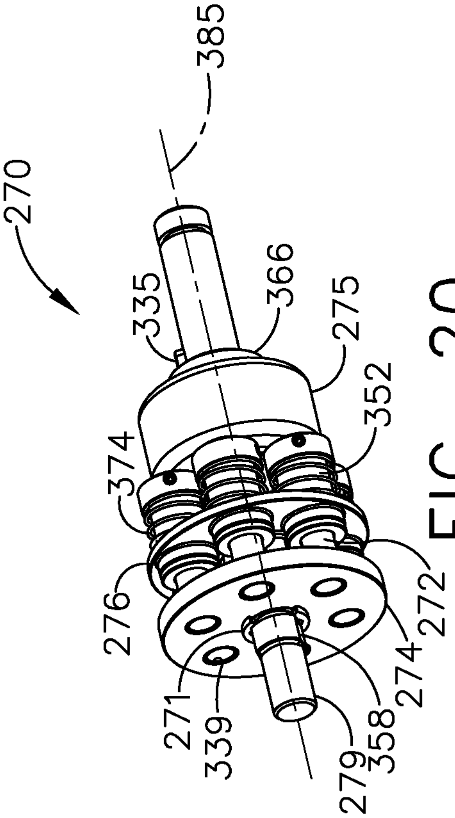
FIG. 20 is a right perspective view of a first alternative embodiment (or "Second Embodiment") rotary-to-linear lifter for a fastener driving tool, as constructed according to the principles of the technology disclosed herein.

Referring now to FIG. 20, a first alternative embodiment lifter sub-assembly ("S/A") for a fastener driving tool is generally designated by the reference numeral 270, and the lifter S/A is a rotary-to-linear lifter. A lifter shaft 279 and a power transmission sub-assembly (not shown) rotate the lifter S/A 270. A lifter base 274 (also sometimes referred to herein as a "first cover" or a "first holder" or, simply, a "guide") is attached to the lifter shaft 279, and covers a lifter pin sub-assembly ("S/A") 384 (see FIG. 24) (also sometimes referred to herein as a "lifter extension S/A"). The lifter first cover/guide 274 is proximal to the second end of the lifter shaft 279. The lifter first cover/guide 274 exhibits a plurality of through-holes 339 proximal to a perimeter of the lifter base, and a central opening 390 (see FIG. 23) for the lifter shaft 279. In this view, the lifter S/A 270 is shown on the side nearest to a driver (or "driver blade") 262 (not shown in this view). A solenoid 275 is also attached to the lifter shaft 279, distally from the driver 262. The driver 262 exhibits a plurality of protrusions or teeth 266 (not shown in this view). It will be understood that the lifter in FIG. 20 is designed to operate as part of a fastener driving tool, and that this lifter is part of a machine that sometimes will be referred to herein as a "fastener driving machine."

Figure 21:
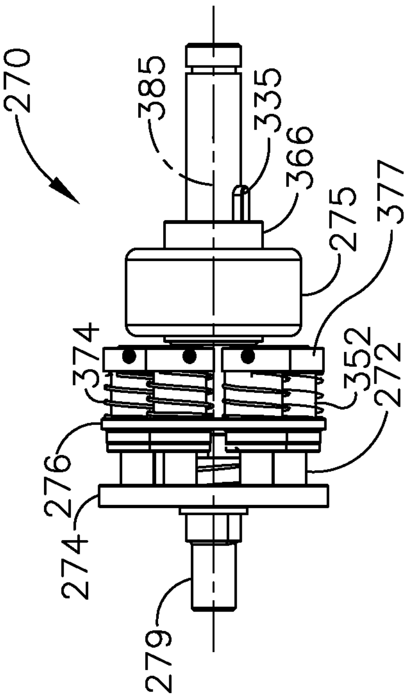
FIG. 21 is a right side view of the lifter of FIG. 20, in which the lifter pins are not extended.
Figure 22:
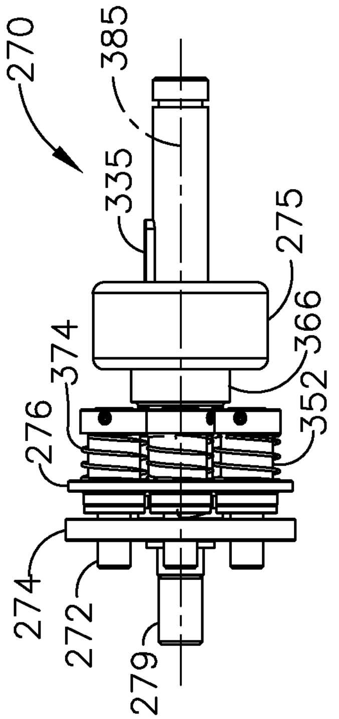
FIG. 22 is a right side view of the lifter of FIG. 20, in which the lifter pins are extended.

The solenoid 275 is used to actuate a plurality of lifter pins or extensions 272 during a return stroke of the driver 262. FIG. 21 depicts the lifter pins 272 in a "retracted" state. The retracted state is typically used for a drive stroke of the tool. In the retracted state, the faces of the lifters pins 272 are nominally co-planar with the face of the first cover/guide 274. FIG. 22 depicts the lifter pins 272 in an "extended" state. In the extended state, the lifter pins 272 extend through and past the plurality of through-holes 339. The extended state is typically used for a return stroke. In FIG. 21, the solenoid 275 is not actuated, and the solenoid plunger portion 366 is not extended.

Referring now to FIG. 22, the extended state of the lifter S/A 270 is depicted. In FIG. 22, the solenoid 275 is actuated, which forces the lifter pins 272 to protrude from the lifter first cover (the "guide") 274. In this extended state, the lifter pins 272 are able to interfere with the driver protrusions 266 (not shown in this view). During a return stroke (or lift stroke), the lifter S/A 270 rotates radially with the lifter shaft 279. This action rotates the lifter pins 272, and individual lifter pins are able to "catch and lift" individual driver protrusions or teeth 266 (not shown in this view). If desired, the lifter S/A 270 is able to rotate more than one complete rotation in order to fully lift the driver 262 back to a "ready position," in which the tool is ready to drive another fastener into a workpiece. The lower solenoid plunger portion 366 has been forced "upwards" (to the left in this view) by the solenoid 275, thereby forcing the lifter pins 272 into a protruded, or extended position from the lifter first cover (the "guide") 274.

Figure 23:
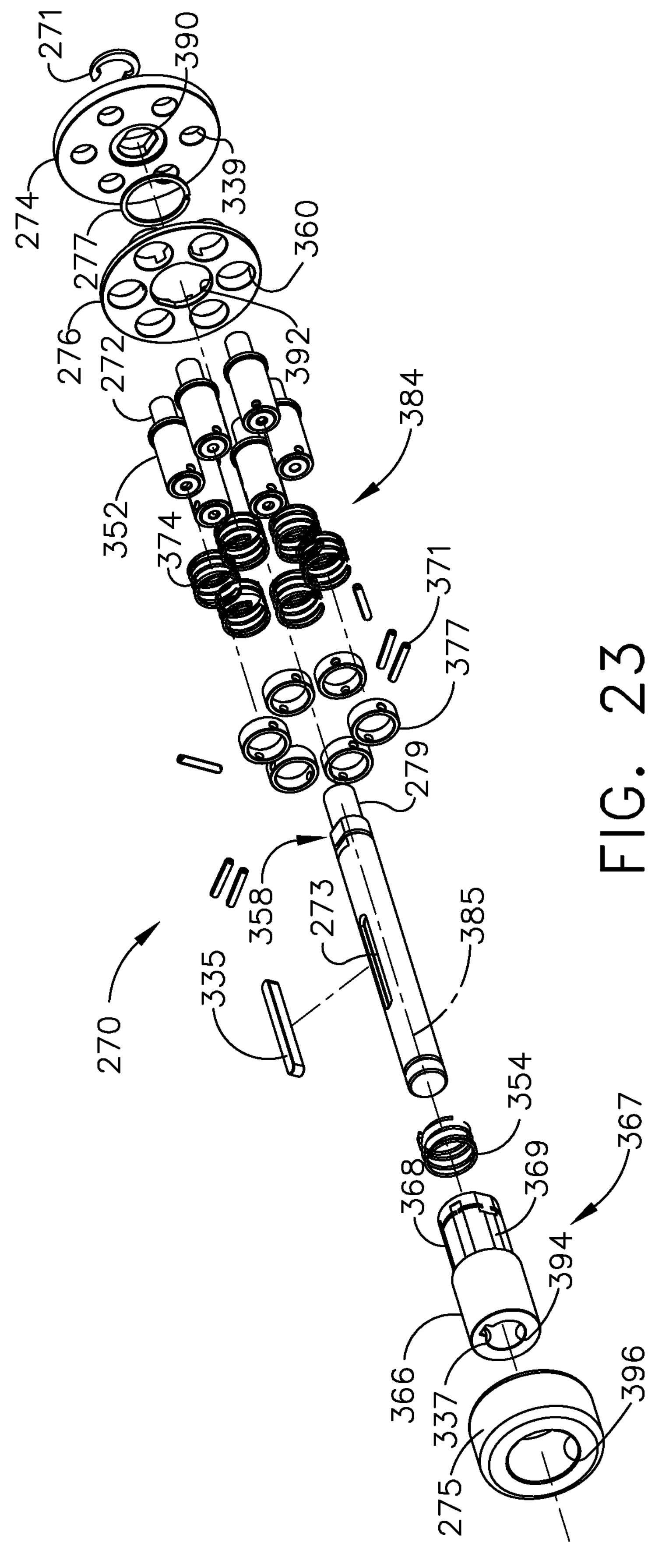
FIG. 23 is an exploded view of the first alternative embodiment lifter of FIG. 20.

Referring now to FIG. 23, the lifter S/A 270 is depicted in an exploded view. A snap ring 271 secures the lifter first cover/guide 274 to the lifter shaft 279. A lifter pin S/A 384 is shown, including the plurality of lifter pins 272. Each lifter pin 272 includes a lifter pin housing (or "holder") 352, and each lifter pin is able to independently slide in and partially out of the lifter pin housing/holder 352. Each lifter pin housing/holder 352 includes an exterior lifter spring 374. A shuttle return spring 354 (or "return spring") fits over the lifter shaft 279.

The lifter shaft 279 exhibits flattened portions 358, and a keyway 273, a first end and a second end, and a longitudinal axis 385 that extends between the first end and the second end. A key 335 fits into the keyway 273. A shuttle 276 (also sometimes referred to herein as a "second cover" or a "second holder") fits on an upper solenoid plunger portion 368, and holds in place a portion of the plurality of the lifter pin housings ("holder") 352. The shuttle 276 is proximal to the solenoid 275. The shuttle 276 exhibits a central opening 392 and a plurality of through-holes 360 proximal to an outer perimeter of the shuttle, and the lifter pin housings/holders 352 are secured in these through-holes. A snap ring 277 secures the shuttle 276 to the upper plunger portion 368. The lifter first cover/guide 274 and the shuttle 276 act, respectively, as "guides" and "holders" for the lifter pins 272. The through-holes 360 are also sometimes referred to herein as "openings," and in this illustrated embodiment, these openings 360 are positioned in a circular pattern as seen in an end or face view, such as that of FIG. 25-A—the openings 360 are at the same positions as the lifter pins 272 in that view.

The lower solenoid plunger portion 366 and the upper solenoid plunger portion 368 comprise a "two-part plunger" in this illustrated embodiment. The lower plunger portion 366 and the upper plunger portion 368 are preferably comprised of a magnetically sensitive material (such as steel, for example). The lower plunger portion 366 exhibits a central opening 394 with a notch or slot 337 that sits over the key 335, and when fully assembled the lifter S/A 270 rotates together with the lifter shaft 279. (Note: the solenoid 275 does not spin.)

The upper solenoid plunger portion 368 exhibits a plurality of grooves 369, and these grooves are spaced apart and aligned in a direction parallel to the lifter shaft 279. These grooves 369 provide clearance for a set of springs 374 and spring bases 377. The solenoid 275 exhibits a central opening 396 that contains the two-part plunger 366, 368, as well as the lifter shaft 279, and the solenoid 275 is proximal to the first end of the lifter shaft 279. It will be understood that the so-called two-part plunger 366, 368 can be made of a one-piece construction, and therefore, will sometimes be referred to herein by a single reference numeral 367.

Figure 24:
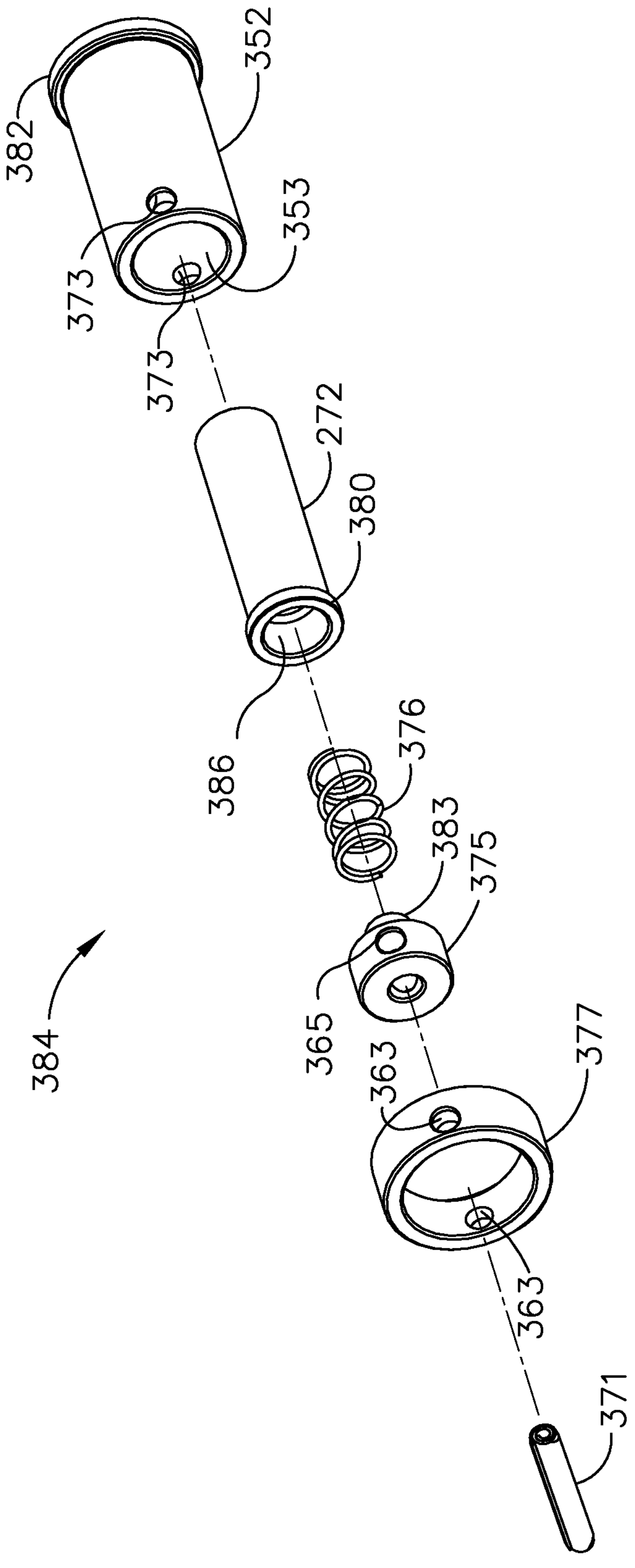
FIG. 24 is an exploded view of one of the lifter pin sub-assembly of the first alternative embodiment lifter of FIG. 20.

Referring now to FIG. 24, one of the lifter pin S/A 384 is depicted in an exploded view. The lifter pin housing/holder 352 is preferably a hollow cylinder exhibiting a flange 382 at one (proximal) end, and at a distal end a plurality of through holes 373. The through holes 373 are opposite each other in the lifter pin housing/holder 352. The lifter pin (or extension) 272 is a cylinder having a flange 380 at one end, and a shallow opening 386 that is proximal to the flange 380. The lifter pin 272 is basically a solid cylinder, apart from this opening 386 at one end.

The spring base 377 exhibits a plurality of through holes 363. A cap 375 exhibits a plurality of through holes 365 and a spring post 383. To assemble one lifter pin S/A 384, the cap 375 fits inside the spring base 377, an interior lifter spring 376 fits over the post 383, the lifter pin 272 sits on top of the post 383 and the interior lifter spring 376, and the lifter pin housing/holder 352 goes over the lifter pin 272. A dowel or spring pin 371 goes through openings 363, 365, and 373, thereby securing the lifter pin S/A 384 together.

When the first alternative embodiment lifter S/A 270 is assembled, the spring base 377 clears the upper plunger portion 368, and the pin housing flange 382 rests proximal to the shuttle 276. The first alternative embodiment lifter S/A 270 is designed so that every individual lifter pin 272 exhibits individual movement that travels in a direction parallel to the longitudinal axis of the lifter shaft 279. By using the exterior springs 374 and the interior springs 376, each lifter pin 272 is able to extend and retract individually, as well as together as a group. During a drive stroke, the solenoid 275 is not actuated, which means the plunger 367 is not actuated (see FIG. 21). Since the plunger 367 is not actuated, the shuttle return spring 354 forces the shuttle 276 to a position distal from the lifter first cover/guide 274, the shuttle 276 is not forcing the exterior springs 374 to compress, and thus, the lifter pins 272 are retracted and their faces become nominally co-planar with the face of the lifter first cover (the "guide") 274. In other words, the lifter pins 272 will not interfere with the driver 262 and the driver protrusions 266 during the drive stroke.

However, during a lift stroke (or return stroke), the solenoid 275 is actuated, and forces the plunger 367 "upwards," which compresses the shuttle return spring 354, and the shuttle 276 is forced towards the lifter first cover/guide 274. This action forces the spring base 377 to slide "upwards" along the grooves 369, and the cap 275 compresses the interior springs 376 against the lifter pins 272. This typically causes the lifter pins 272 to extend from the lifter pin housing/holder 352. In this action, the spring base 377 acts as a "pusher."

In a typical return stroke, the protruding lifter pins 272 rotate with the lifter S/A 270 and "catch" individual driver teeth 266, quickly forcing the driver 262 into a ready position. On some occasions, however, an interference condition (such as a jam) may occur where the driver teeth 266 can interfere with the lifter pins 272. A typical jam condition is one in which a fastener becomes misaligned, or improperly driven into a workpiece. Another typical interference condition can occur after a drive stroke, in which one or more of the driver teeth 266 are simply covering one or more of the lifter pins 272 due to a driver misposition, such as can occur when the tool's piston stop becomes well worn. Any of these above interference conditions are also sometimes referred to as a "driver misalignment."

In a jam condition, for example, the individual movement exhibited by each lifter pin 272 helps to relieve this condition. A typical jam condition may leave one or more driver teeth 266 covering, or partially covering, one or more lifter pins 272. Any individual lifter pin 272 that is not covered by a driver protrusion 266 is typically protruding from the lifter first cover (the "guide") 274, as explained above. Any individual lifter pin 272 that is covered, or partially covered, by a driver protrusion 266 is forced to remain in the lifter pin housing/holder 352. When this occurs, the specific driver protrusion 266 covering the specific lifter pin 272 forces the interior spring 376 of that individual lifter pins 272 to compress.

When the lifter S/A 270 begins to rotate for a lift stroke, any covered—i.e., "blocked"—lifter pin(s) 272 are not able to engage with the driver protrusions 266. In other words, such blocked lifter pins cannot perform their typical function of lifting one of the driver protrusions, but instead will slide along the back of the driver 262, as the lifter S/A begins its lifting stroke. However, once the lifter S/A 270 has rotated far enough, the blocked lifter pin(s) 272 will extend, and join the configuration of the other extended lifter pins, and therefore, will be able to assist in the lifting stroke.

This movement of retracting and protruding lifter pins due to the interior springs 374 is performed parallel to the longitudinal axis 385 of the lifter S/A 270, not radially.

FIGS. 25-30 depict some of the conditions described above, and thus illustrate how the lifter pins exhibit independent movement along the longitudinal axis 385.

Referring now to FIG. 25-A, the lifter S/A 270 is depicted in a front view. FIGS. 25-A through 25-C depict an interference condition at the start of a lift stroke. The solenoid 275 is actuated, and most of the lifter pins 272 are protruding from the lifter first cover (or "guide") 274. An interference condition is depicted at reference numeral 336, where driver protrusion interference is causing one of the lifter pins (336) to become blocked.

Referring now to FIG. 25-B, a left side view of FIG. 25-A is depicted. As can be seen in FIGS. 25-A and 25-B, the driver 262 is again positioned at an angle that is substantially perpendicular with respect to the longitudinal axis of the lifter shaft 279.

Referring now to FIG. 25-C, a perspective view of FIG. 25-A is shown. A majority of the lifter pins 272 are shown extended from the lifter first cover (or "guide") 274. However, due to the interference, one lifter pin 336 remains mostly inside the lifter first cover (or "guide") 274, in a blocked position. The blocked lifter pin 336 is compressing its individual interior spring 376, whereas the protruding lifter pins have uncompressed interior springs. In order to resolve the interference condition, the lifter S/A 270 merely needs to continue rotating until the interfered—with (i.e., blocked) lifter pin 336 slides past the interference.

Referring now to FIG. 26-A, the lifter S/A 270 is depicted in a front view as the lift stroke continues and resolves the interference condition depicted in FIGS. 25-A through 25-C. The solenoid 275 is actuated, forcing the lifter pins 272 to protrude and extend from the lifter first cover (the "guide") 274. As described above, to resolve the previous jam condition depicted in FIGS. 25-A through 25-C, the lifter S/A 270 continues to rotate, until the lifter pin 336 slides past the interfering driver protrusion 266. At reference numeral 338, a non-interference position is depicted, wherein the lifter pin 338 "catches" the individual driver protrusion 266 in order to lift the driver 262 back to the ready position. Note that additional lifter pins 272 will catch further individual driver protrusions 266 as the lifter S/A 270 continues to lift the driver 262 towards the ready position.

Referring now to FIG. 26-B, a left side view of FIG. 26-A is shown.

Referring now to FIG. 26-C, a perspective view of FIG. 26-A is shown. In this view, the interference condition depicted in FIGS. 25-A through 25-C is resolved, at the non-interference lifter pin 338. In this view, all the lifter pins 272 are fully extended and may engage with the driver protrusions 266. It will be understood that the spacings between the lifter pins 272 match up to the spacings between the driver protrusions 266 so that, as the lifter S/A 70 rotates, each lifter pin 272 will "catch" the next driver protrusion 266.

Referring now to FIG. 27-A, the lifter S/A 270 is depicted in a front view showing the ready position. The solenoid 275 is not actuated, and the lifter pins 272 are retracted into the lifter pin housings/holders 352, except for a single lifter pin 334 holding the driver 262. As described below, the single lifter pin 334 is protruding due to the force exerted on it by the driver protrusion 266 overcoming the spring biasing force of the exterior lifter spring 374.

Referring now to FIG. 27-B, a left side view of FIG. 27-A is shown. FIG. 27-B depicts the ready position before the lifter S/A 270 begins rotating in preparation for a drive stroke (see FIGS. 28-A through 28-C for the pre-drive stroke ready position state).

Referring now to FIG. 27-C, a perspective view of FIG. 27-A is shown. The driver protrusion 266 is fully engaged with the single lifter pin 334. Note that the majority of the lifter pins 272 are retracted, apart from the single lifter pin 334 holding the driver 262 which is protruding from the lifter first cover (or "guide") 274.

Referring now to FIG. 28-A, the lifter S/A 270 is depicted in a front view holding the driver 262 during a rotational movement that is about to cause a drive stroke. In this state, the solenoid 275 is not actuated, and a majority of the lifter pins 272 have been retracted inside the lifter pin housing/holder 352. However, a single lifter pin 334 is holding the driver 262. The mechanical load from the driver protrusion 266 of the driver 262 on the single lifter pin 134 is great enough to overcome the spring biasing force of the single lifter pin's exterior spring 374 that would otherwise retract this single lifter pin. Note that the other lifter pins have been pushed back into their retracted positions due to their exterior springs.

Referring now to FIG. 28-B, a left side view of FIG. 28-A is depicted. FIGS. 28-A through 28-C are illustrating a state in which the lifter S/A 270 has already partially rotated so that the driver protrusion 266 is about to "fall off" and perform a driver stroke, allowing the exterior spring 374 to force the single lifter pin 334 to retract into the lifter pin housing/holder 352. As described above, a typical ready position is when the single lifter pin 334 is holding a more significant portion of the single driver protrusion 266 (see FIG. 27-A).

Referring now to FIG. 28-C, a perspective view of FIG. 28-A is shown. The single lifter pin 334 is again holding a single driver protrusion 266, thereby holding the driver 262 at the ready position. Note how the single driver protrusion 266 is contacting the single lifter pin 334. Also note that all five of the other lifter pins are fully retracted as can be seen in this perspective view.

Referring now to FIG. 29-A, the lifter S/A 270 is depicted in a front view at the beginning of a drive stroke. When a drive stroke begins, the lifter S/A 270 has rotated just enough for the single lifter pin 334 to rotate past the driver protrusion 266. When that occurs, the exterior spring 374 is allowed to uncompress and biases that single pin back down into the lifter pin housing/holder 352, joining the other lifter pins 272. The driver 262 is now "free," and begins a drive stroke.

Referring now to FIG. 29-B, a left side view of FIG. 29-A is depicted.

Referring now to FIG. 29-C, a perspective view of FIG. 29-A is depicted. As can be seen in this perspective view, all of the lifter pins 272 are retracted.

Referring now to FIG. 30-A, the lifter S/A 270 is depicted in a front view at the end of a drive stroke. The solenoid 275 is not actuated and the lifter pins 272 are retracted inside the lifter pin housing/holder 352. Note that in this view, the driver 262 has stopped at a position that is not misaligned.

Referring now to FIG. 30-B, a left side view of FIG. 30-A is depicted. At the end of a drive stroke, the driver protrusions 266 are mostly past the lifter S/A 270. In other words, the driver 262 is in its "down" (driven) position. In FIGS. 30-A through 30-C, no initial interference condition is depicted, because none of the driver protrusion 266 will interfere with any of the lifter pins 272 so that the lifter pins can be extended for a lift stroke.

Referring now to FIG. 30-C, a perspective view of FIG. 30-A is shown. This view illustrates the lifter S/A 270 just as the driver 262 finishes its driving stroke, and before the lifter pins 272 attempt to be extended.

Referring now to FIG. 31-A, a right side view of a single lifter pin S/A 384 is shown in a retracted position. The lifter pin 272 is mostly inside the lifter pin housing (the "holder") 352, and the internal spring 376 is compressed.

Referring now to FIG. 31-B, a top view of the single lifter pin S/A 384 of FIG. 31-A is shown.

Referring now to FIG. 31-C, a cutaway view along the line 31-31 of FIG. 31-B of the single lifter pin S/A 384 is depicted. The lifter pin 272 is in a retracted position, and the internal spring 376 is compressed. The lifter pin housing/holder 352 has an interior stop 381, and when the lifter pin 272 is in an extended position, the flange 380 rests against this interior stop 381. The post 383 and the compressed interior spring 376 fit inside the opening 386 of the lifter pin 272. The dowel or spring pin 371 secures the lifter pin housing/holder 352, the cap 375, and the spring base/pusher 377 together.

Referring now to FIG. 32-A, a right side view of a single lifter pin S/A 384 is shown in an extended position.

Referring now to FIG. 32-B, a top view of the single lifter pin S/A 384 of FIG. 32-A is shown.

Referring now to FIG. 32-C, a cutaway view along the line 32-32 of FIG. 32-B of the single lifter pin S/A 384 is depicted. In the extended position, the lifter pin 272 is extended from the lifter pin housing/holder 352 far enough to "catch" a driver protrusion 266 during a lift stroke. The interior spring 376 is uncompressed, and the flange 380 is pressed against the interior stop 381. The opening 386 only has part of the uncompressed interior spring 376 inside, and not the post 383.

Figure 33:
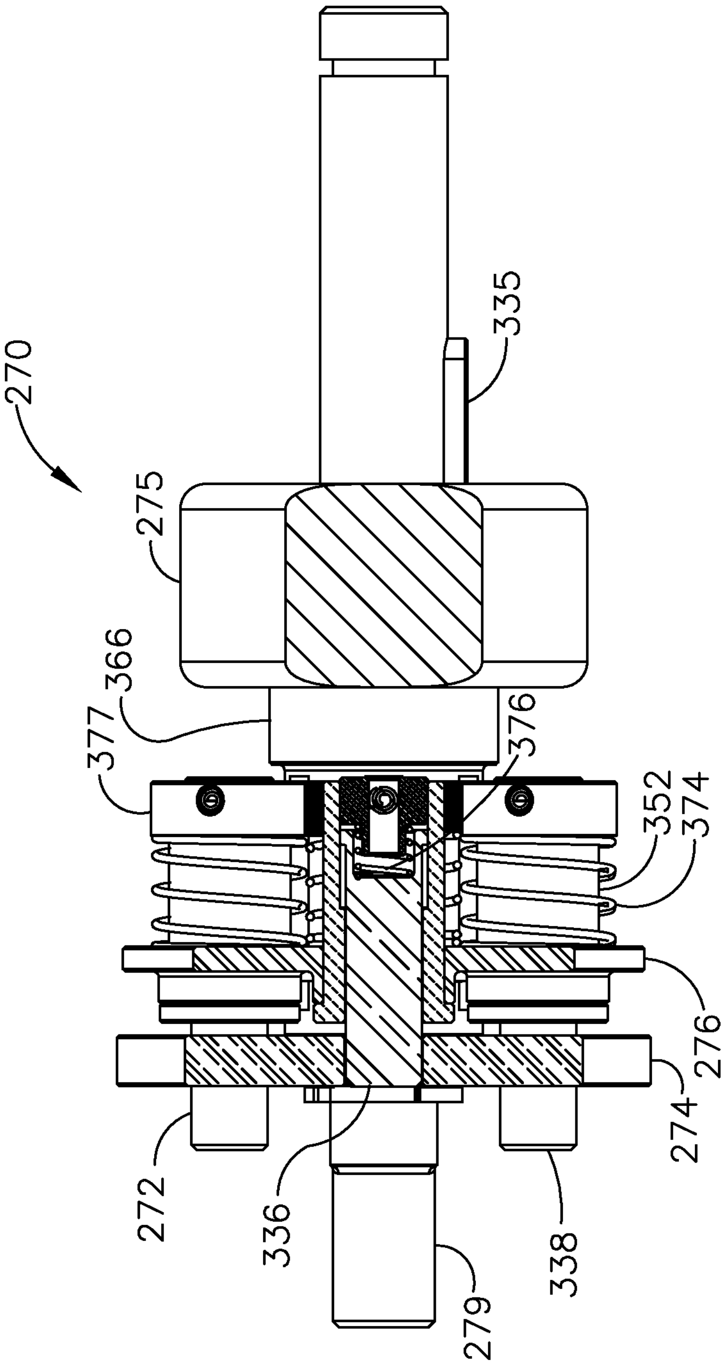
FIG. 33 is a right side cutaway view of the lifter of FIG. 20, in which a single lifter pin is blocked due to interference with at least one driver protrusion (not shown).

Referring now to FIG. 33, a cutaway view of the lifter S/A 270 is shown. In FIG. 33, a single lifter pin 336 is blocked due to the driver protrusion interference (as shown in FIGS. 25-A through 25-C). The solenoid 275 and the plunger 367 are actuated. The plunger 367 has forced the shuttle 276 "leftwards" (in this view) proximal to the lifter first cover/guide 274, which forces the lifter pins 272 to protrude from the lifter base. However, due to the interference, the single lifter pin 336 is still blocked. That blocked lifter pin 336 has its interior spring 376 compressed, and its exterior spring 374 uncompressed because the flange 382 of the lifter pin housing/holder 352 is in contact with a seat 378 (see FIGS. 38-40) of the shuttle 276. (Note that, if not for the interference with the misaligned driver, the interior spring 376 would force the lifter pin 336 to its extended position.)

Figure 34:
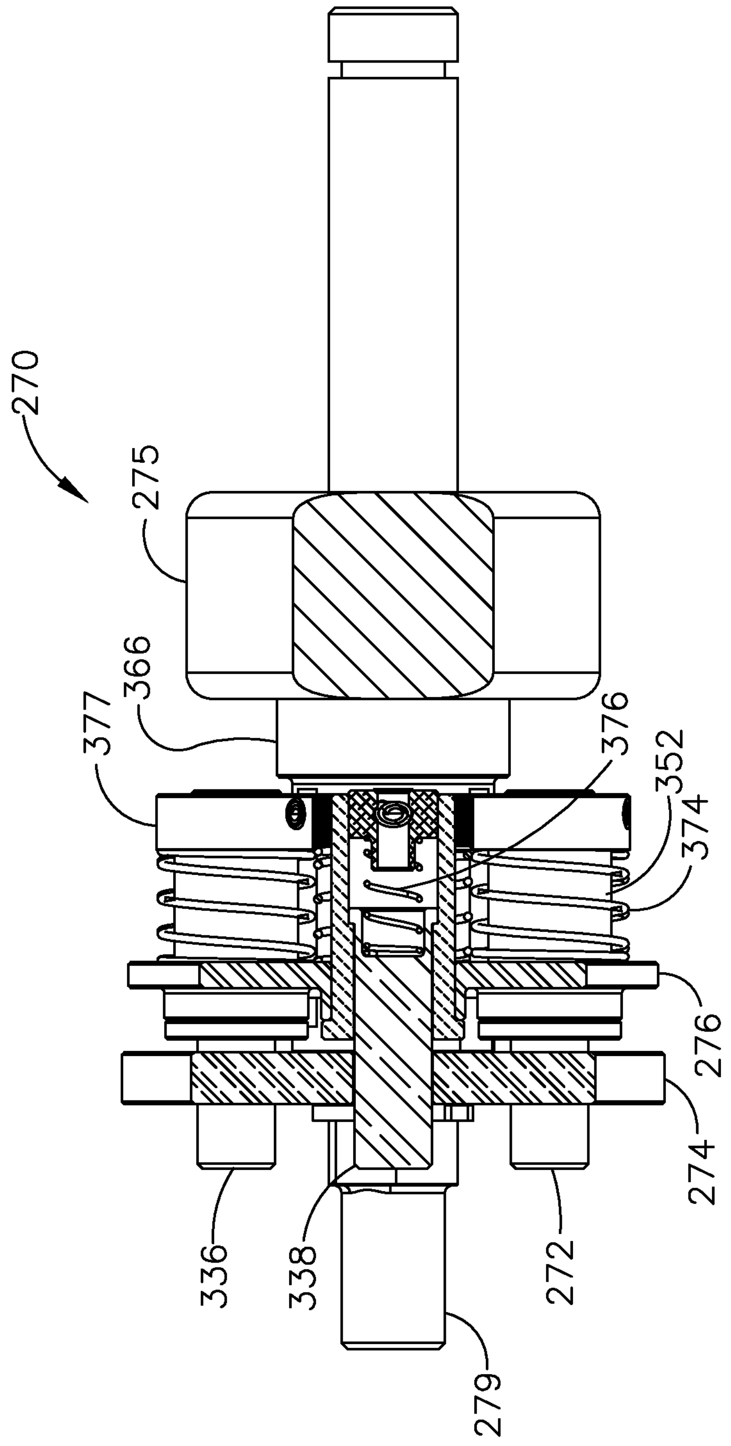
FIG. 34 is a right side cutaway view of the lifter of FIG. 20, in which all the lifter pins are extended.

Referring now to FIG. 34, a cutaway view of the lifter S/A 270 is illustrated. In FIG. 34, all of the lifter pins 272 are extended and ready for a lift stroke (as shown in FIGS. 26-A through 26-C). The solenoid 275 and the plunger 367 are actuated. The plunger 367 has forced the shuttle 276 "leftwards" (in this view) proximal to the lifter first cover (or "guide") 274, which forces the lifter pins 272 to protrude from the lifter first cover. In FIG. 34, all of the lifter pins 272 interior springs 376 and exterior springs 374 are uncompressed. FIG. 17 illustrates a "freeing" state of the lifter pins 272. Note also, if the driver 262 had not been misaligned, this would be the appearance of all the lifter pins 272 at the beginning of a "normal" lifting stroke (see FIGS. 26A through 26-C).

Figure 35:
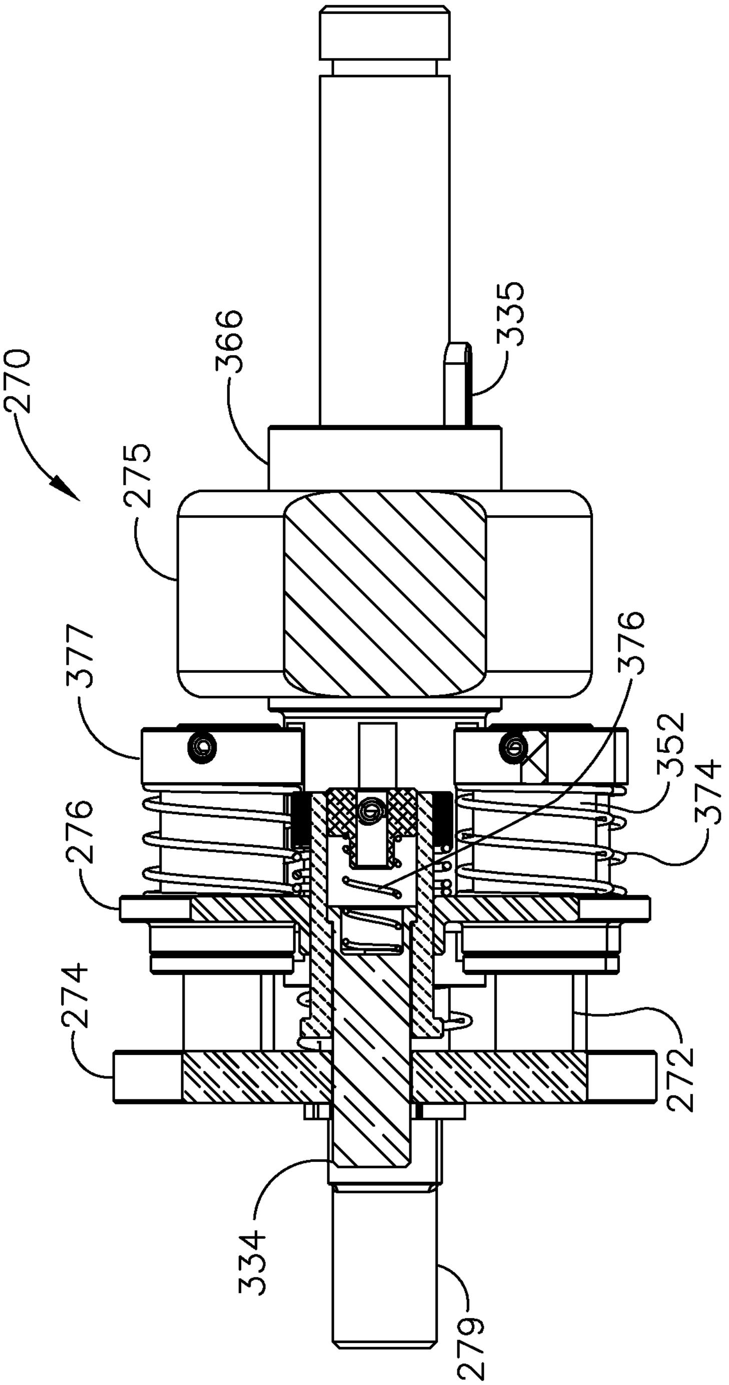
FIG. 35 is a right side cutaway view of the lifter of FIG. 20, in which a single lifter pin is extended and is holding the driver.

Referring now to FIG. 35, a cutaway view of the lifter S/A 270 is illustrated. In FIG. 35, a single lifter pin 334 is extended from the lifter first cover (or "guide") 274. The solenoid 275 and the plunger 367 are not actuated, and the shuttle return spring 354 has moved the shuttle 276 to a position distal from the lifter first cover/guide 274. The remaining lifter pins 272 are retracted into the lifter pin housings/holders 352. The single lifter pin 334 has its interior spring 376 uncompressed, and its exterior spring 374 compressed. This is due to the force exerted from "holding" a single driver protrusion 266 (as shown in FIGS. 27-A through 27-C, and FIGS. 28-A through 28-C).

Figure 36:
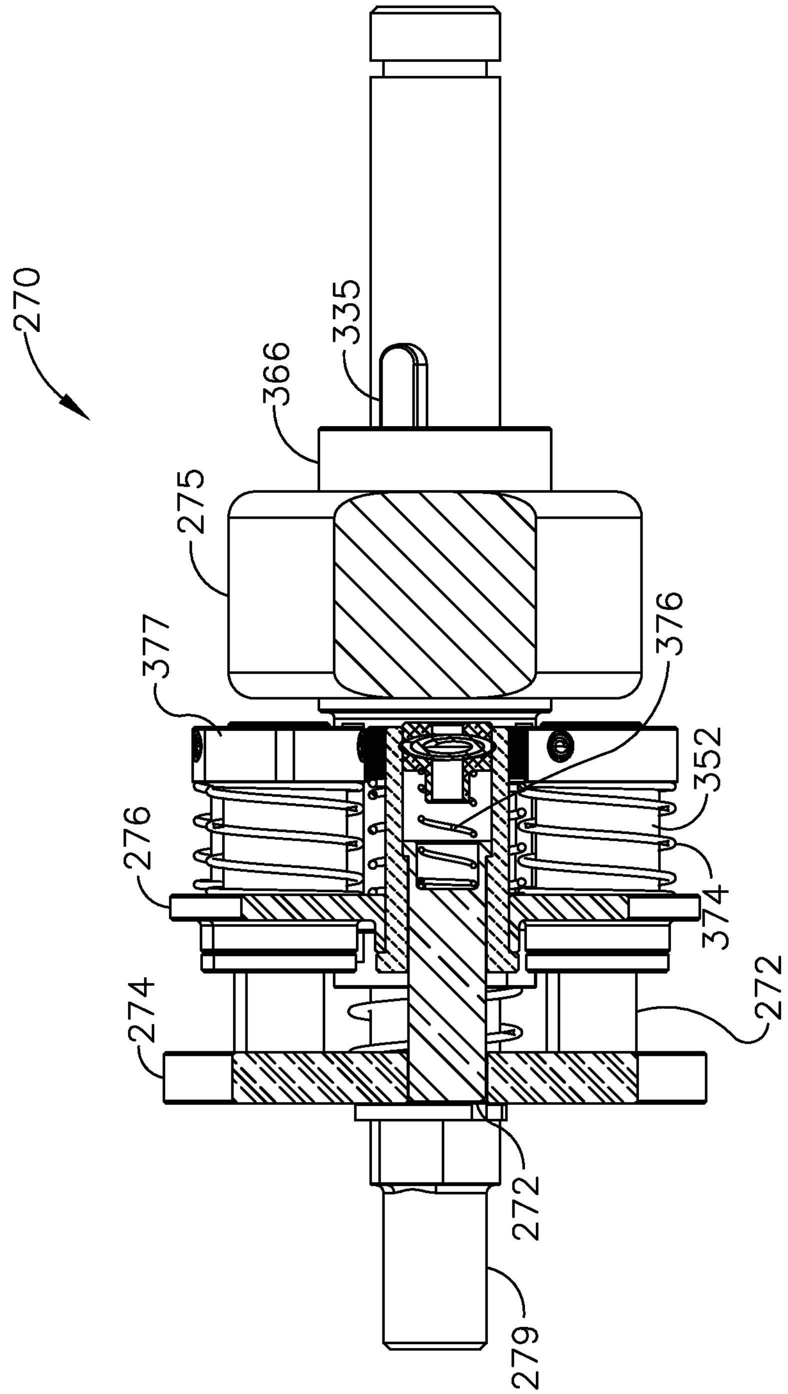
FIG. 36 is a right side cutaway view of the lifter of FIG. 20, in which all the lifter pins are retracted.

Referring now to FIG. 36, a cutaway view of the lifter S/A 270 is depicted. In FIG. 36, the lifter pins 272 are retracted (as shown in FIGS. 29-A through 29-C, and FIGS. 30-A through 30-C). The solenoid 275 and the plunger 367 are not actuated, and the shuttle return spring 354 forces the plunger back to its retracted position. The shuttle 276 is distal from the lifter first cover/guide 274. All of the lifter pins 272 interior springs 376 and exterior springs 374 are uncompressed. This is the appearance of the lifter pins 272 during a driving stroke.

Figure 37A:
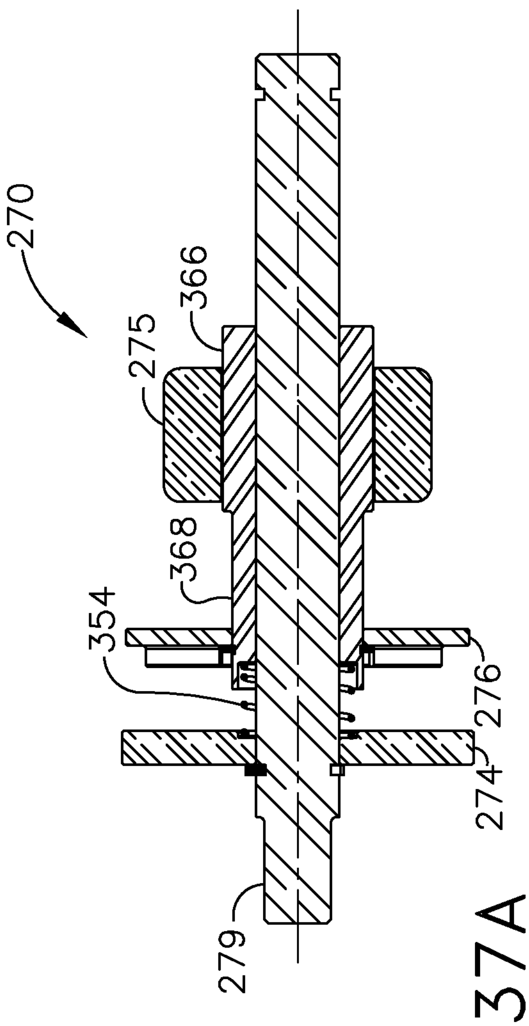
FIG. 37-A is a right side cutaway view of the lifter of FIG. 20 without the lifter pins, in which the lifter is in a retracted state.
Figure 37B:
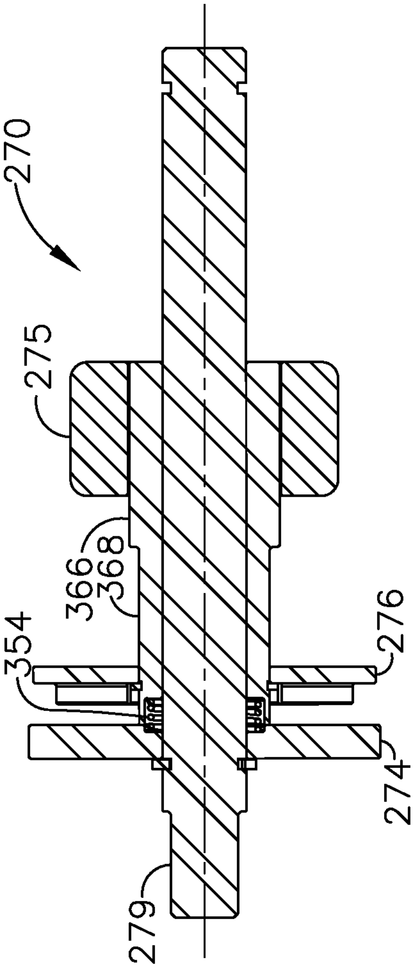

Referring now to FIG. 37-A, a right side cutaway view of the lifter S/A 270 is depicted without the lifter pin subassemblies. In FIG. 37-A, the lifter S/A 270 is in a retracted position. The solenoid 275 and the plunger 367 are not actuated. The shuttle return spring 354 is uncompressed, and the shuttle 276 is distal from the lifter first cover/guide 274.

Referring now to FIG. 37-B, a right side cutaway view of the lifter S/A 270 without the lifter pin S/A 384 is shown. In FIG. 37-B, the lifter S/A 270 is in an extended position. The solenoid 275 and the plunger 367 are actuated. The shuttle return spring 354 is compressed, and the shuttle 276 is proximal to the lifter first cover/guide 274.

Figure 38:
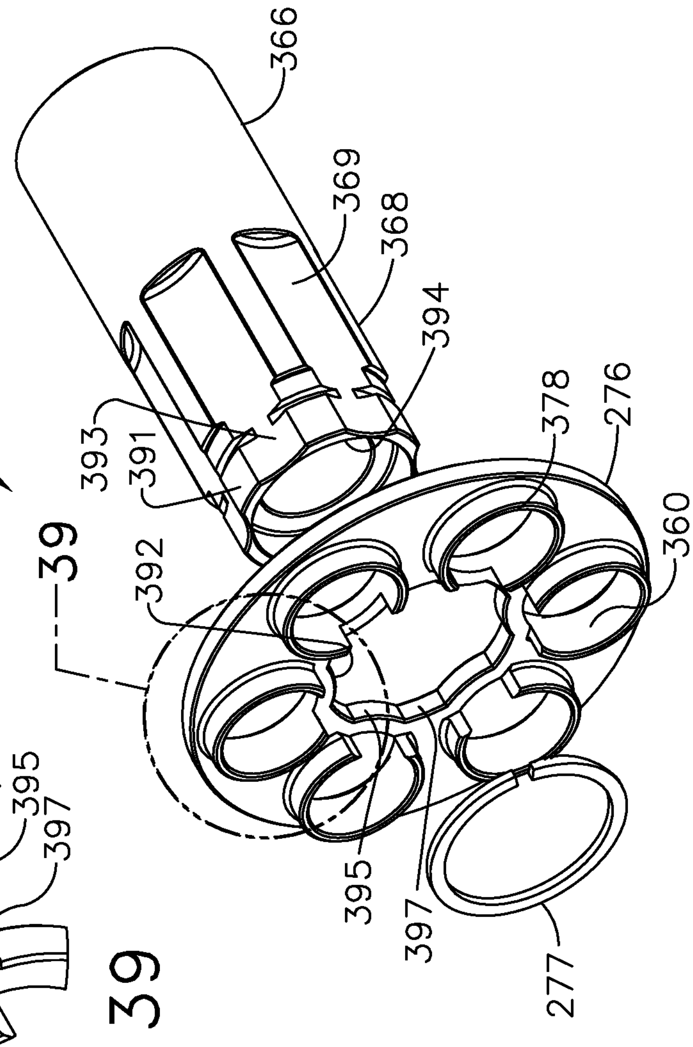
FIG. 38 is an exploded view of a plunger, a shuttle, and a snap ring portion of the lifter of FIG. 20.

Referring now to FIG. 38, a snap ring 277, a shuttle 276, and a plunger 367 are depicted in an exploded view. The plunger 367 can be made of a single piece of material, and exhibits a plurality of grooves 369 that clear a plurality of lifter pin housings/holders 352 (not shown in this view). The plunger 367 is a hollow cylinder with an opening 394 that fits over the lifter shaft 279 (not shown in this view). At a "left" end (in this view) of the plunger 366, 368 is an alternating plurality of convex portions 391 and concave portions 393, essentially acting as spline.

The shuttle 276 exhibits a plurality of through holes 360 in which the plurality of lifter pin housings/holders 352 seat (not shown in this view), and the shuttle exhibits a central through hole 392 which fits over the plunger 366, 368. A plurality of seats 378 proximal to the through holes 360 contact the lifter pin housings/holders 352 when fully assembled together. The inner perimeter of the central hole 392 exhibits an alternating plurality of concave portions 397 and convex portions 395, essentially acting as spline.

The shuttle 276 fits over the "left" end (in this view) of the plunger 367 such that the plurality of portions 397 on the shuttle fit over the plurality of portions 391 on the plunger, and the plurality of portions 395 on the shuttle fit over the plurality of portions 393 on the plunger. This seating "arrangement" allows the plunger 367 and the shuttle 276 to rotate together when the lifter shaft 279 is rotated. As noted above, the plunger 367 is keyed to the key 335 on the lifter shaft 279, which allows the plunger to rotate with the lifter shaft. The snap ring 277 secures the shuttle 276 to the plunger 367.

Figure 39:
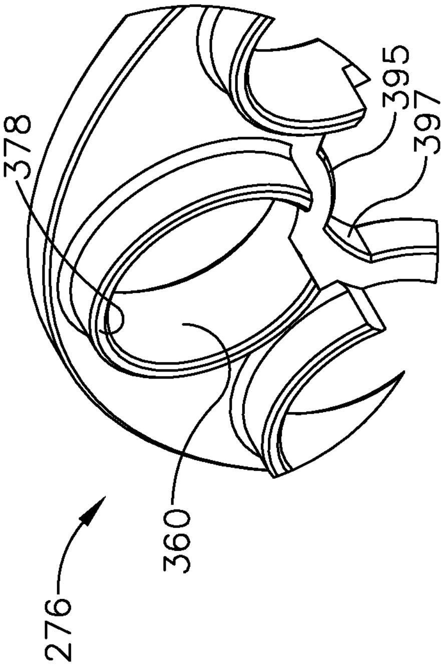
FIG. 39 is an enlarged view of the area of line 39-39 of FIG. 38.

Referring now to FIG. 39, an enlarged view of the area 39-39 of FIG. 38 is depicted. FIG. 39 provides an enlarged view of one of the plurality of seats 378. As well be described below, each lifter pin housing/holder 352 contacts each one of the plurality of seats 378 when the lifter S/A 270 is assembled together.

Figure 40:
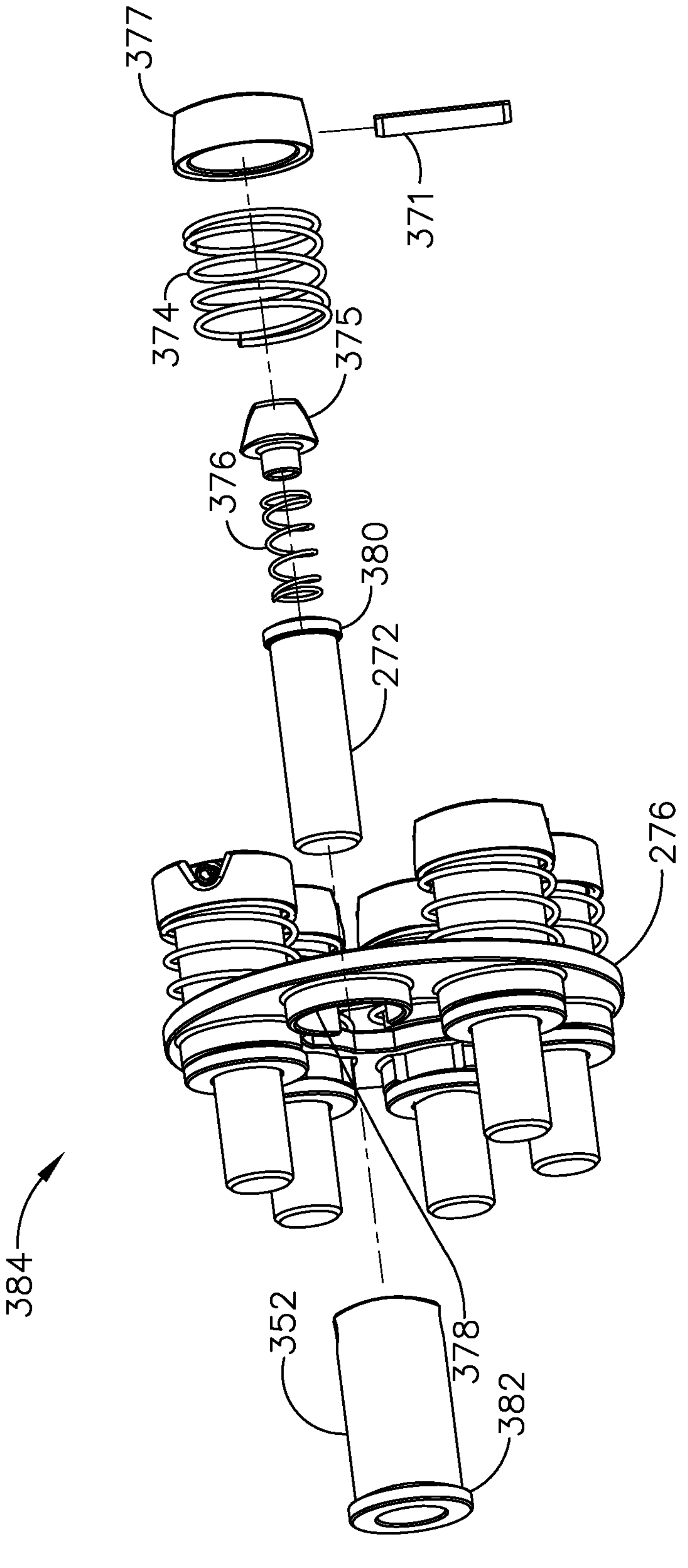
FIG. 40 is an exploded view of a single lifter pin sub-assembly, along with an assembled view of the full lifter pin sub-assembly, including a shuttle, of the first alternative embodiment lifter of FIG. 20.

Referring now to FIG. 40, a single lifter housing S/A 384 is shown in an exploded view. The shuttle 276 is also illustrated to show how the lifter housing S/A 384 seats onto the shuttle. A single lifter housing/holder 352 is pushed into a through hole 360 until the pin housing flange 382 contacts the seat 378. Then a single lifter pin 272 is pushed into the lifter housing/holder 352, and then an interior lifter spring 376 and a cap 375 are pushed onto the lifter pin 272. Last, an exterior lifter spring 374 is pushed over the outside of the lifter pin 272, and the spring base/pusher 377 is pushed onto the cap. A dowel or spring pin 371 is used to secure the spring base/pusher 377, the cap 375, and the lifter housing/holder 352 together.

When in operation, the pin housing flange 382 and the seat 378 are most frequently contacting each other. However, for every discreet drive event, that changes as follows: the rotation of the lifter S/A 270 is stopped with the driver 262 in a selected "ready" location (see FIGS. 27-A, 27-B, and 27-C). This is a position where the solenoid 275 is de-activated and the lifter pins 272 are withdrawn to a retracted position nominally co-planar with the face of lifter guide 274, except for lifter pin 334, which has been prevented from axial movement by the side-loading force of the driver protrusion 266 on that pin 334.

Since the shuttle 276 and plunger 266, 268 have moved to their retracted state, and the lifter pin 334 is fixed by the driver 262 (see FIGS. 27-A through 27-C), the associated pin housing/holder 352 is also fixed by the driver, since (refer to FIG. 32-C) the lifter pin flange 380 (as can be seen in FIG. 24) of pin 334 is in contact with the internal flange 381 of pin housing/holder 352. (Note: generically in FIGS. 24 and 40 the lifter pin 334 is known as lifter pin 272.) Therefore, the external spring 374 of the pin assembly 384 that is associated with 'held' lifter pin 334 will compress. This allows the pin housing flange 382 and the shuttle seat 378 to separate until the driver 262 releases the lifter pin 334 in a typical drive event. Then the spring 374 of 'held' lifter pin 334 will un-compress, returning that lifter pin's (#334) entire pin S/A 384 to the same condition as the other pin sub-assemblies (#384), in preparation for another return stroke.

As before, it will be understood that any type of linear actuator could be used instead of the solenoid 275. For example (again), a linear motor could be used instead of a solenoid to form such a linear actuator, and furthermore, such a linear actuator could be constructed using a rotational motor, along with a mechanism that converts the rotary motion into linear motion.

General Case Description

The lifter embodiments described herein have common elements that involve the general layout of the lifter pins, and how they move to reduce the likelihood of jamming or breaking a misaligned driver at the end of a driving stroke. The lifter pins in the various embodiments described herein also have a common way to hold a driver at its "Ready" position at the end of a lifting stroke.

For example, all embodiments of the lifter assembly described herein include a lifter shaft that extends into the rotatable lifter sub-assembly that contains the multiple lifter pins. A solenoid (or other type of linear actuator) is positioned near (proximal to) a first end of the lifter shaft, and this linear actuator/solenoid is actuated to begin a lifting (or "return") stroke that forces the driver of the fastener driving tool to be moved toward the Ready position. Before that occurs, however, the lifter must have completed a driving stroke.

To move the driver toward the Ready position, the lifter sub-assembly is rotated while the lifter pins are positioned in an extended position, which allows the lifter pins to physically contact the multiple protrusions (or "teeth") along the longitudinal edge of the driver. As the lifter sub-assembly rotates, the multiple lifter pins sequentially contact one of the driver protrusions, and keep doing so until the driver has made it all the way to its Ready position. When that occurs, the lifter sub-assembly stops rotating.

When the driver reaches the Ready position and the lifter stops rotating, a single lifter pin will be in contact with a single driver protrusion. It does not make any significant difference which exact lifter pin is the one that is in contact with that driver protrusion, since all lifter pins in the illustrated embodiments are essentially identical in size and shape. On the other hand, the driver protrusion that is making contact with a lifter pin when at the Ready position is always the same driver protrusion, unless the product designer has decided to create a tool that is able to drive fasteners at different lengths of a driving stroke. That possibility is easily accomplished in the present illustrated embodiments, merely by adding a linear encoder, or by adding a sensor at a different position along the driver track in the tool's guide body, which would be able to send a signal to the lifter shaft's motor to stop its rotation to shorten the lifting stroke. This is quite possible in these illustrated designs because, again, it does not make any real difference as to which exact lifter pin is making contact with the driver protrusion at the stopping position that is equivalent to the Ready position.

The lifter sub-assembly includes a rotatable structure that holds a plurality of lifter pins in a circular pattern, so that when the lifter structure rotates, the individual lifter pins move in a circular path that sequentially contacts the driver's protrusions, thereby forcing the driver to move "up", i.e., toward the Ready position. In this description, the direction "up" has a meaning that not only is toward the Ready position along the driver track of the tool's guide body (not shown in these drawings), but also toward a higher pressure position of a piston that is in mechanical communication with the driver (also not shown in these drawings). It will be understood that the piston that forces the driver "down" (i.e., toward a "Driven" position—where a fastener is driven into a workpiece) is propelled by a pressurized gas. In this type of fastener driving tool, there is a storage chamber of pressurized gas that is re-used for multiple driving strokes—i.e., the pressurized gas is not vented to atmosphere after the driving stroke. This tool is described in detail in the various patent documents listed below, and incorporated by reference. Therefore, the direction "up" is toward a higher pressure position for the piston, being forced against the enchambered pressurized gas as the piston-driver combination is being lifted toward the Ready position.

The lifter's rotatable structure holds the plurality of lifter pins in an orientation that is substantially parallel to the longitudinal axis of the lifter shaft. Each of these lifter pins is biased in both directions, typically by use of a spring located at or near each end of the pins. However, it will be understood that, in the various embodiments disclosed herein, the precise structure of the lifter pins is more complex than merely placing a spring at the end for each of the lifter pins, and in fact, that is not the typical construction technique used in these embodiments. What is important is that the lifter pins have some type of biasing elements that work in both directions of lifter pin travel.

In the illustrated embodiments, the structure holding the lifter pins includes a first cover that is positioned proximal to the second end of the lifter shaft, with that first cover exhibiting a first plurality of openings or through-holes proximal to an outer perimeter of the first cover, noting that the first cover is generally circular in outer shape (at its outer perimeter). The first cover receives the lifter shaft, so that when the lifter shaft rotates, the entire rotatable structure of the lifter sub-assembly rotates, which is what impels the driver to undergo a lifting (or return) stroke.

In the illustrated embodiments, the structure holding the lifter pins also includes a second cover that is positioned proximal to the solenoid. This second cover exhibits a second plurality of openings or through-holes that are proximal to an outer perimeter of the second cover. Similar to the first cover, the second cover is generally circular in outer shape (at its outer perimeter). Generally speaking, the first plurality of openings are co-linear with the second plurality of openings, for containing the lifter pins. Furthermore, in general, the first plurality of openings and the second plurality of openings are both positioned in circular patterns so as to allow the lifter pins to 'catch' the driver protrusions at equally-spaced distances between those driver protrusions, along the longitudinal edge of the driver.

The lifter pins are essentially held in their general positions between the first and second covers. Of course, other structural elements could be used to help hold the lifter pins in their general positions, if desired by the tool's system designer. In all cases, however, the lifter pins are able to move in the longitudinal direction, as noted above. The lifter pins are also able to protrude through at least one of the two covers. That is, when the lifter pins are to be placed into their "extended" position(s), those lifter pin(s) will protrude from the first cover, which is toward the movable driver. In this manner, those extended lifter pins will be in a correct position to physically engage with the driver protrusions to cause a lifting stroke to occur, when desired by the tool's system controller.

In this general embodiment description, the lifter pins are 'seated' at the second openings of the second cover (or holder), and the lifter pins may (when they extend) protrude through the first openings of the first cover (or holder). In other words, the lifter pins may be allowed to extend through the second openings—as through-holes—if desired by the system designer, but they are not required to. On the other hand, the lifter pins need to be supported so that they remain in their overall 'longitudinal movement' orientation by some structure (e.g., the holders or covers), since the single lifter pin that remains extended at the lifter's Ready position will be subjected to a considerable side-loading force by the driver protrusion that is pressing against that lifter pin, due to the relatively high pressure exerted by the tool's piston, which forces are transferred to the driver.

As noted above, the solenoid is not actuated to begin a driving stroke. The solenoid includes a movable plunger that, when not actuated, does not attempt to force the lifter pins to move to their extended positions. There is sufficient mechanical clearance to allow the driver to quickly move toward its driven position only when the lifter pins are retracted, and thus, out of the way to allow that type of driver movement. When everything is working properly, the driver moves through its entire travel very quickly, and therefore, the solenoid needs to remain not actuated until it is time for a lifting stroke.

In the opposite sense, when a lifting stroke is desired, the solenoid is actuated, and the movable plunger moves to its actuated state. When that occurs, the biasing forces working on each lifter pin attempt to force the lifter pins to move to their extended positions. However, if the driver is misaligned at the end of a driving stroke, then one of more of the lifter pins may not be able to extend, because one or more of the driver protrusions is in a position that mechanically interferes with the extension of one or more of those lifter pins. In that interfering event, the affected lifter pin(s) will not fully extend, and instead will become blocked, and will only slightly move to a 'blocked position,' and thus, mostly remain within the lifter sub-assembly. These movements are possible with the use of proper biasing elements (e.g., springs) that are used with the lifter pins.

Note that the extended state of the lifter pins is their "active position" state. In other words, the solenoid is actuated to achieve that condition. Therefore, when a driving stroke is desired, the solenoid must de-activate, as noted above. However, the mechanical loading forces between the lifter pin that is holding the "first" driver protrusion at the time the driver is located at its "Ready" position are quite high, due to the pressurized gas that is always pressing against the piston, which in turn, is transferred to the driver. This mechanical loading force imparted by the driver protrusion is quite sufficient to prevent the lifter pin's retraction at the moment the solenoid de-activates, because the spring forces for the lifter pins are intentionally selected so that this mechanical loading force will not be overcome. Therefore, all the lifter pins will retract except for the single lifter pin that is holding that single protrusion of the driver.

The seeming dilemma for this affected lifter pin is resolved by rotating the lifter sub-assembly. As the affected lifter pin begins to move in a circular direction, it will eventually lose contact with that 'holding' protrusion of the driver, and the driver will then quickly move in a driving stroke toward the driven position. This loss of physical contact is sometimes referred to as "falling off" the driver. As soon as the lifter pin falls off the driver protrusion, that lifter pin will quickly be forced to move to its retracted position by the biasing forces mentioned above. This prevents that affected lifter pin from interfering with any of the other driver protrusions as the driver moves through its driving stroke, as the lifter sub-assembly continues to rotate.

Finally, once the driver-piston combination bottoms out at the end of its driving stroke travel, it will settle into a driven position after it stops its movement, typically after bouncing around for a small amount of time after the piston impacts the piston stop (not illustrated herein—see the patent documents listed below). As the driver movement stops, it will either be properly aligned so that it can be lifted by the rotating lifter pins, or not. Alternatively, if the driver ends its movement in a misaligned position, the first lifter pin to physically touch one of the driver's protrusions will not be allowed to extend, and will, instead, slide against that driver protrusion without being able to lift the driver. However, the 'next' lifter pin that comes along (due to the lifter sub-assembly's rotational movement) will then be able to contact one of the driver's protrusions in a 'correct' orientation, and begin to lift the entire driver toward its Ready position, and thus accomplish a lifting stroke. Again, this is possible because of the biasing elements used with the lifter pins. And note: any one of the lifter pins can work in this manner, since they are supposed to essentially be identical in size and shape, and have essentially identical biasing elements for each lifter pin. And further note, each lifter pin can exhibit independent movement in the lifter embodiments described herein.

Third Embodiment

Figure 43:
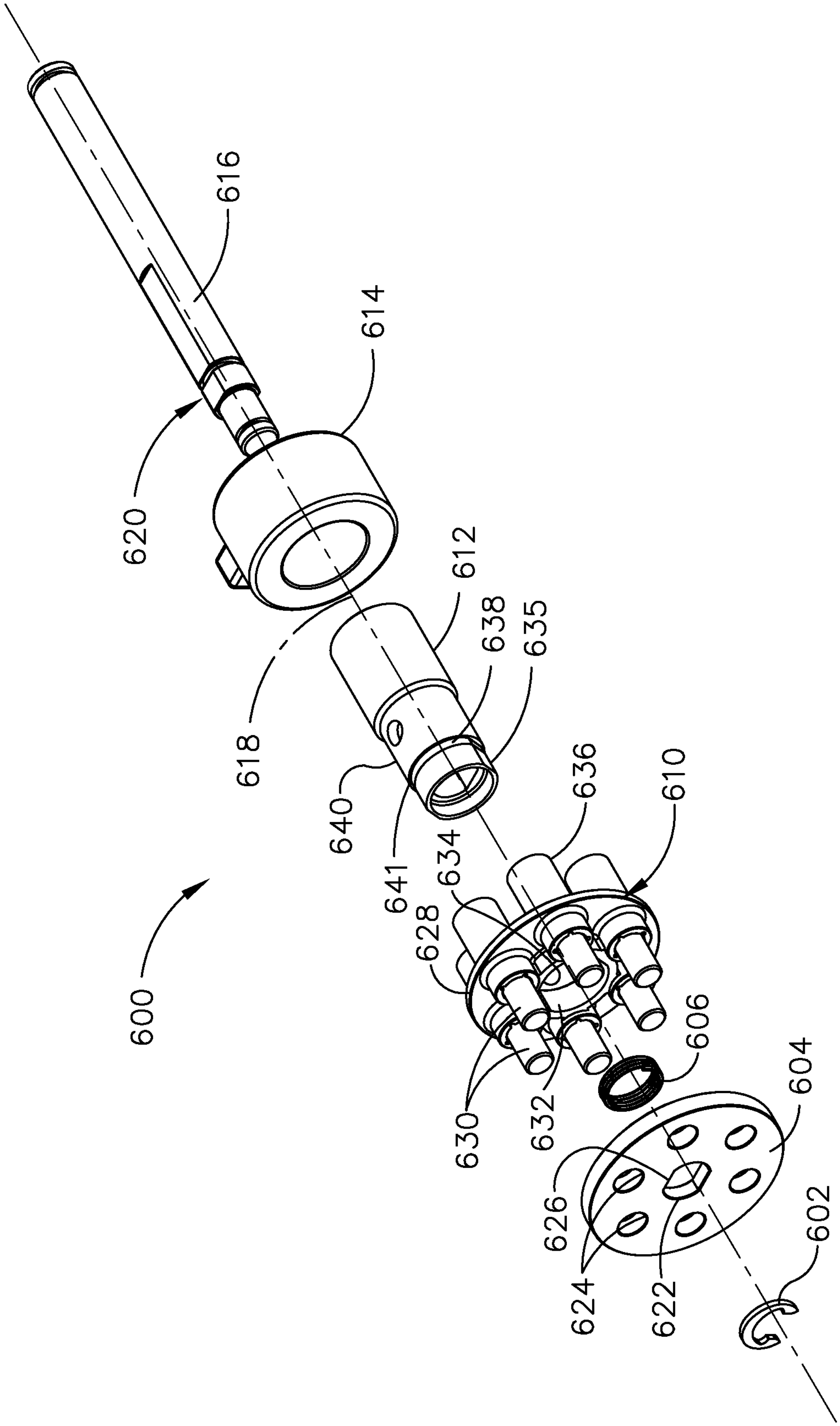
FIG. 43 is an exploded view of a second alternative embodiment (or "Third Embodiment") rotary-to-linear lifter for a fastener driving tool, as constructed according to the principles of the technology disclosed herein.

Referring now to FIG. 43, a second alternative embodiment lifter subassembly (S/A), generally depicted by the reference numeral 600, is illustrated in an exploded view. A snap ring 602 secures a lifter base 604 (also sometimes referred to herein as a "first cover" or "first holder" or, simply, a "guide") to a lifter shaft 616. A shuttle subassembly (S/A) 610 is shown, including a plurality of lifter pins (or "lifter extensions") 630. Each lifter pin 630 includes an individual lifter pin housing 636, and each lifter pin is able to independently slide in and partially out of its lifter pin housing 636. Each lifter pin housing 636 comprises a hollow cylinder with openings on both ends. A spring 606 (or "return spring") fits over the lifter shaft 616, proximal to the shuttle S/A 610.

The lifter shaft 616 exhibits flattened portions 620, a first end and a second end, and a longitudinal axis 618 that extends between the first end and the second end. A movable shuttle 628 (also sometimes referred to herein as a "second cover" or a "second holder") fits on a movable plunger 612 at a "step down" 638 (i.e., at the step down 638, the outer diameter of the movable plunger 612 decreases to a slightly smaller outer diameter), and the plunger has a portion 640 that exhibits a smaller outer diameter than both the outer diameter of the overall plunger 612 and the outer diameter of the step down 638. This portion 640 has a sufficiently small outer diameter so as to accommodate (not mechanically interfere) with the lifter pin housings 636, and these housings are cylinders with openings on both ends. The lifter pin housings 636 are arranged proximal to the outer perimeter of the shuttle/holder 628. It should be noted that a "top portion" 641 of the plunger 612 exhibits a smaller outer diameter than the portion 640, and this top portion 641 exhibits a flat portion 635 that positively aligns (e.g., "keyed") to a flat portion 634 of a shuttle central opening 632. The return spring 606 holds the shuttle S/A 610 in place at the step down 638.

It will be understood that the movable shuttle 628 acts as a "holder" and/or a "cover" for the lifter pins, by virtue of the lifter pin housings 636 that are part of the shuttle. But the phrase "second cover" or "second holder" also carries a meaning of a "shuttle" (i.e., it "acts as a movable shuttle"), because this structure not only holds and covers the lifter pins 630, but it also 'transports' those lifter pins when the plunger 612 changes state, as discussed below.

It will also be understood that the lifter pin housings 636 have the general shape of hollow cylinders, which each have outer cylinder 'walls' that essentially act as cylinder 'sleeves' for the lifter pins. However, these are not air-tight cylinders with reciprocating pistons; they exhibit the general shape of cylinders, but their main purpose is to provide a housing (or 'cover') to (rather freely) 'hold' the lifter pins 630 in their proper locations. Furthermore, if desired, these lifter pin housings 636 can be molded as a unitary part of the shuttle/holder 628, as discussed below.

The plunger 612 with its flat portion 635 also positively aligns to the lifter shaft 616 and is positioned in a central portion of a solenoid 614. The plunger 612 preferably comprises a magnetically sensitive material (such as steel, for example), and when fully assembled the lifter S/A 600 rotates together with the lifter shaft 616. (Note: the solenoid 614 does not spin because it is axially fixed on the lifter shaft 616.) The solenoid 614 and the plunger 612 together are sometimes referred to herein as a "linear actuator."

It will be understood that the solenoid 614 in this embodiment includes electrical windings that create a magnetic force on the plunger 612, when those windings are energized. This energized state will also sometimes be referred to herein as the "actuated" state (or the "on" state), and the de-energized state will also sometimes be referred to herein as the "non-actuated" state (or the "off" state). As will be discussed hereinbelow, the actuated state is generally used to 'lift' the driver toward its "ready" position, which is also referred to as a "lift stroke."

The lifter base/guide 604 exhibits a plurality of openings 624 proximal to an outer perimeter of the lifter base, and a central opening 622 which exhibits a flat portion 626 (in two locations). These flat portions 626 positively align to the flattened portions 620 of the lifter shaft 616 (i.e., the lifter base/guide 604 is axially fixed to the lifter shaft 616 relative to the solenoid 614). After assembly, the lifter pins 630 are secured in these openings 624, and seat in the lifter pin housings 636. As noted above, the shuttle 628 acts as a "holder" for the lifter pin housings 636. In this illustrated embodiment, the openings 624 and the lifter pins 630 are positioned in a circular pattern as seen in an end or face view, such as that of FIG. 45A, and the openings 624 are at the same positions as the lifter pins 630 (and the lifter pin housings 636) in that view.

Figure 44A:
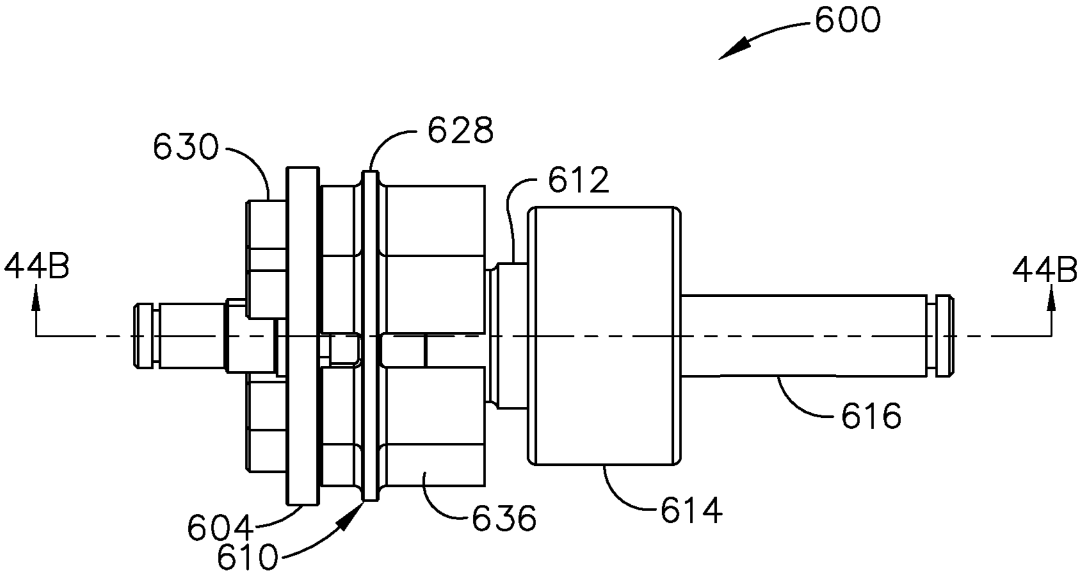
FIG. 44A is a right side view of the lifter of FIG. 43, in which the lifter pins are extended.

Referring now to FIG. 44A, the second alternative embodiment lifter S/A 600 is depicted fully assembled. The lifter base (the "guide") 604 has openings 624 (see FIG. 43) that seat over the lifter pins 630, which seat in the lifter pin housings 636, and the lifter pin housings 636 seat (or are molded) in the shuttle/holder 628. The shuttle S/A 610 seats on the plunger 612, and the solenoid 614 is beneath (to the right, in this view) the plunger. All of these pieces, with the exception of the solenoid 614, are positively aligned to the lifter shaft 616.

It will be understood that the shuttle/holder 628, also referred to herein as the "second cover," comprises a unitary structure, as illustrated in FIG. 46 and FIGS. 47A through 47C. While this is not a requirement, this structure (the "holder") 628 can be molded as a completed part and thus does not have to be partially assembled with other internal parts, and then finally assembled later. In other words, the lifter pins and lifter springs can all be assembled after this version of shuttle/holder 628 is manufactured as a unitary structure.

Figure 44B:
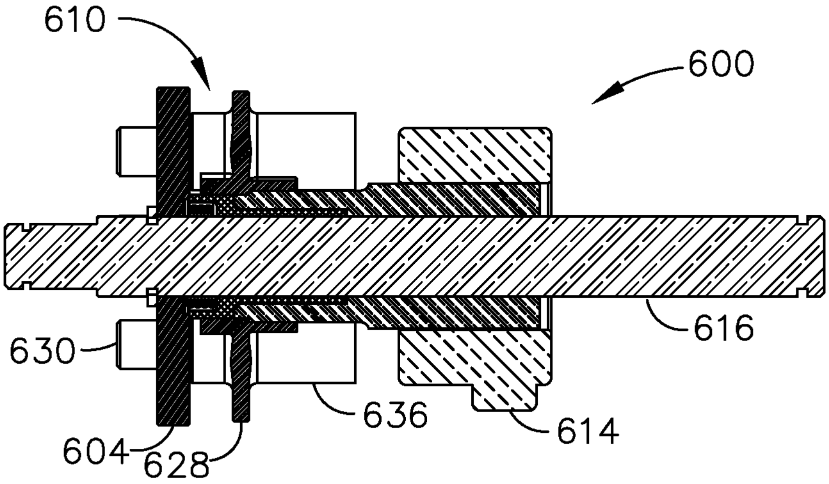
FIG. 44B is a cutaway view along the line 44B-44B of the lifter of FIG. 44A, in which the lifter pins are extended.

Referring now to FIG. 44B, a cutaway view of the second alternative embodiment lifter S/A 600 is depicted along the line 44B-44B of FIG. 44A. This view depicts the lifter shaft 616 passing through all of the components of the lifter S/A 600 and the solenoid 614. Note that the lifter base/guide 604 is distal from the solenoid 614, whereas the shuttle/holder 628 is (comparatively) proximal to the solenoid.

Figure 45B:
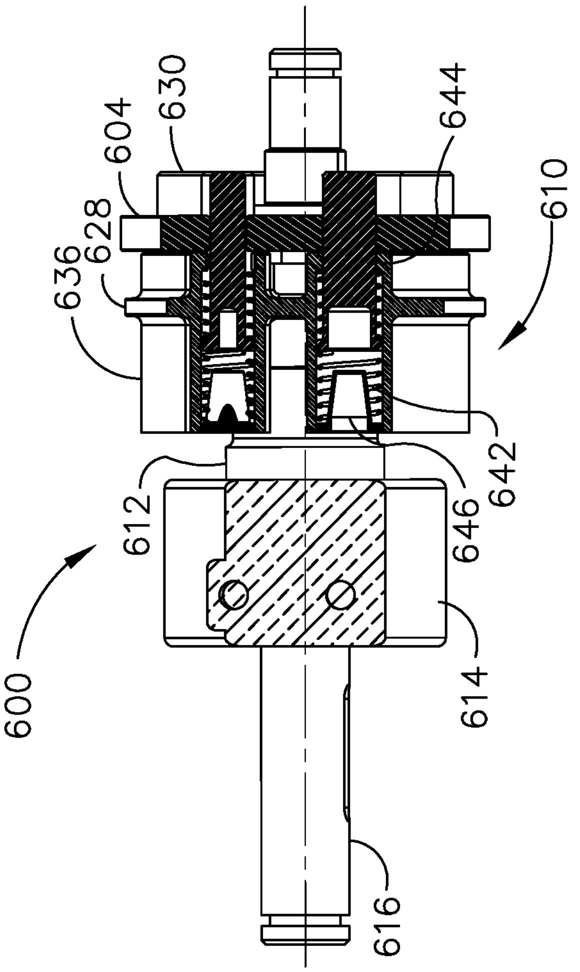
FIG. 45B is a cutaway side view along the line 45B-45B of the lifter of FIG. 45A, in which the lifter pins are extended.
Figure 45A:
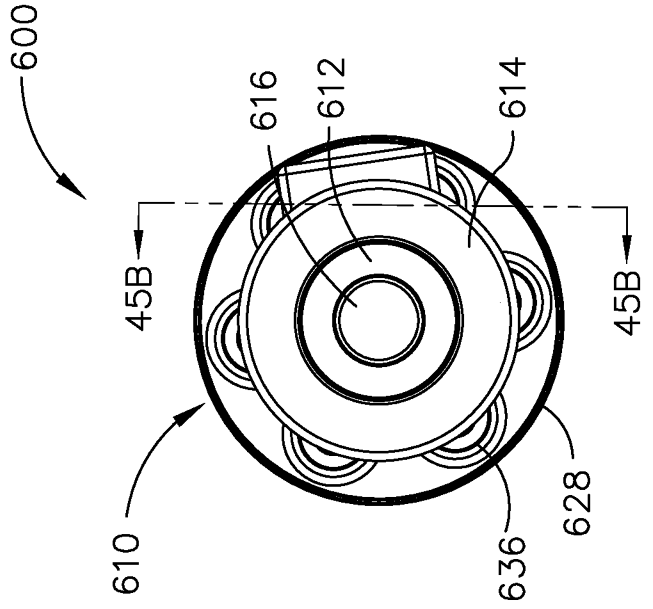
FIG. 45A is a rear view of the lifter of FIG. 43.

Referring now to FIG. 45A, the second alternative embodiment lifter S/A 600 is depicted from beneath the solenoid 614. This view depicts the shuttle S/A 610 as exhibiting a larger outer diameter than the solenoid 614.

Referring now to FIG. 45B, a cutaway view of the second alternative embodiment lifter S/A 600 is illustrated along the line 45B-45B of FIG. 45A. This view shows some of the inner mechanisms of the lifter pin housings 636, which will be discussed further below in reference to FIG. 46.

Figure 46:
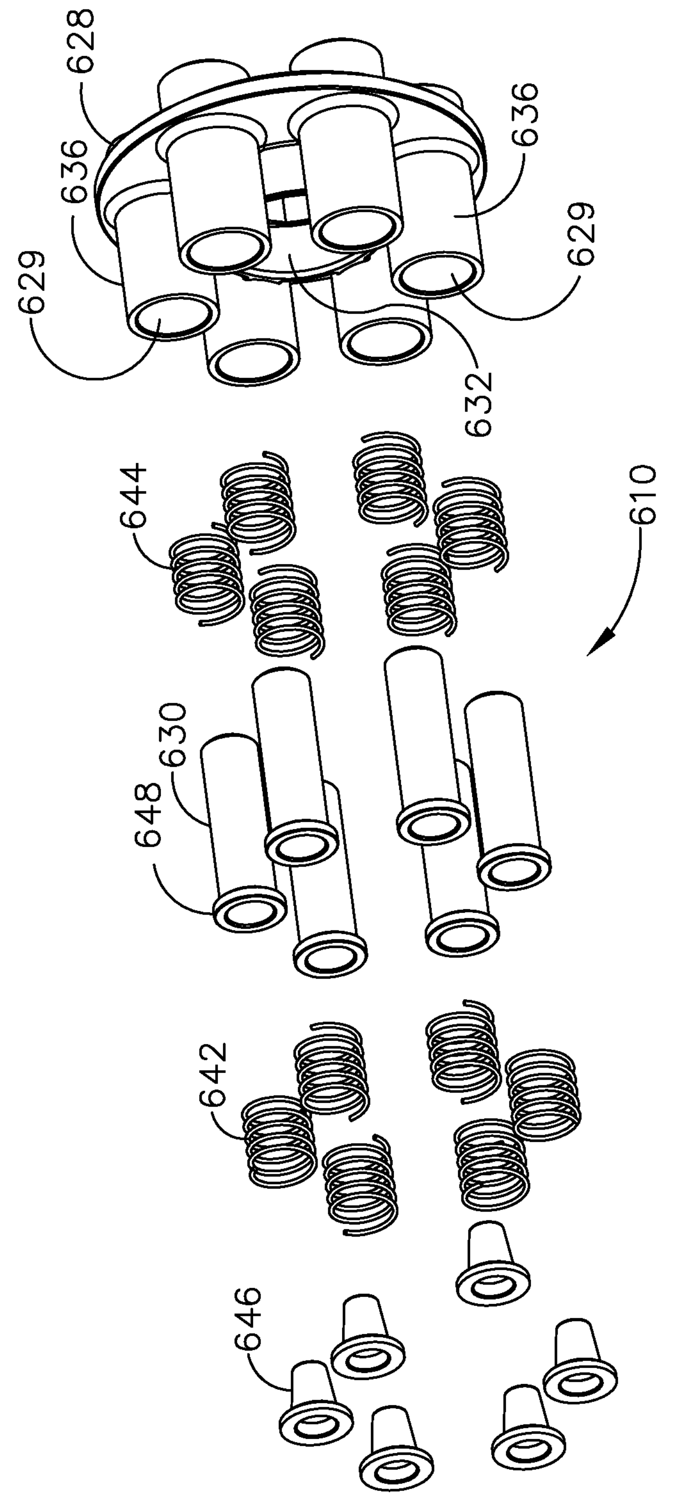
FIG. 46 is an exploded view of the shuttle sub-assembly of FIG. 43.

Referring now to FIG. 46, the shuttle S/A 610 is depicted in an exploded view. Each individual lifter pin 630 exhibits a small flange 648 on one end, and includes upper lifter pin springs 644 that seat on each lifter pin, and lower lifter spring pins 642 that each seat inside the lifter pin housings 636, and a housing cap 646 for each lifter pin that "closes" the base of the lifter pin housings. As is better seen in FIG. 47B, the flange 648 separates each lifter pin spring "set."

Figure 47C:
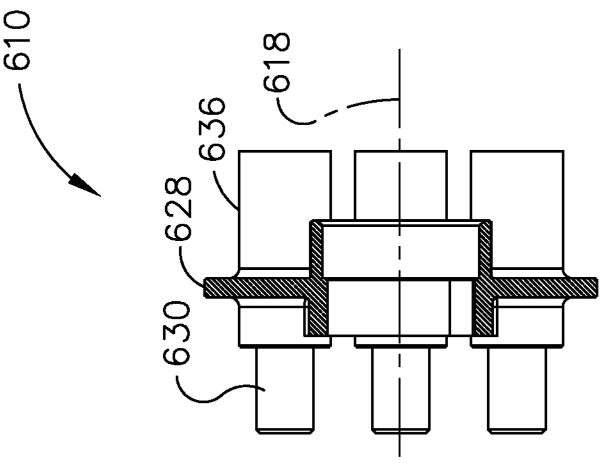
FIG. 47C is a cutaway side view along the line 47C-47C of FIG. 47A, in which the lifter pins are extended.
Figure 47B:
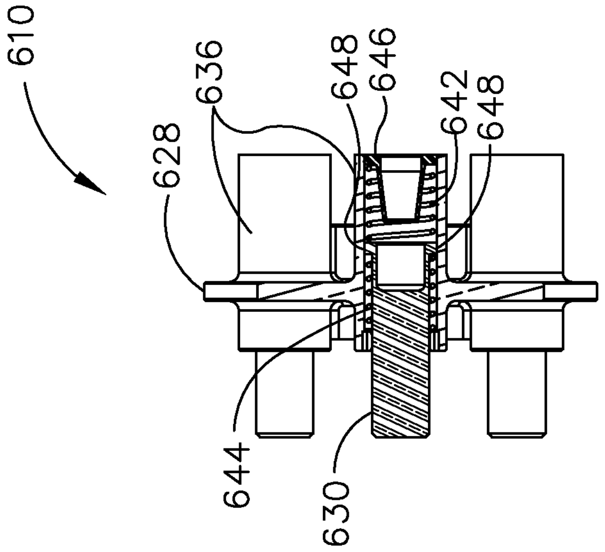
FIG. 47B is a cutaway side view along the line 47B-47B of FIG. 47A, in which the lifter pins are extended.
Figure 47A:
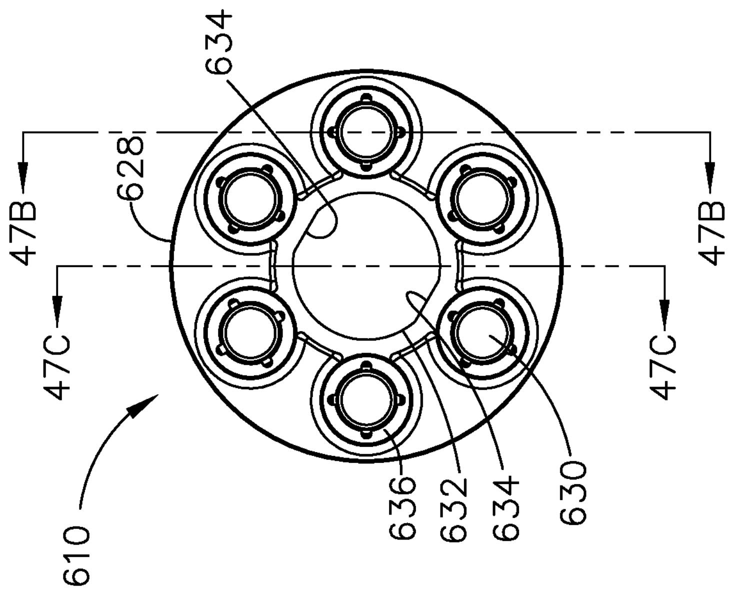
FIG. 47A is a front view of the shuttle sub-assembly of FIG. 43.

Referring now to FIG. 47A, the flat portions 634 of the central opening 632 are depicted. The lifter pins 630 are seated in their individual lifter pin housings 636. Under certain conditions, the lifter pin housings 636 act as a "pusher" to extend the lifter pins, to perform a lifting action (or "lifting stroke").

Referring now to FIG. 47B, a cutaway view of the shuttle S/A 610 is depicted along the line 47B-47B of FIG. 47A. In this view, the upper lifter pin spring 644 seats outside (around) the lifter pin 630 and inside the cylindrical wall of the lifter pin housing 636. Inside another portion of the lifter pin housing 636 is the lower lifter spring 642, which is beneath (to the right of) the lifter pin 630. The cap 646 secures the lower lifter spring 642 inside the lifter pin housing 636, and the flange 648 separates both lifter springs.

Referring now to FIG. 47C, a cutaway view of the shuttle S/A 610 is depicted along the line 47C-47C of FIG. 47A. The second alternative lifter S/A 600 is designed so that every individual lifter pin 630 exhibits individual movement such that it travels in a direction parallel to the longitudinal axis 618 of the lifter shaft 616. By using the upper springs 644 and the lower springs 642, each lifter pin 630 is able to extend and retract individually, as well as together as a group. During a drive (or "driving") stroke, the solenoid 614 is not actuated, which also means that the plunger 612 is not actuated upon that time (see FIG. 49A as an example). Since the plunger 612 is not actuated, the return spring 606 forces the shuttle (the "holder") 628 to a position distal from the lifter base/guide 604, the shuttle/holder 628 is not forcing the lower springs 642 to compress, and thus, the lifter pins 630 are retracted and their faces become nominally co-planar with the face of the lifter base/guide 604. In other words, the lifter pins 630 will not interfere with a driver 650 and the driver's protrusions (or "teeth") 652 during a drive stroke (see FIG. 49 as an example).

However, during a lift stroke (or "return stroke"), the solenoid 614 is actuated, and forces the plunger 612 "upwards" (i.e., to the left in FIG. 51A), which slightly compresses the return spring 606, and the shuttle/holder 628 is forced towards the lifter base/guide 604. The slight compression of the lower springs 642 and the upper springs 644 on the flange 648 work to move the lifter pins 630 with the shuttle/holder 628, which typically causes the lifter pins 630 to extend from the lifter base (the "guide") 604 (see FIGS. 51A-51B).

In a typical return stroke, the protruding lifter pins 630 rotate with the lifter S/A 600 and "catch" individual driver teeth 652, quickly forcing the driver 650 toward a ready position. On some occasions, however, an interference condition (such as a jam) may occur in which the driver teeth 652 can interfere with the lifter pins 630 (see FIG. 50). A typical jam condition is one in which a fastener becomes misaligned, or is improperly driven into a workpiece. Another typical interference condition can occur after a drive stroke, in which one or more of the driver teeth 652 are simply covering one or more of the lifter pins 630 due to a driver misposition, such as can occur when the tool's piston stop becomes well worn. Any of these above interference conditions are also sometimes referred to herein as a "driver misalignment" or a "misalignment" between the driver and lifter.

In a jam condition, for example, the individual movement exhibited by each lifter pin 630 helps to relieve this condition. A typical jam condition may leave one or more driver teeth 652 covering, or partially covering, one or more lifter pins 630. Any individual lifter pin 630 that is not covered by a driver protrusion 652 is typically able to protrude from the lifter base (the "guide") 604, as explained above. However, any individual lifter pin 630 that is covered, or partially covered, by a driver protrusion 652 cannot extend and, thus, is forced to remain in the lifter pin housing/pusher 636. When this occurs, the specific driver protrusion 652 covering the specific lifter pin 630 forces that pin's lower spring 642 to become compressed (see FIG. 50B).

When the lifter S/A 600 begins to rotate for a lift stroke, any covered—i.e., "blocked"—lifter pin(s) 630 are not able to properly engage with the driver protrusions 652. In other words, such blocked lifter pins cannot perform their typical function of lifting one of the driver protrusions, but instead will slide along the back surface of the driver 650, as the lifter S/A begins rotating for a lifting stroke. However, once the lifter S/A 600 has rotated far enough, the blocked lifter pin(s) 630 "clear" itself from contacting any of the driver protrusions 650, and therefore, will be able to extend, and join the configuration of the other extended lifter pins, and thus, will be able to assist in the lifting stroke later in the rotation of the lifter S/A.

This movement of retracting and protruding lifter pins due to the action of the lower springs 642 is performed in parallel to the longitudinal axis 618 of the lifter S/A 600, not radially. FIGS. 48-51 depict some of the conditions described above, and thus illustrate how the lifter pins exhibit independent movement along directions that are parallel to the longitudinal axis 618.

Figure 48C:
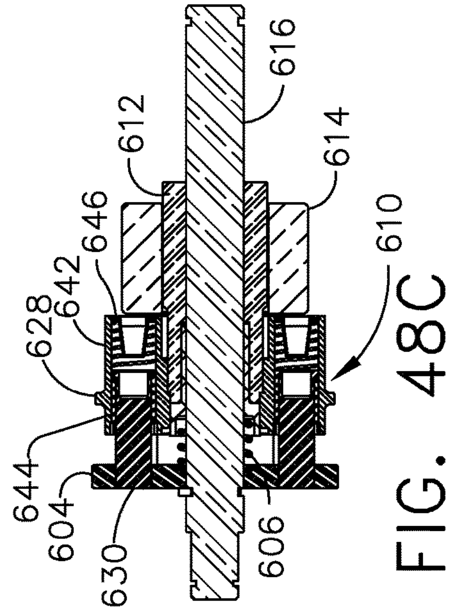
FIG. 48C is a cutaway side view along the line 48C-48C of FIG. 48.
Figure 48:
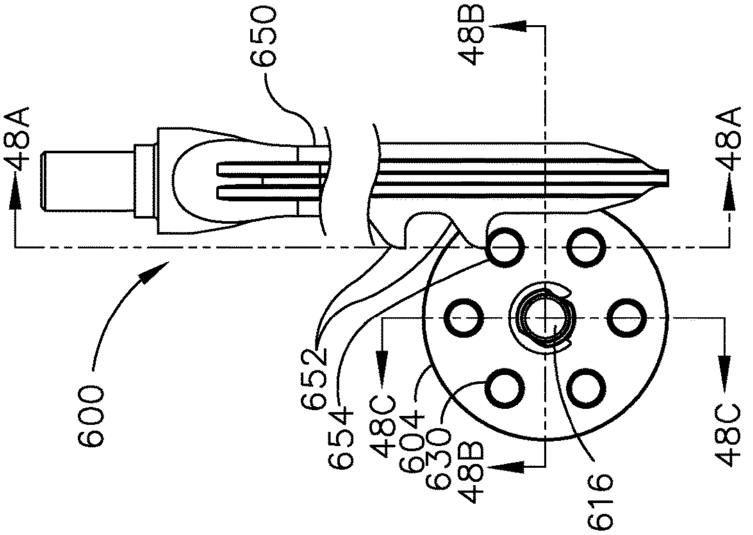
FIG. 48 is a front elevational view of a driver and the lifter of FIG. 43, at the end of a lift stroke in the ready position, in which a single lifter pin is holding the driver.

Referring now to FIG. 48, the lifter S/A 600 is depicted in a front view showing the ready position. The solenoid 614 is not actuated, and the lifter pins 630 are retracted into the lifter pin housings 636, except for a single lifter pin 654 holding the driver 650 in an "up," or "ready" position. As described below, the single lifter pin 654 is protruding due to a frictional force imposed on it by the driver protrusion 652, overcoming the spring biasing force of the upper lifter spring 644, which is compressed in this state (see FIG. 48A).

Figure 48A:
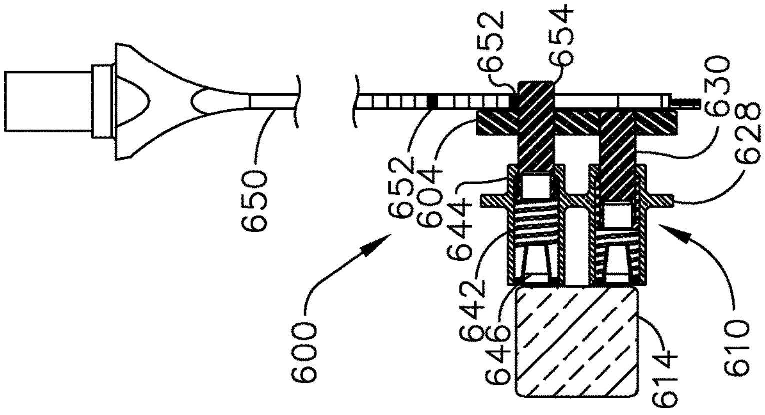
FIG. 48A is a cutaway side view along the line 48A-48A of FIG. 48.

Referring now to FIG. 48A, the lifter S/A 600 is depicted in a cutaway side view along the line 48A-48A of FIG. 48. FIG. 48A depicts the upper lifter spring 644 compressed due to the "holding" effect of the frictional force exerted on the lifter pin 654 by the driver protrusion 652.

Figure 48B:
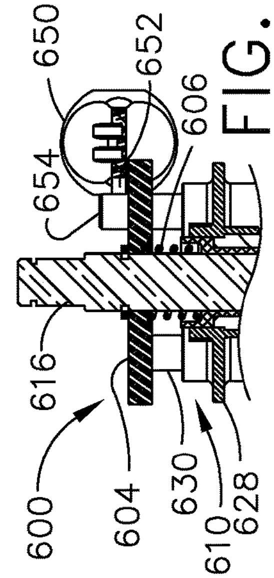
FIG. 48B is a cutaway bottom, plan view along the line 48B-48B of FIG. 48.

Referring now to FIG. 48B, the lifter S/A 600 is depicted in a cutaway bottom, plan view along the line 48B-48B of FIG. 48. FIG. 48B depicts the single lifter pin 654 holding the driver 650 at the ready position. The "held" driver protrusion (or "tooth") is shown at 652. As can be seen in FIGS. 48A and 48B, the driver 650 is once again positioned at an angle that is substantially perpendicular with respect to the longitudinal axis of the lifter shaft 616.

Referring now to FIG. 48C, the lifter S/A 600 is depicted in a cutaway side view along the line 48C-48C of FIG. 48. Note that the lifter pins 630 in FIG. 48C are all fully retracted, even though none of their associated springs 644 or 642 are compressed. These are pins 630 that are not in contact with a driver protrusion 652. When a drive stroke begins, the lifter S/A 600 will have rotated just enough for the single lifter pin 654 to rotate past the "held" driver protrusion 652. And when that occurs, the upper lifter spring 644 will be allowed to uncompress and bias that single pin 654 back down into the lifter pin housing 636, joining the positioning of the other lifter pins 630. The driver 650 now becomes "free," and begins a drive stroke downward in the view of FIG. 48.

Figure 49A:
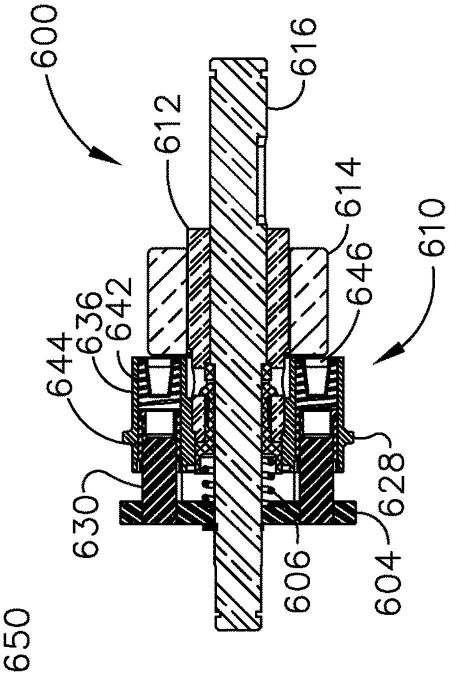
FIG. 49A is a cutaway side view along the line 49A-49A of FIG. 49.
Figure 49:
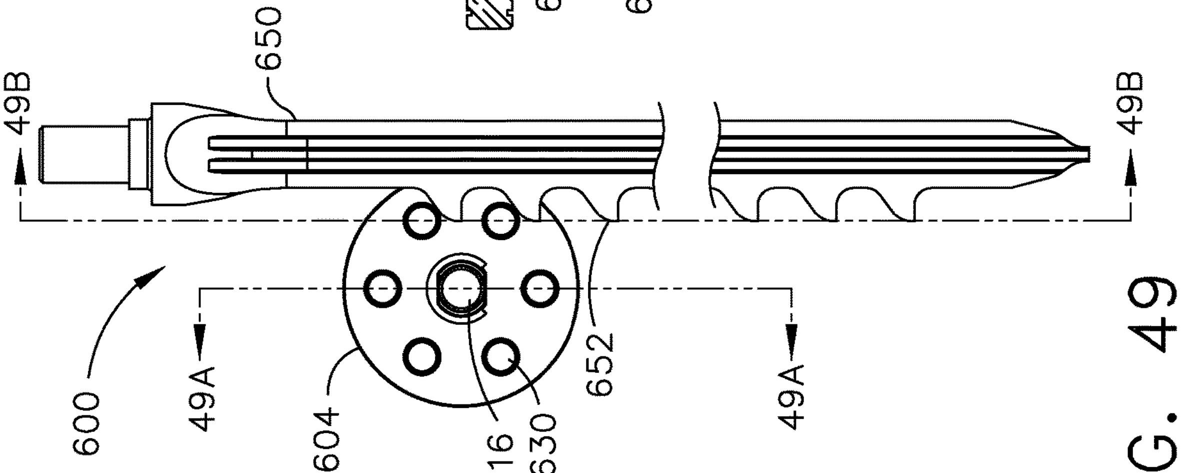
FIG. 49 is a front elevational view of a driver and the lifter of FIG. 43, at the end of a drive stroke.

Referring now to FIG. 49, the lifter S/A 600 is depicted in a front view at the end of a drive stroke. The solenoid 614 is not yet actuated and the lifter pins 630 are retracted inside their lifter pin housings 636. Note that, in this view, the driver 650 has stopped at a position that is not misaligned, and therefore, the lifter pins 630, when called upon to do so, will be able to successfully extend and then engage with the driver protrusions 652, so as to perform a lift stroke.

Figure 49B:
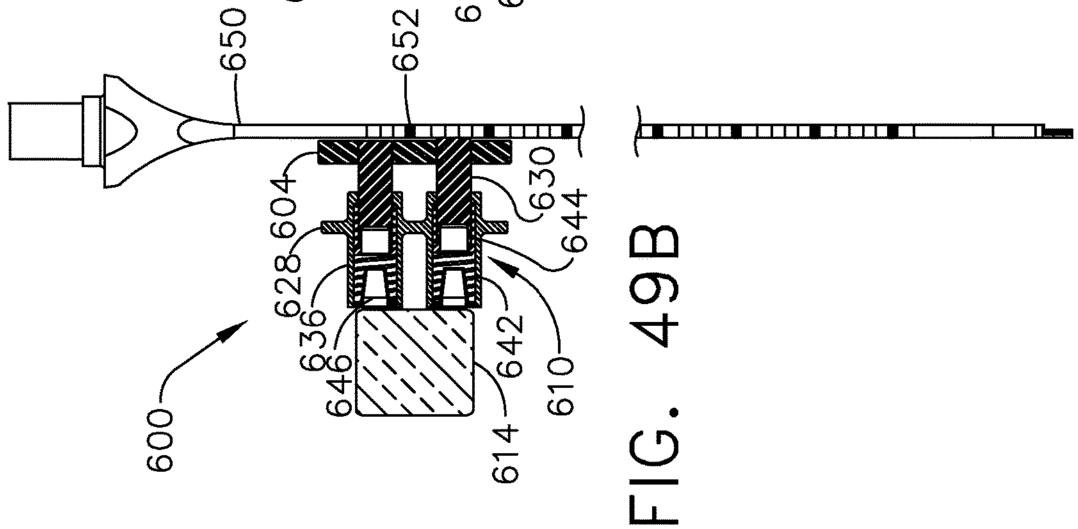
FIG. 49B is a cutaway side view along the line 49B-49B of FIG. 49.

Referring now to FIG. 49A, the lifter S/A 600 is depicted in a cutaway side view along the line 49A-49A of FIG. 49. At the end of a drive stroke, the driver protrusions 652 are mostly past the lifter S/A 600. In other words, the driver 650 is in its "down" (driven) position. In FIGS. 49 through 49B, no initial interference condition is depicted, because none of the driver protrusions 652 will interfere with any of the lifter pins 630, and the lifter pins can be extended for a lift stroke.

Referring now to FIG. 49B, the lifter S/A 600 is depicted in a cutaway side view along the line 49B-49B of FIG. 49. This view illustrates the lifter S/A 600 just as the driver 650 finishes its driving stroke, and before the lifter pins 630 attempt to be extended.

Figures 50, 50A, 50B, 50C:
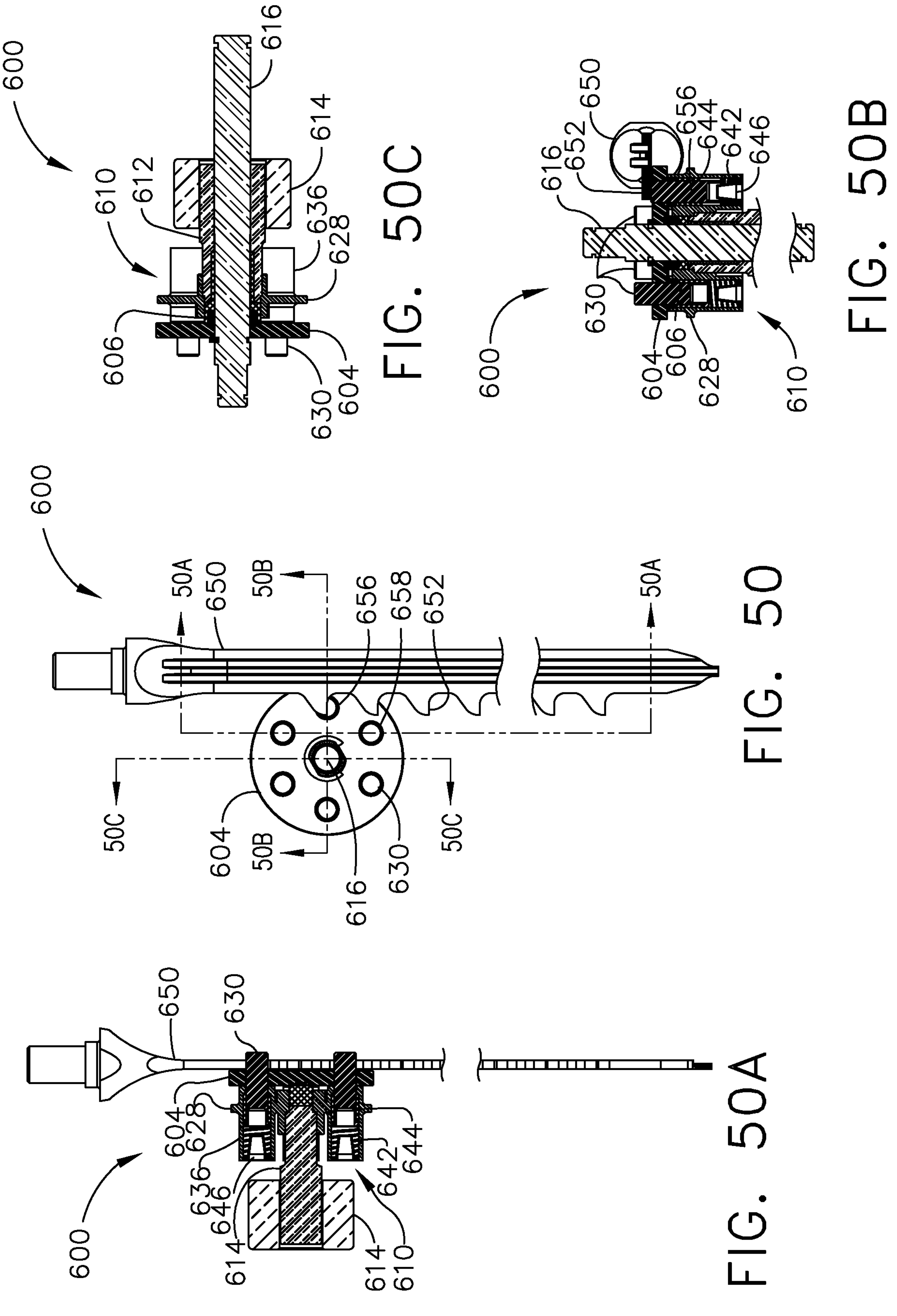
FIG. 50 is a front elevational view of a driver and the lifter of FIG. 43, at the beginning of a lift stroke with driver interference.
FIG. 50A is a cutaway side view along the line 50A-50A of FIG. 50.
FIG. 50B is a cutaway bottom, plan view along the line 50B-50B of FIG. 50.
FIG. 50C is a cutaway side view along the line 50C-50C of FIG. 50.

Referring now to FIG. 50, the lifter S/A 600 is depicted in a front view. FIGS. 50 through 50C depict an interference condition at the start of a lift stroke. The solenoid 614 is actuated, and most of the lifter pins 630 are protruding from the lifter base (a "guide") 604. The solenoid's plunger 612 is now forcing the shuttle/holder 628 toward the driver 650 (see FIG. 50A), which forces most of the lifter pins to their extended position. An interference condition is depicted at one of the lifter pins—at reference numeral 656—where driver protrusion interference is causing that lifter pin 656 to become blocked. An unblocked lifter pin 658 is also depicted, and this lifter pin will be discussed in more detail below (see FIG. 51).

Referring now to FIG. 50A, the lifter S/A 600 is shown in a cutaway side view along the line 50A-50A of FIG. 50. FIG. 50A illustrates two lifter pins 630 protruding from the lifter base/guide 604. These two lifter pins are not in contact with the driver at this moment. Referring now to FIG. 50B, the lifter S/A 600 is shown in a cutaway bottom, plan view along the line 50B-50B of FIG. 50. A majority of the lifter pins 630 are shown extended from the lifter base/guide 604. However, due to the interference, one lifter pin 656 remains mostly inside the lifter base/guide 604, in a blocked position. The blocked lifter pin 656 is compressing its individual lower lifter spring 642, whereas the protruding (other) lifter pins have uncompressed lower lifter springs 642. In order to resolve the interference condition, the lifter S/A 600 merely needs to continue rotating until the interfered—with (i.e., blocked) lifter pin 656 slides past the interference contact area. It will be understood that a "blocked" lifter pin is not in its fully "retracted" position, because it is literally attempting to move to its "extended" position, but cannot do so; therefore, such a "blocked" lifter pin is partially extended, as illustrated, which is the "blocked position."

Referring now to FIG. 50C, the lifter S/A 600 is shown in a cutaway side view along the line 50C-50C of FIG. 50. This view shows details of the plunger's movement, forcing the shuttle's movement, and compressing the return spring 606.

Figure 51A:
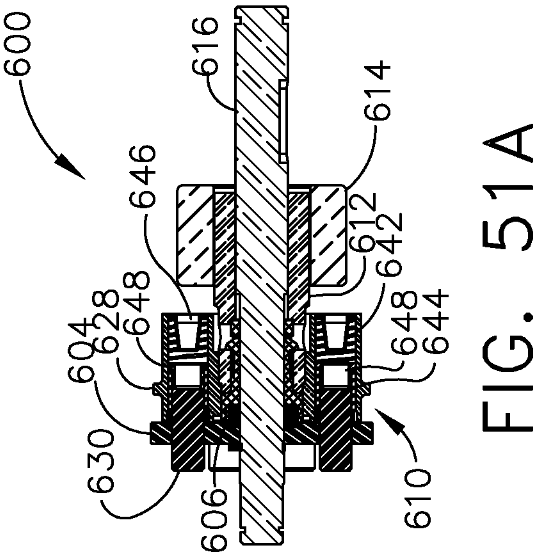
FIG. 51A is a cutaway side view along the line 51A-51A of FIG. 51.
Figure 51:
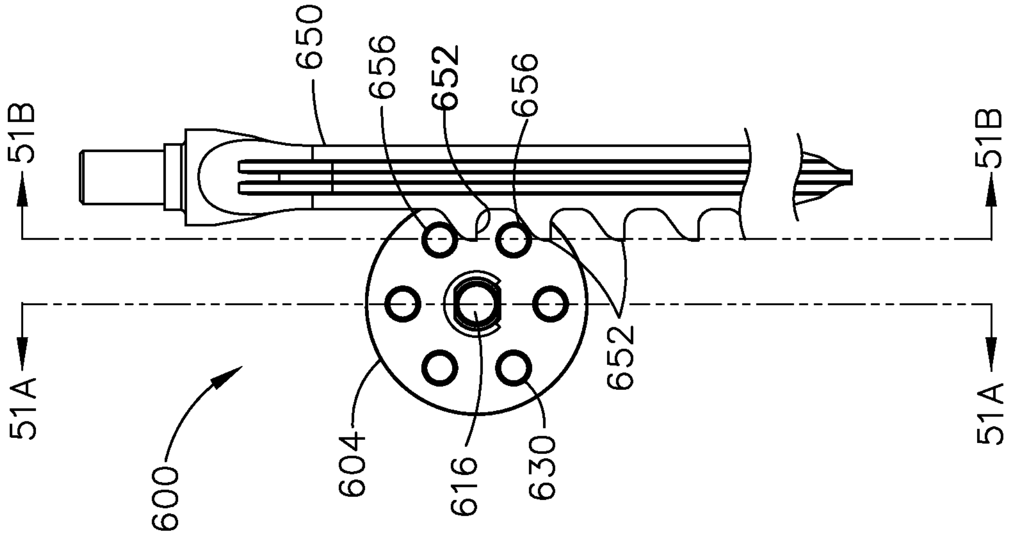
FIG. 51 is a front elevational view of a driver and the lifter of FIG. 43, at the start of a lift stroke after clearing the driver interference.

Referring now to FIG. 51, the lifter S/A 600 is depicted in a front view as the lift stroke continues and resolves the interference condition depicted in FIGS. 50 through SOC. The solenoid 614 is still actuated, forcing the lifter pins 630 to protrude and extend from the lifter base (the "guide") 604. As described above, to resolve the previous jam (or "interference") condition depicted in FIGS. 50 through 50C, the lifter S/A 600 has continued to rotate, until the previously blocked lifter pin 656 slides past the interfering driver protrusion 652. The "next" lifter pin 658 will now be able to "catch" the individual driver protrusion 652 (as the lifter S/A 600 continues to rotate in the counter-clockwise direction—in this view) in order to begin lifting the driver 650 back toward the ready position. Note that additional lifter pins 630 will catch further individual driver protrusions 652 as the lifter S/A 600 continues to rotate and lift the driver 650 toward the ready position.

Referring now to FIG. 51A, the lifter S/A 600 is depicted in a cutaway side view along the line 51A-51A of FIG. 51. The plunger 612 is still actuated, and all lifter pins 630 are extended.

Figure 51B:
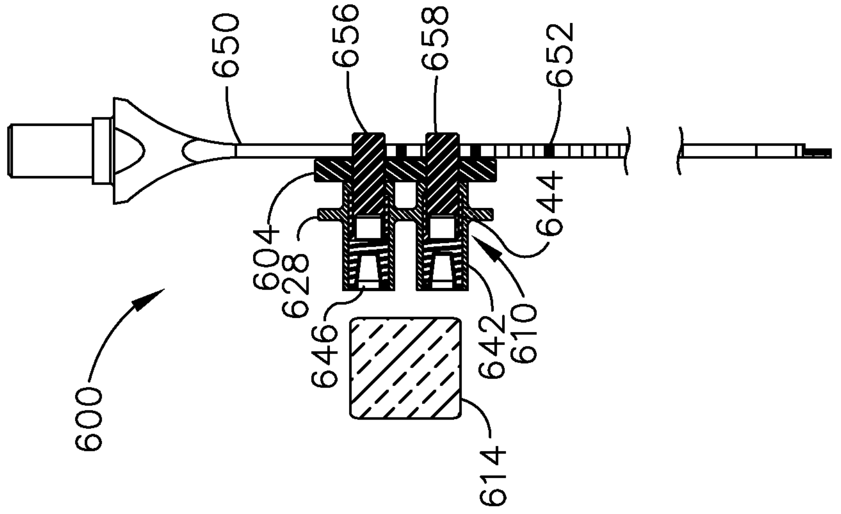
FIG. 51B is a cutaway side view along the line 51B-51B of FIG. 51.

Referring now to FIG. 51B, the lifter S/A 600 is shown in a cutaway side view along the line 51B-51B of FIG. 51. In this view, the interference condition depicted in FIGS. 50 through 50C has been resolved, at the non-interference lifter pin 658. In this view, all the lifter pins 630 are fully extended and may engage with the driver protrusions 652 as the lifter base/guide 604 continues to rotate. It will be understood that the spacings between the lifter pins 630 match up to the spacings between the driver protrusions 652 so that, as the lifter S/A 600 rotates, each lifter pin 630 will "catch" the 'next' driver protrusion 652.

Figure 52:
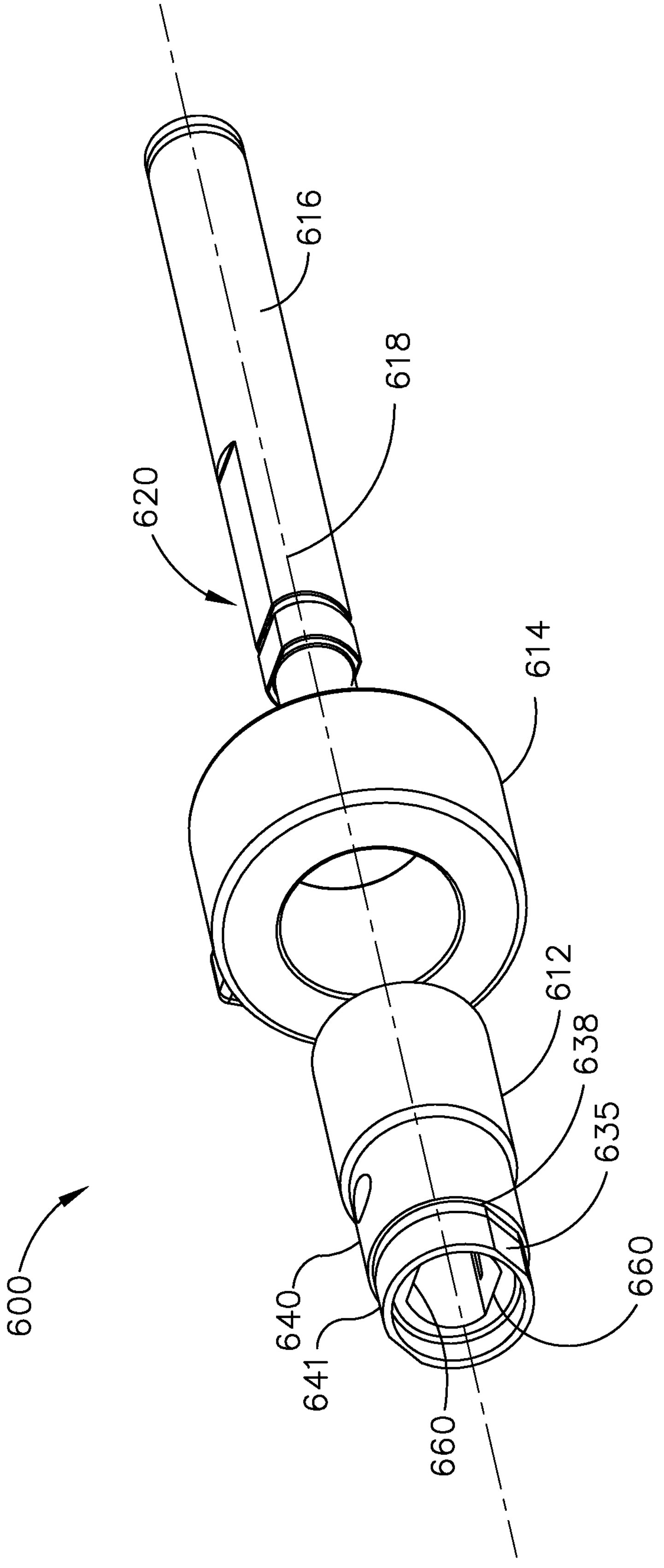
FIG. 52 is an exploded view of the plunger, the solenoid, and the lifter shaft of the lifter of FIG. 43, depicting the interior flat portions of the plunger.

Referring now to FIG. 52, the plunger 612 is depicted in an exploded view that illustrates two interior flat portions 660. These two interior flat portions 660 positively align with the two flat portions 620 on the lifter shaft 616, so that the plunger 612 rotates with the lifter shaft 616, but also moves axially along the lifter shaft 616 when the solenoid 614 is actuated or de-actuated.

Figure 53:
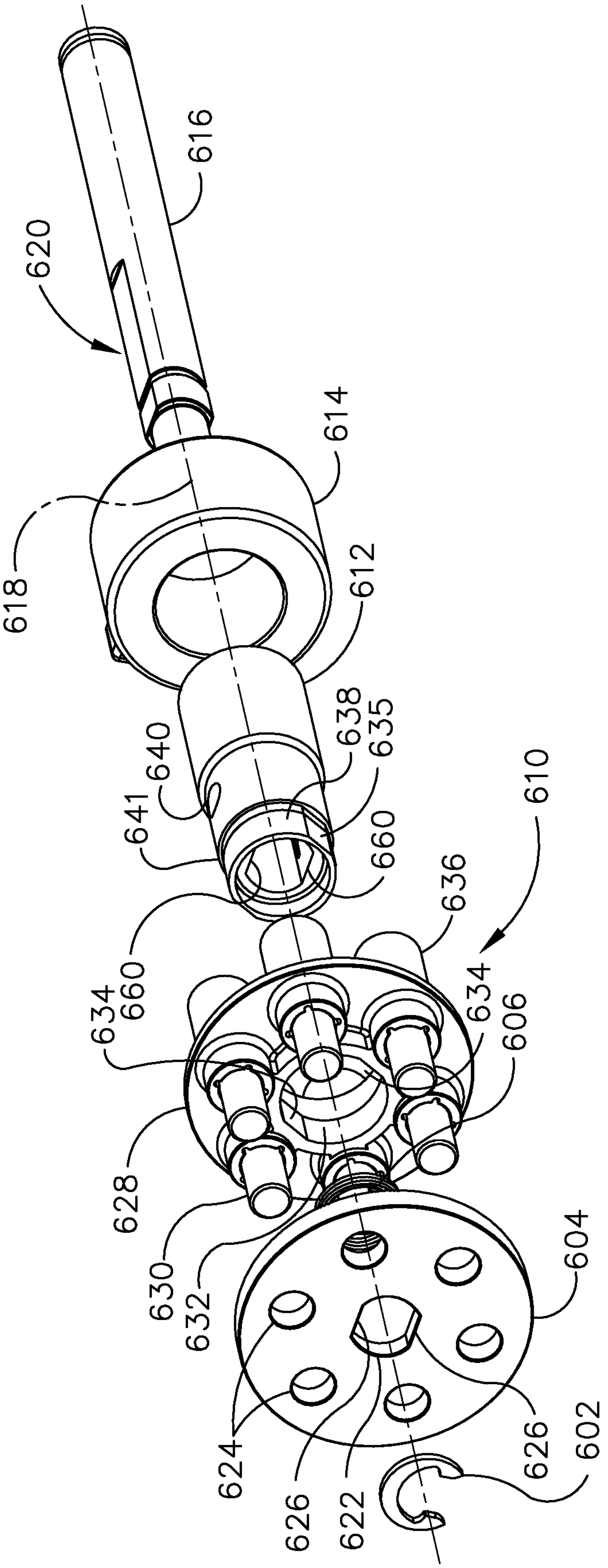
FIG. 53 is an exploded view of the lifter of FIG. 43, illustrating the interior flat portions of the plunger.

Referring now to FIG. 53, the lifter S/A 600 is depicted showing the two interior flat portions of the plunger 612, and the other parts of the lifter S/A. Note that the alignment of the lifter pins 630 is assured by the flat portions 620 on the lifter shaft 616 and the two interior flat portions 660 of the plunger 612, the same flat portions 620 and the two interior flat portions 626 on the cover/guide 604, and finally by the exterior flat portions 635 on the plunger 612 and the two interior flat portions 634 of the shuttle/holder 628. This plurality of interior and exterior flat portions of the lifter S/A 600 positively align so that all of these parts rotate together with the lifter shaft and, as noted above, assure the alignment of the lifter pins 630.

Note that some of the embodiments illustrated herein do not have all of their components included on some of the figures herein, for purposes of clarity. To see examples of such outer housings and other components, especially for earlier designs, the reader is directed to other U.S. patents and applications owned by Kyocera Senco. Similarly, information about "how" the electronic controller operates to control the functions of the tool is found in other U.S. patents and applications owned by Kyocera Senco. Moreover, other aspects of the present tool technology may have been present in earlier fastener driving tools sold by the Assignee, Kyocera Senco Industrial Tools, Inc., including information disclosed in previous U.S. patents and published applications. Examples of such publications are patent numbers U.S. Pat. Nos. 6,431,425; 5,927,585; 5,918,788; 5,732,870; 4,986,164; 4,679,719; 8,011,547, 8,267,296, 8,267,297, 8,011,441, 8,387,718, 8,286,722, 8,230,941, 8,602,282, 9,676,088, 10,478,954, 9,993,913, 10,549,412, 10,898,994, 10,821,585 and 8,763,874; also published U.S. patent application No. 2020/0156228, published U.S. patent application No. 2021/0016424, published U.S. patent application No. 2020/0070330, and published U.S. patent application No. 2020/0122308. These documents are incorporated by reference herein, in their entirety.

As used herein, the term "proximal" can have a meaning of closely positioning one physical object with a second physical object, such that the two objects are perhaps adjacent to one another, although it is not necessarily required that there be no third object positioned therebetween. In the technology disclosed herein, there may be instances in which a "male locating structure" is to be positioned "proximal" to a "female locating structure." In general, this could mean that the two (male and female) structures are to be physically abutting one another, or this could mean that they are "mated" to one another by way of a particular size and shape that essentially keeps one structure oriented in a predetermined direction and at an X-Y (e.g., horizontal and vertical) position with respect to one another, regardless as to whether the two (male and female) structures actually touch one another along a continuous surface. Or, two structures of any size and shape (whether male, female, or otherwise in shape) may be located somewhat near one another, regardless if they physically abut one another or not; such a relationship could still be termed "proximal" Or, two or more possible locations for a particular point can be specified in relation to a precise attribute of a physical object, such as being "near" or "at" the end of a stick; all of those possible near/at locations could be deemed "proximal" to the end of that stick. Moreover, the term "proximal" can also have a meaning that relates strictly to a single object, in which the single object may have two ends, and the "distal end" is the end that is positioned somewhat farther away from a subject point (or area) of reference, and the "proximal end" is the other end, which would be positioned somewhat closer to that same subject point (or area) of reference.

It will be understood that the various components that are described and/or illustrated herein can be fabricated in various ways, including in multiple parts or as a unitary part for each of these components, without departing from the principles of the technology disclosed herein. For example, a component that is included as a recited element of a claim hereinbelow may be fabricated as a unitary part; or that component may be fabricated as a combined structure of several individual parts that are assembled together. But that "multi-part component" will still fall within the scope of the claimed, recited element for infringement purposes of claim interpretation, even if it appears that the claimed, recited element is described and illustrated herein only as a unitary structure.

All documents cited in the Background and in the Detailed Description are, in relevant part, incorporated herein by reference; the citation of any document is not to be construed as an admission that it is prior art with respect to the technology disclosed herein.

The foregoing description of a preferred embodiment has been presented for purposes of illustration and description. It is not intended to be exhaustive or to limit the technology disclosed herein to the precise form disclosed, and the technology disclosed herein may be further modified within the spirit and scope of this disclosure. Any examples described or illustrated herein are intended as non-limiting examples, and many modifications or variations of the examples, or of the preferred embodiment(s), are possible in light of the above teachings, without departing from the spirit and scope of the technology disclosed herein. The embodiment(s) was chosen and described in order to illustrate the principles of the technology disclosed herein and its practical application to thereby enable one of ordinary skill in the art to utilize the technology disclosed herein in various embodiments and with various modifications as are suited to particular uses contemplated. This application is therefore intended to cover any variations, uses, or adaptations of the technology disclosed herein using its general principles. Further, this application is intended to cover such departures from the present disclosure as come within known or customary practice in the art to which this technology disclosed herein pertains and which fall within the limits of the appended claims.

What is claimed is:

1. A lifter for use in a fastener driving machine, said lifter comprising:

- a lifter shaft including a first end and a second end, and exhibiting a longitudinal axis that extends between said first end and said second end;
- a linear actuator that is positioned proximal to said first end of the lifter shaft;
- a rotatable lifter subassembly, including:
  - a holder that is positioned proximal to said linear actuator, said holder exhibiting a second plurality of openings;
  - at least one guide that is positioned proximal to said holder, said at least one guide exhibiting a first plurality of openings;
  - at least one return spring that provides a force in a direction that is substantially parallel to the longitudinal axis of said lifter shaft;
  - a plurality of lifter pins that are seated in said second plurality of openings and that are movable in a direction substantially parallel to said longitudinal axis; and
  - a plurality of lifter pin springs that bias each of said lifter pins in said direction that is substantially parallel to said longitudinal axis; and
- a driver having a path of movement that is substantially perpendicular to said lifter longitudinal axis, said driver including a plurality of driver protrusions along at least one longitudinal edge of the driver, said driver being positioned proximal to said rotatable lifter subassembly.

2. The lifter of claim 1, wherein:

- said first plurality of openings are positioned in a circular pattern;
- said second plurality of openings are positioned in a circular pattern, such that the plurality of lifter pins may extend through the first plurality of openings; and
- said lifter shaft is in mechanical communication with at least one of said holder and said at least one guide.

3. The lifter of claim 1, wherein: said at least one return spring is in mechanical communication with at least one of said linear actuator and said holder.

4. The lifter of claim 1, wherein:

- (a) said at least one guide comprises:
  - (i) a first guide that is positioned between said holder and said linear actuator; and
  - (ii) a second guide that is positioned proximal to said second end of the lifter shaft, said second guide exhibiting said first plurality of openings;
- (b) said linear actuator comprises a solenoid having a movable plunger; and
- (c) said first guide moves with the movable plunger to push the plurality of lifter pins through said second plurality of openings.

5. The lifter of claim 1, wherein: said rotatable lifter subassembly rotates at the same time as said lifter shaft rotates; and

- as said lifter shaft rotates, said plurality of lifter pins rotate about said longitudinal axis.

6. The lifter of claim 1, wherein: said lifter shaft rotates to perform said lifting stroke, in which said plurality of lifter pins that are in said extended position rotate in a circular motion and make physical contact with the driver to force said driver to move to a ready position for driving a fastener.

7. The lifter of claim 1, wherein: the plurality of lifter pins may engage with the plurality of driver protrusions, for use in a lifting stroke.

8. The lifter of claim 7, wherein: each of said individual lifter pins:

is mechanically biased, by at least one of the linear actuator and said at least one of the plurality of lifter pin springs, to attempt to move to an extended position through one of said first plurality of openings for use in said lifting stroke by said rotatable lifter subassembly; and is mechanically biased, by said at least one of the plurality of lifter pin springs, to attempt to move in the opposite direction to a retracted position for use in a driving stroke by said rotatable lifter subassembly.

9. The lifter of claim 8, wherein:

if there is no interference condition between a properly aligned driver and any of said lifter pins, then at a beginning phase of said lifting stroke, each of said plurality of lifter pins is moved to said extended position so as to make physical contact with said plurality of driver protrusions, so as to move said driver toward a ready position as the rotatable lifter subassembly rotates in a first direction; or if there is an interference condition between a misaligned driver and at least one of the plurality of lifter pins, then at the beginning phase of said lifting stroke, said at least one of the plurality of lifter pins exhibits independent movement and is moved to a blocked position, in which said at least one of the plurality of lifter pins does not fully move to said extended position.

10. A lifter for use in a fastener driving machine, said lifter comprising:

a lifter shaft including a first end and a second end, and a longitudinal axis that extends between said first end and said second end;

a linear actuator that is positioned proximal to said first end of the lifter shaft;

a rotatable lifter subassembly, including:

a holder that is positioned proximal to said linear actuator, said holder exhibiting a second plurality of openings;

at least one guide that is positioned proximal to said holder, said at least one guide exhibiting a first plurality of openings;

at least one return spring that provides a force in a direction that is substantially parallel to the longitudinal axis of said lifter shaft; and a plurality of lifter pins that are seated in said second plurality of openings and that are movable in a direction substantially parallel to said longitudinal axis.

11. The lifter of claim 10, wherein:

said first plurality of openings are proximal to an outer perimeter of said at least one guide;

said second plurality of openings are proximal to an outer perimeter of said holder, such that the plurality of lifter pins may extend through the first plurality of openings; and said lifter shaft is in mechanical communication with at least one of said holder and said at least one guide.

12. The lifter of claim 10, wherein: said at least one return spring is in mechanical communication with at least one of said linear actuator and said holder.

13. The lifter of claim 10, wherein:

(a) said at least one guide comprises:

(i) a first guide that is positioned between said holder and said linear actuator; and (ii) a second guide that is positioned proximal to said second end of the lifter shaft, said second guide exhibiting said first plurality of openings;

(b) said linear actuator comprises a solenoid having a movable plunger; and (c) said first guide moves with the movable plunger to push the plurality of lifter pins through said second plurality of openings.

14. The lifter of claim 10, wherein: said lifter shaft rotates to perform said lifting stroke, in which said plurality of lifter pins that are in said extended position rotate in a circular motion and make physical contact with a driver to force said driver to move to a ready position for driving a fastener.

15. The lifter of claim 10, wherein: said rotatable lifter subassembly rotates at the same time as said lifter shaft rotates; and as said lifter shaft rotates, said plurality of lifter pins rotate about said longitudinal axis.

16. The lifter of claim 10, further comprising:

a first plurality of lifter pin springs that mechanically bias each of said plurality of lifter pins so that at least one of said plurality of lifter pins moves to an extended position through at least one of said first plurality of openings in said direction that is substantially parallel to said longitudinal axis, for use in a lifting stroke by said rotatable lifter subassembly; and a second plurality of lifter pin springs that mechanically bias each of said plurality of lifter pins so that at least one of said plurality of lifter pins moves to a retracted position that is in the opposite direction from said extended position, for use in a driving stroke by said rotatable lifter subassembly.

17. A lifter for a fastener driving machine, said lifter comprising:

a lifter shaft including a first end and a second end, and exhibiting a longitudinal axis that extends between said first end and said second end;

a linear actuator that is positioned proximal to said first end of the lifter shaft;

a lifter subassembly, including:

a guide that is positioned proximal to said second end of the lifter shaft, said guide exhibiting a first plurality of openings, said first plurality of openings being positioned in a circular pattern;

a holder that is positioned proximal to said linear actuator, said holder exhibiting a second plurality of openings, said second plurality of openings being positioned in a circular pattern, said lifter shaft being in mechanical communication with at least one of said first holder and said holder;

at least one return spring that provides a force in a direction that is substantially parallel to the longitudinal axis of said lifter shaft, and is in mechanical communication with at least one of said linear actuator and said holder;

a plurality of lifter pins that are seated in said second plurality of openings and that are movable in a direction substantially parallel to said longitudinal axis; and a plurality of lifter pin springs that bias each of said lifter pins in said direction that is substantially parallel to said longitudinal axis, so that each of said lifter pins:

(i) is mechanically biased to move to an extended position through one of said first plurality of openings for a lifting stroke by said lifter subassembly; and (ii) is mechanically biased to move to a retracted position for a driving stroke by said lifter subassembly;

wherein, (iii) each individual of said plurality of lifter pins is able to move to a blocked position at a beginning phase of said lifting stroke; and a driver having a path of movement that is substantially perpendicular to said lifter shaft longitudinal axis, said driver including a plurality of protrusions along at least one longitudinal edge of the driver, such that said lifter pins that are in the extended position are in a position to make physical contact with said driver protrusions, so as to move said driver toward a ready position as the lifter subassembly rotates;

wherein:

(a) if there is an interference condition between a misaligned driver and at least one of said lifter pins, then at the beginning phase of said lifting stroke, said at least one of the plurality of lifter pins exhibits independent movement and does not fully move to said extended position, but instead moves to said blocked position; and (b) said at least one of the plurality of lifter pins at said blocked position can continue moving along a surface of said driver, as the lifter subassembly rotates, until reaching an unblocked position, at which point said at least one of the plurality of lifter pins makes contact with said at least one of said plurality of protrusions of the driver and begins to force said driver into said lifting stroke.

18. The lifter of claim 17, wherein:

(a) said at least one of the plurality of lifter pins that begins to force said driver into said lifting stroke comprises the same lifter pin that was previously blocked; or (b) said at least one of the plurality of lifter pins that begins to force said driver into said lifting stroke comprises a different lifter pin from the lifter pin that was previously blocked.

19. The lifter of claim 17, wherein:

a reverse side of said driver is substantially flat, which allows said at least one of the plurality of lifter pins that becomes blocked to slide along said reverse side of the driver until reaching an unblocked position, where it can fully extend.

20. The lifter of claim 19, wherein:

the rotational movement of said lifter subassembly causes said at least one of the plurality of lifter pins to slide along said reverse side of the driver.

21. A lifter for a fastener driving machine, said lifter comprising:

a rotatable lifter shaft including a first end and a second end, and a longitudinal axis that extends between said first end and said second end;

a linear actuator that is positioned proximal to said first end of the lifter shaft;

a rotatable lifter subassembly, including:

a first cover that is positioned proximal to said second end of the lifter shaft, said first cover exhibiting a first plurality of openings proximal to an outer perimeter of said first cover;

a movable second cover that is positioned proximal to said linear actuator, said second cover including a plurality of hollow cylinders with openings proximal to an outer perimeter of said second cover, said lifter shaft being in mechanical communication with at least one of said first cover and said second cover;

at least one return spring that provides a force in a direction that is substantially parallel to the longitudinal axis of said lifter shaft, and is in mechanical communication with at least one of said linear actuator and said second cover;

a plurality of lifter pins that are seated in said plurality of hollow cylinders with openings and that are movable in a direction substantially parallel to said longitudinal axis; and a driver having a path of movement that is substantially perpendicular to said lifter longitudinal axis, said driver including a plurality of protrusions along at least one longitudinal edge of the driver, such that said plurality of lifter pins that are in the extended position are in a position to make physical contact with said driver protrusions, so as to move said driver toward a ready position as the lifter subassembly rotates;

wherein:

at the end of a lifting stroke, one of said plurality of lifter pins is held in the extended position by making physical contact with one of said plurality of protrusions of said driver and holding said driver until a new driving stroke is initiated; and at the end of said lifting stroke, the other pins of said plurality of lifter pins are moved to a retracted position, so that said driver is clear for said new driving stroke.

22. The lifter of claim 21, wherein:

action of at least one of:

(a) said linear actuator, and (b) said at least one return spring causes the other pins of said plurality of lifter pins to move to said retracted position, at the end of said lifting stroke.

23. The lifter of claim 21, wherein said linear actuator comprises a solenoid that includes a movable plunger.

* * * * *